United States Patent
Piersiak et al.

(10) Patent No.: US 12,457,402 B1
(45) Date of Patent: Oct. 28, 2025

(54) ELECTRONIC DEVICE WITH MODULAR ACCESSORIES

(71) Applicant: Amazon Technologies, Inc., Seattle, WA (US)

(72) Inventors: Rafal Piersiak, Belmont, CA (US); John Roos, Los Gatos, CA (US); Matthew J. England, Santa Monica, CA (US); Oleksii Shekolian, Kyiv (UA); Eric S. Micko, San Jose, CA (US); Sonny Windstrup Rasmussen, Singapore (SG); Samuel Lee, Los Angeles, CA (US); Dan Gilbert Allen, Springville, UT (US)

(73) Assignee: Amazon Technologies, Inc., Seattle, WA (US)

(*) Notice: Subject to any disclaimer, the term of this patent is extended or adjusted under 35 U.S.C. 154(b) by 193 days.

(21) Appl. No.: 18/127,927

(22) Filed: Mar. 29, 2023

(51) Int. Cl.
*H04N 23/57* (2023.01)
*H04N 23/51* (2023.01)

(52) U.S. Cl.
CPC ............ *H04N 23/57* (2023.01); *H04N 23/51* (2023.01)

(58) Field of Classification Search
CPC ........ H04N 23/57; H04N 23/51; H04N 23/50; H04N 23/52; H04N 23/54; H05K 1/0228; H05K 5/0026; H05K 5/0039; H05K 5/003; G03B 17/02

USPC ......................................................... 348/373
See application file for complete search history.

(56) References Cited

U.S. PATENT DOCUMENTS

| | | | |
|---|---|---|---|
| 10,930,126 B1* | 2/2021 | Jeong | H04N 23/611 |
| 2015/0181105 A1* | 6/2015 | Huang | G03B 17/561 |
| | | | 348/211.4 |
| 2017/0160138 A1* | 6/2017 | Jeong | H04N 23/00 |
| 2021/0097830 A1* | 4/2021 | England | G08B 13/19695 |
| 2023/0384655 A1* | 11/2023 | Lin | H05K 7/20472 |
| 2024/0097830 A1* | 3/2024 | Hooli | H04L 1/1854 |

* cited by examiner

*Primary Examiner* — Lin Ye
*Assistant Examiner* — Chan T Nguyen
(74) *Attorney, Agent, or Firm* — Eversheds Sutherland (US) LLP

(57) ABSTRACT

A device includes a first housing, a camera residing at least partially within the first housing, a switch residing at least partially within the first housing, and a second housing coupled to the first housing and at least partially residing within the first housing. The switch is configured to disable the camera. The second housing includes a receptacle configured to receive a battery, and an arm having a tab configured to engage and disengage a lever of the switch to disable the camera. One or more contacts at least partially reside within the first housing and are configured to electrically connect to an accessory coupled to the first housing.

23 Claims, 45 Drawing Sheets

ELECTRONIC DEVICE WITH MODULAR ACCESSORIES

BACKGROUND

Security is a concern for many homeowners, businesses, and the like. In some examples, those seeking to protect or monitor their homes or place of business may wish to have video and audio communications. Devices, for example, may be placed adjacent to an external door or entryway. However, conventional devices may be unaesthetically appealing, have large form factors, and/or have suboptimal audio, video, and/or lighting characteristics. Additionally, current devices may fail to accurately warn homeowners, businesses, and the like of imminent threats, such as detecting intruders or unwelcomed guests.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features. The components, devices, and/or apparatuses depicted in the accompanying figures are not to scale and components within the figures may be depicted not to scale with each other.

DETAILED DESCRIPTION

Figure 1:
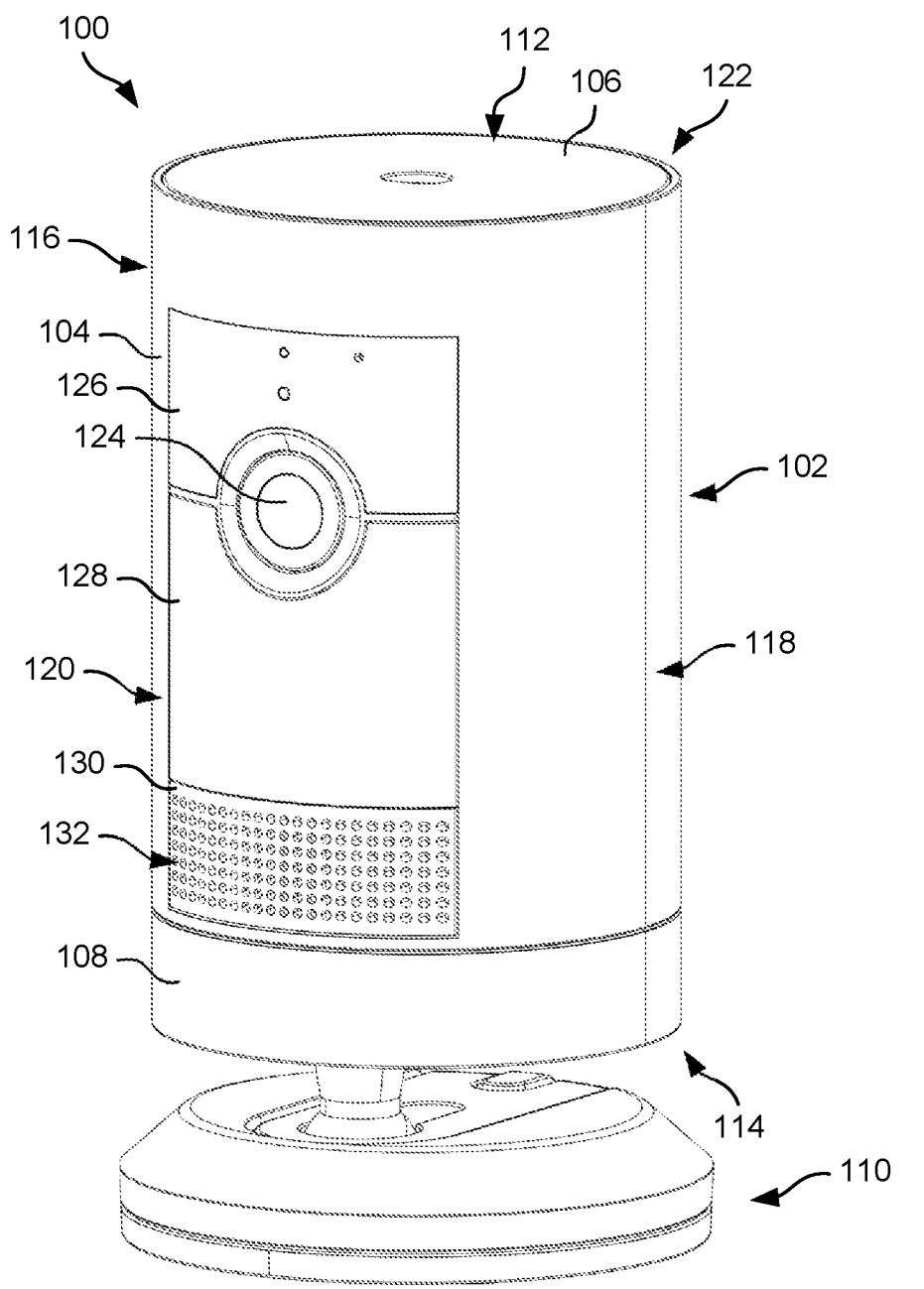
FIG. 1 illustrates a front perspective view of an example device including a camera assembly and a stand, according to an example of the present disclosure.

This application is directed, at least in part, to a device (e.g., electronic device, audio/video (A/V) device, etc.) having improved image, audio, and video capturing capabilities. In some instances, the device includes a camera assembly having various computing components, such as a camera, passive infrared (PIR) sensor(s), infrared (IR) lighting elements, and so forth for detecting motion and/or recording video within an environment of the device. Additionally, the camera assembly may include one or more microphone(s) for capturing audio within the environment and a speaker for outputting sound within the environment. In some instances, various attachments or accessories may couple to the camera assembly depending upon a desired application of the device. For example, various lighting elements, stands, and so forth may couple to the camera assembly. In some instances, power and other signals may transfer between the camera assembly and the accessories to permit an operation thereof. The camera assembly and the accessories may couple together via a twist and lock mechanism to permit the accessories to be conveniently interchangeable.

The device may include a front, a back, a top, a bottom, and adjacent lateral sides. In some instances, the camera, the PIR sensor(s), the IR lighting elements, and the microphone(s) are disposed within the camera assembly and oriented towards the front. Additionally, the camera assembly may include a status indicator (e.g., RGB LED) that indicates an operational state of the device. For example, the status indicator may indicate whether the microphone(s) are recording audio, whether the camera(s) are capturing video, whether motion is detected, and so forth. Additionally, an ambient light sensor may be disposed within the camera assembly for transitioning the device between daytime and nighttime modes (e.g., low light conditions).

In some instances, the camera, the PIR sensor(s), the ambient light sensor, the speaker (e.g., mid-range speaker, tweeter speaker, subwoofer speaker), and the status indicator may be vertically aligned along the front. In some instances, the camera, the PIR sensor(s), the ambient light sensor, the speaker, and the status indicator may be centrally aligned along the front of the device (e.g., between the adjacent lateral sides). Additionally, or alternatively, the IR lighting elements may be horizontally aligned with the ambient light sensor, and/or the microphone may be horizontally aligned with the status indicator. In some instances, the ambient light sensor may be interposed between the status indicator and the camera, the camera may be interposed between the ambient light sensor and the PIR sensors, the PIR sensor(s) may be interposed between the camera and the speaker, and/or the ambient light sensor may be interposed between the IR lighting elements. Additionally, in some instances, the status indicator and/or the microphone may be located closer to the top of the device than the IR lighting elements, the ambient light sensor, the camera, the PIR sensor(s), and/or the speaker. Additionally, or alternatively, the speaker may be located more proximate to the bottom of the device than the PIR sensor(s) and/or the camera.

In some instances, one or more printed circuit boards (PCBs) or printed circuit board assemblies (PCBAs) are disposed within the camera assembly. A first PCB may include the IR lighting elements, the ambient light sensor, the microphone, and/or the status indicator. A second PCB may include the camera and/or the PIR sensor(s). In some instances, the speaker may additionally or alternatively mount to the second PCB. In some instances, the second PCB may include network interfaces (e.g., antenna(s)) for wirelessly coupling the device with one or more remote devices (e.g., mobile device, laptop, etc.) over one or more networks (e.g., Cellular, Wi-Fi, BLE, Bluetooth, etc.). Further, the PCBs (as well as other computing components of the device) may be communicatively coupled to one another via one or more flex circuits, flexible printed circuits (FPCs), wires, connectors, and so forth. For example, a FPC may route from a port (e.g., power, auxiliary, Ethernet, etc.) of the device to the PCBs. Here, the FPC may be communicatively coupled to the PCBs for distributing power, signals, and so forth to components of the device.

In some instances, a housing of the camera assembly is substantially cylindrical in shape and encircles components of the device. In some instances, the housing is a unibody structure. The housing may include cutouts, apertures, recesses, and the like for accommodating or otherwise receiving frames, windows, lenses, covers, and so forth of the camera assembly. For example, the camera assembly may include various frames, mounts, and/or brackets for receiving components of the device, or to which components of the device couple. As an example, a frame of the camera assembly may include a cutout through which the camera is disposed. The first PCB and/or the second PCB may also be coupled to the frame. In some instances, the frame includes various alignment mechanisms, such as tabs, pins, slits, and so forth for aligning components within the device. For example, prongs extending from the frame may be disposed through openings on the PCBs for aligning the PCBs on the frame (and within the device). Additionally, a cover that couples to the bracket may include orifices for outputting sound generated by the speaker, and/or components for receiving the camera, the ambient light sensor, the microphone, and/or the status indicator.

The frame may also define a window through which the PIR sensor(s) are oriented to sense motion within the environment. In some instances, the frame defines a window having an upper portion (e.g., section) and a lower portion (e.g., section). A divider of the frame may be disposed between the upper portion and the lower portion, so as to separate the upper portion and the lower portion. A first PIR sensor may receive first light rays via the upper portion of the window, while a second PIR sensor may receive second light rays via the lower portion of the window. The divider disposed between the upper portion and the lower portion may prevent light rays received by the first PIR sensor interfering (e.g., cancelling out) light rays received by the second PIR sensor. In some instances, the divider may also include scalloped-shaped features to reduce a glare or reflection of the incoming light rays. In some instances, the PIR sensor(s) may be in a vertically stacked relationship compared to one another. For example, the first PIR sensor may reside vertically above the second PIR sensor.

The camera assembly may include a battery housing that defines one or more battery receptacles. For example, the battery housing may include a body that defines a battery receptacle for receiving a battery of the device. In some instances, the frame couples to the battery housing.

Additionally, windows and/or lenses disposed over the camera(s), PIR sensor(s), the IR lighting elements, and so forth may couple to the cover. In some instances, the bracket (with the PCBs, for example, coupled thereto) may couple to the housing and/or the frame. In some instances, a window may be disposed over the IR lighting elements, the microphone, the status indicator, and/or the ambient light sensor. The window may define various ports or channels for enabling the microphone to receive sound, the status indicator to emit light, and/or the ambient light sensor to receive light. Additionally, the window may be transmissive to IR light emitted via the IR lighting elements. In some instances, a lens is disposed over the PIR sensor(s), and the lens may be transmissive to light received by the PIR sensor(s). Additionally, the lens, or a portion thereof, may include a Fresnel lens for directing incoming light rays to the first PIR sensor and the second PIR sensor, respectively. In some instances, the Fresnel lens is made up of a plurality of individual lens elements having respective focal lengths, concentric grooves, and so forth.

In some instances, the components of the device may be insertable into the housing of the camera assembly. For example, components (e.g., PCBs) may couple to the frame and/or the battery housing, and thereafter, inserted into the housing. Once inserted, the cover, the window, and/or the lens may be coupled to the housing (e.g., snap-fit, fasteners, adhesive, etc.). Coupling the components to the frame and/or the battery housing at the outset, and then inserting the components into the housing at once, may reduce a manufacturing time of the device.

In some instances, a stand may couple to the camera assembly to dispose the device on a vertical surface (e.g., wall) or a horizontal surface (e.g., shelf). In some instances, the stand may couple to the housing or covers of the device. In some instances, the stand may be configured to couple to the camera assembly at various locations. For example, the stand may couple to the camera assembly at a first location for disposing the device on a horizontal surface, and/or may couple to the camera assembly at a second location for disposing the device on a vertical surface. In some instances, the same stand used to dispose the device on the vertical surface may be the same stand used to dispose the device on the horizontal surface. For example, the stand may be removably coupled to the camera assembly depending upon the configuration desired. When the stand couples to the camera assembly at the second location, the device may hang from the vertical surface, whereas the device may stand on the horizontal surface (via the stand) when coupled to the camera assembly at the first location. In some instances, the engagement between the camera assembly and the stand may permit the device to be reoriented, such as for changing a field of view (FoV) of the camera. For example, the stand may include arms, members, etc. that extend, pivot, and so forth for translating the camera assembly towards and away from the stand, and may include a ball and socket coupling for swiveling, rotating, or pivoting the camera assembly.

In some instances, various accessories may be configured to couple to the camera assembly. As introduced above, the stand may couple to the camera housing. However, the stand may be removed, and an accessory (e.g., attachment) may couple to the camera assembly. For example, a privacy cover may couple to camera assembly. At a first position, the privacy cover may be disposed over the front and obstruct the camera. At a second position and a third position, the privacy cover may be disposed alongside a first side and a second side of the camera assembly, respectively, and may not obstruct the camera. When unobstructed, the camera may capture image and/or video data within an environment of the device. The privacy cover may rotate between the first position, the second position, and the third position via a rotational coupling with the camera assembly, respectively. As such, the privacy cover may transition to obstruct the camera for privacy and unobstruct the camera to monitor the environment.

In some instances, movement of the privacy cover may correspondingly engage and disengage a switch that respectively actives and deactivates components of the device, such as the camera. In some instances, the switch may be disposed on the second PCB. For example, in the first position, a feature of the privacy cover, such as a protrusion or rib, may engage with an arm of the battery housing. When the rib engages with the arm of the battery housing, a tab (e.g., prong, pin, etc.) of the arm is advanced to engage the switch, and correspondingly, the camera may be deactivated. Comparatively, when the privacy cover moves to the second position and/or the third position, the rib of the privacy cover may no longer engage with the arm of the privacy cover. Correspondingly, the tab no longer contacts the switch, and in turn, the camera (as well as other components of the device) may be activated or permitted to be activated.

Another accessory may include an actuatable stand that couples to the camera assembly. The actuatable stand may have one or more motors capable of being controlled to change an orientation of the camera assembly (or more generally, the device). Changing an orientation of the camera assembly may adjust a field of view of the camera(s), PIR sensor(s), and so forth. Still, as another example, the accessory may include lighting elements that illuminate the environment. The lighting elements, for example, may be actuated in response to detecting motion within the environment. In other examples, the accessory may include the cover with the stand for disposing the device on a horizontal surface, for example.

In some instances, accessories may couple to the camera assembly via a twist and lock mechanism. Attachment mechanisms of the camera assembly and the accessories may form the twist and lock mechanism. For example, the camera assembly may include first attachment mechanisms that engage with second attachment mechanism of the accessories. In some instances, the first attachment mechanisms may angularly span around at least a portion of a perimeter, circumference, or periphery of the camera assembly, while the second attachment mechanisms may span around at least a portion of an opening, annulus, or receptacle of the accessories. The first attachment mechanisms and the second attachments mechanism may engage (e.g., interlock) via a rotation of the housing and/or the cover. For example, rotating the camera assembly and/or the accessory in a first direction (e.g., clockwise) may engage the first attachment mechanisms and the second attachment. When engaged, the camera assembly and the accessory may be securely coupled together. Rotating the camera assembly and/or the accessory in a second direction (e.g., counterclockwise) may disengage the first attachment mechanisms and the second attachment mechanisms such that the camera assembly and the accessory may be uncoupled. In some instances, the first attachment mechanisms may resemble tabs, hooks, protrusions, keys, keyways, slots, or other male/female connectors that are complimentary to engage with the second attachment mechanisms.

Additionally, when the accessory includes electronic components (e.g., motors, lighting elements, etc.), the accessory may communicatively couple to the camera assembly via one or more connections. In some instances, the one or more connections may resemble contacts, circuit traces, or swiping pads. For example, the camera assembly may include first contacts that engage with second contacts of the accessory. When the camera housing and the accessory are coupled together, via the twist and lock mechanism, the first contacts and the second contacts may engage. In some instances, the engagement between the first contacts and the second contacts transfer power, data, and so forth between computing components in the camera assembly with computing components in the accessory. For example, power may be transferred between the camera assembly and the accessory via an engagement between the first contacts and the second contacts. In some instances, the first contacts of the camera assembly represent races, strips, pads, etc., while the second contacts of the accessory represent prongs, pins, tabs, etc. In some instances, three connections may exist between the camera assembly and the accessory, such as ground, digital, and power. In some instances, not all the accessories may receive, power, signals or other communicatively connect to computing components within the camera assembly.

In some instances, heat dissipating elements are included to disperse heat generated by components of the device. By way of example and not limitation, the camera(s), LEDs, power supply, network interfaces, and so forth generate heat during use. Without effectively dispersing or dissipating this heat, the internal components, such as a camera, may be adversely affected and become uncappable of performing its intended function. To efficiently dissipate heat generated by the components, heat dissipating elements may be included within the camera assembly to dissipate heat away, and/or to uniformly distribute the heat over the surface area of the device.

Components of the device may be manufactured using any suitable manufacturing technique, such as blow molding, injection molding, stamping, and so forth. Additionally, suitable materials include metals, composites, plastics, and/or any combination thereof.

The present disclosure provides an overall understanding of the principles of the structure, function, device, and system disclosed herein. One or more examples of the present disclosure are illustrated in the accompanying drawings. Those of ordinary skill in the art will understand that the devices and/or the systems specifically described herein and illustrated in the accompanying drawings are non-limiting embodiments. The features illustrated or described in connection with one embodiment may be combined with the features of other embodiments. Such modifications and variations are intended to be included within the scope of the appended claims.

FIG. 1 illustrates a front perspective view of an example device 100, according to an example of the present disclosure. In some instances, the device 100 may represent an electronic device, audio/video (A/V) device, and so forth. In some instances, the device 100 includes a camera assembly 102 that has a housing 104. Additionally, the device 100 may include a first cover 106 and/or a second cover 108 coupled to the housing 104 (or more generally, the camera assembly 102). In some instances, the housing 104 may be a unibody structure that substantially encircles, encompasses, or surrounds components residing within the camera assembly 102. A stand 110 may, in some instances, couple to the second cover 108. In some instances, the device 100 may generally include a cylindrical shape. However, other shapes are envisioned (e.g., square, hexagonal, etc.).

The camera assembly 102 may include a top 112, a bottom 114 opposite the top 112 (e.g., spaced apart in the Y-direction), a first side 116, a second side 118 opposite the first side 116 (e.g., spaced apart in the X-direction), a front 120, and a back 122 opposite the front 120 (e.g., spaced apart in the Z-direction). The first cover 106 may couple to the camera assembly 102 at the top 112, and the second cover 108 may couple to the camera assembly 102 at the bottom 114. As will be explained herein, the camera assembly 102 and the second cover 108 may couple together via a twist and lock mechanism. For example, rotating the camera assembly 102 and/or the second cover 108 in a first direction may couple the camera assembly 102 and the second cover 108 together, while rotating the camera assembly 102 and/or the second cover 108 in a second direction (opposite the first direction) may uncouple the camera assembly 102 and the second cover 108. In some instances, the stand 110 may couple to the camera assembly 102 at the bottom 114 or at the back 122.

In some instances, the stand 110 may couple to a surface (e.g., wall) for disposing the device 100 on the surface. In some instances, the stand 110 rotatably, pivotably, or translationally couples to the camera assembly 102. For example, a ball and socket joint may couple the camera assembly 102 and the stand 110 together. Additionally, or alternatively, as will be explained herein with regard to FIGS. 28A-28C and 29, the stand 110 may extend (e.g., in the Z-direction) to translate the camera assembly 102 away from the stand 110 (or a surface on which the camera assembly 102 is disposed). Regardless, the coupling between the camera assembly 102 and the stand 110, or the stand 110 itself, may adjust a field of view of the device 100 (e.g., the camera, PIR sensor(s), etc.)). Further, although the stand 110 is shown coupled to the camera assembly 102 at the bottom 114, the stand 110 may be coupled to other portions of the camera assembly 102. For example, the stand 110 (whether the same stand or a different stand), may couple to the camera assembly 102 at the back 122.

As will be explained herein with regards to FIGS. 31A, 31B, 32, 33A, 33B, 34A, and 34B various accessories may be coupled to the camera assembly 102. In such instances, the second cover 108 and/or the stand 110 may be removed. For example, in replacement of the second cover 108 and the stand 110, other accessories (e.g., privacy cover, lighting elements, alternate stands/mounts, etc.) may be coupled to the camera assembly 102. In such instances, the second cover 108 and the stand 110 may be removed from the camera assembly 102, and thereafter, the accessories may be coupled to the camera assembly 102. However, in some instances, the second cover 108 and/or the stand 110 may be used in conjunction with other accessories. For example, the second cover 108 may couple to the camera assembly 102, but another stand or mount in lieu of the stand 110 may couple to the back 122 of the camera assembly 102.

As shown, a camera 124 is oriented towards the front 120. In addition to the camera 124, the device 100 may include other computing components, such as microphone(s), lighting elements (e.g., IR light emitting diodes (LEDs), white LEDs, etc.), PIR sensor(s), ambient light sensor(s), status indicator(s), temperature sensor(s), and so forth. In some instances, the computing components may reside beneath one or more windows, lens, and so forth of the device 100. For example, the device 100 may include a window 126 and a lens 128. In some instances, the microphone(s), ambient light sensor(s), IR lighting element(s), and/or the status indicator may reside beneath the window 126, while the PIR sensor(s) may reside beneath the lens. The window 126, for example, may include ports, channels, and the like for channeling light to/from the ambient light sensor(s) and the status indicator, respectively, and sound to the microphone(s). Additionally, the window 126 may be transmissive to IR light emitted from the IR lighting elements. Likewise, the lens 128 may be transmissive to light such that the light may be directed towards the PIR sensor(s) residing therebeneath. In some instances, the window 126 is located vertically above the camera 124, closer to the top 112 of the camera assembly 102 than the lens 128, which may be located vertically below the camera 124.

The device 100 may include a third cover 130 that couples to the housing 104 at the front 120. In some instances, the window 126 and/or lens 128 couple to the third cover 130 once or after the third cover 130 couples to the housing 104. In some instances, the third cover 130 defines an opening through which the camera 124 is at least partially disposed. Additionally, the third cover 130 may define orifices 132 such that sound output by a speaker of the device 100 (residing within the camera assembly 102) may be emitted into the environment. Although a certain number, shape, orientation, and/or pattern of the orifices 132 are shown, the orifices 132 may be arranged differently than shown.

Figure 2:
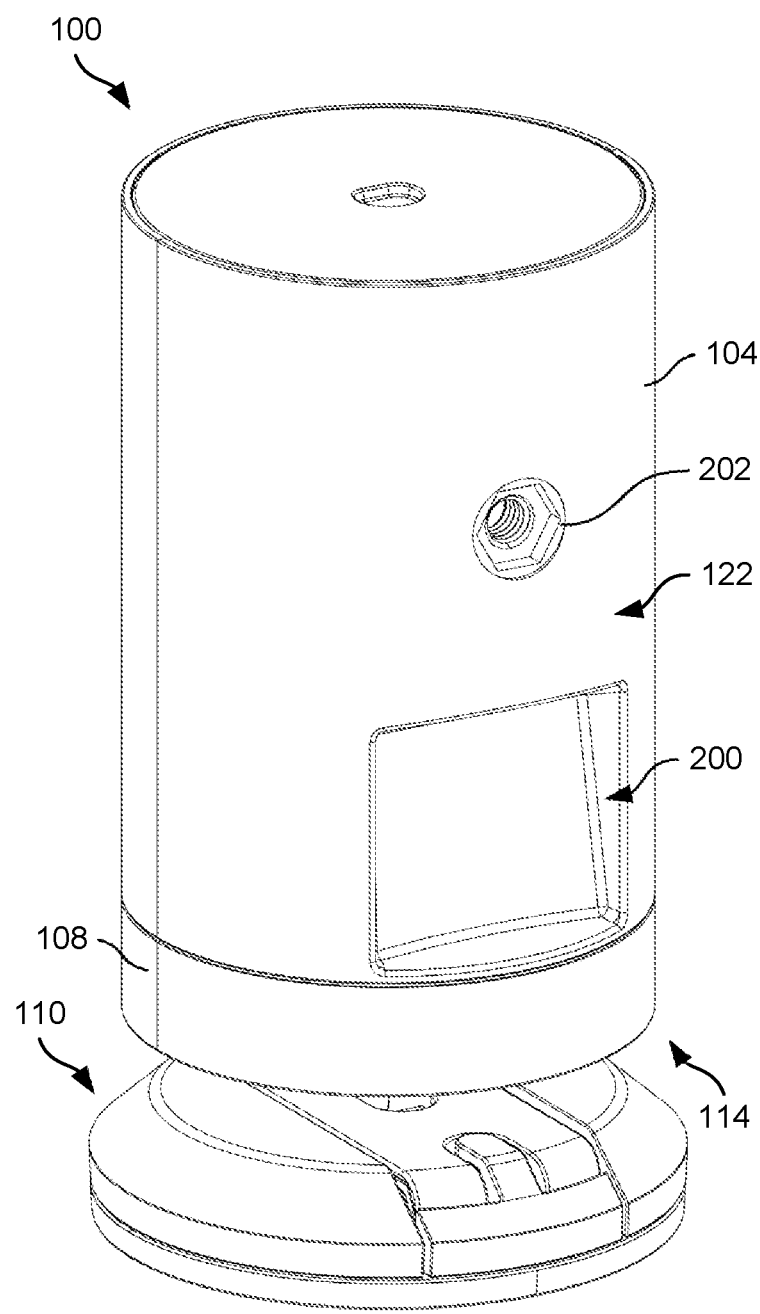
FIG. 2 illustrates a rear perspective view of the device of FIG. 1, according to an example of the present disclosure.

FIG. 2 illustrates a rear perspective view of the device 100, according to an example of the present disclosure. The housing 104 includes or defines a pocket 200 for coupling the device 100 to networks, mains power, other devices, and so forth. For example, port(s) (e.g., power socket, auxiliary jack, ethernet, etc.) may be disposed within the pocket 200. As such, cables, wires, or other connectors may be routed into the pocket 200 and into the port(s).

The camera assembly 102, or the housing 104, may also include a receptacle 202 for receiving the stand 110. For example, although the stand 110 is shown and described as being coupled at the bottom 114 of the camera assembly 102, the stand 110 may be removed from the bottom 114 and coupled to the back 122 via the receptacle 202. Doing so may permit the device 100 to be disposed on a vertical surface, as compared to resting on a surface (e.g., shelf, countertop, etc.). In some instances, the stand 110 may include a fastener that threads into the receptacle 202. The second cover 108 may have a similar receptacle for receiving the stand 110.

Figure 3:
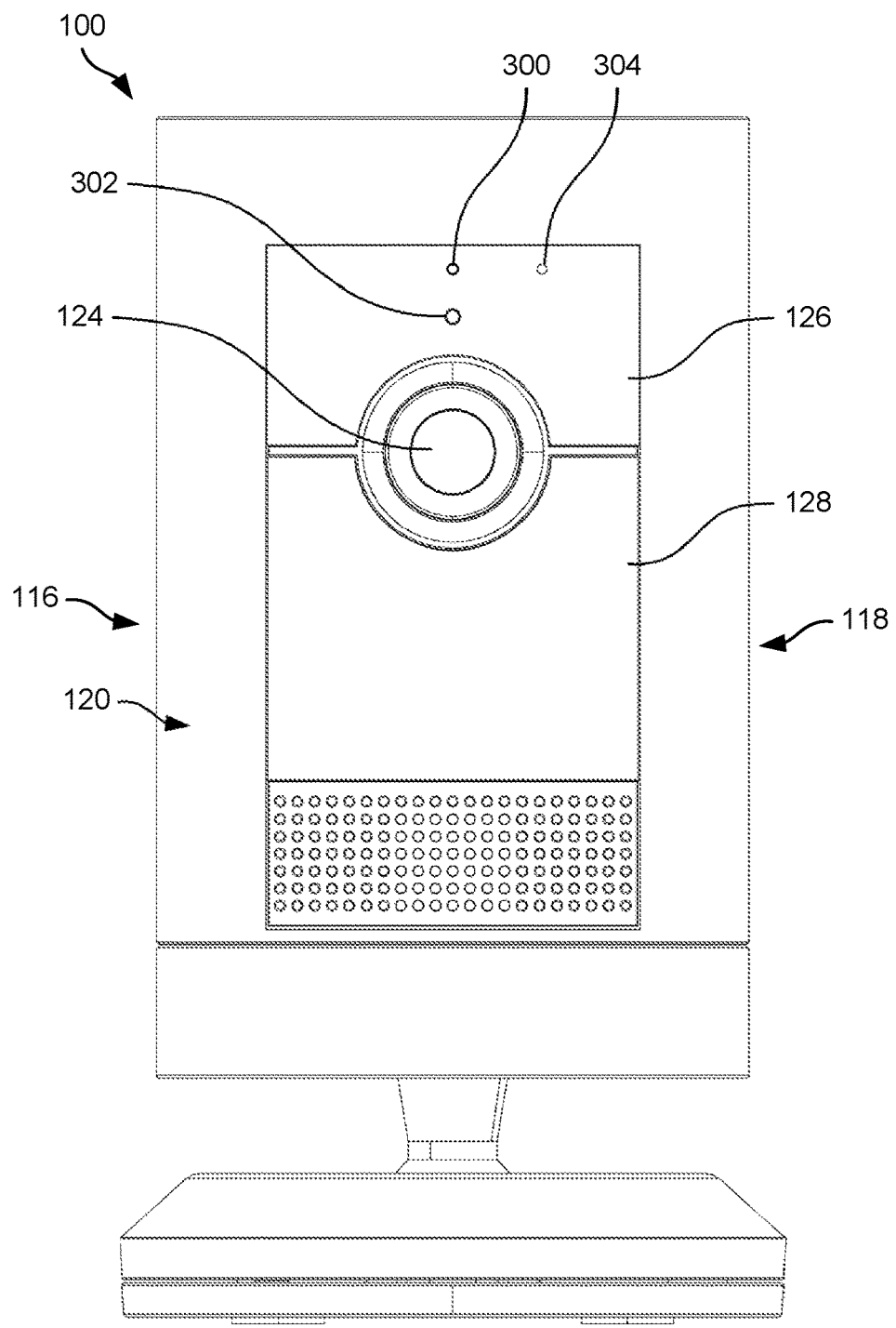
FIG. 3 illustrates a front view of the device of FIG. 1, according to an example of the present disclosure.
Figure 3:
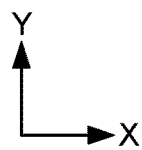

FIG. 3 illustrates a front view of the device 100, according to an example of the present disclosure. In some instances, the window 126 and the lens 128 may include a width (e.g., in the X-direction). In some instances, the window 126 may include a height (e.g., in the Y-direction) that is less than a height of the lens 128. As shown, the camera 124 may be interposed between the window 126 and the lens 128.

The window 126 may be transmissive to light, such as IR light, such that light emitted via the IR lighting elements may be transmitted into the environment. Additionally, the lens 128 may be transmissive to light for directing light to the PIR sensor(s) residing therebeneath. The window 126 may define a first channel 300, a second channel 302, and a third channel 304. The first channel 300 may assist in directing light from a lighting element within an interior of the camera assembly 102 to an exterior of the camera assembly 102. The lighting element may illuminate according to an operational status of the device 100 (e.g., capturing audio, recording video, sensed motion, etc.). The second channel 302, meanwhile, may direct light to an ambient light sensor within the camera assembly 102. In some instances, light pipes may reside at least partially within the first channel 300 and/or the second channel 302 for directing light from the lighting element and directing light to the ambient light sensor, respectively.

The third channel 304 may represent a microphone port for directing sound to a microphone within the camera assembly 102. As will be discussed herein, a microphone may reside beneath the third channel 304 and direct sound to the microphone. Although the window 126 is shown and described as only including one channel for directing sound to a microphone, in some instances, the window 126 (or the lens 128, the third cover 130, the housing 104, etc.) may define additional microphone ports. In such instances, the device 100 may include more than one microphone.

In some instances, the camera 124, the first channel 300, and the second channel 302 may be vertically aligned with one another. In some instances, the camera 124, the first channel 300, and the second channel 302 may be centrally aligned on the camera assembly 102 (e.g., centrally between the first side 116 and the second side 118). In some instances, the third channel 304 may be horizontally aligned with the first channel 300. As shown, and in some instances, the first channel 300 and the third channel 304 may be located vertically above the second channel 302. Moreover, in some instances, the third channel 304 may be located closer to the second side 118 than the first side 116.

In some instances, the window 126 and/or the lens 128 may be manufactured from high density polyethylene (HDPE), germanium, zinc-sulfide, and so forth.

Figure 4:
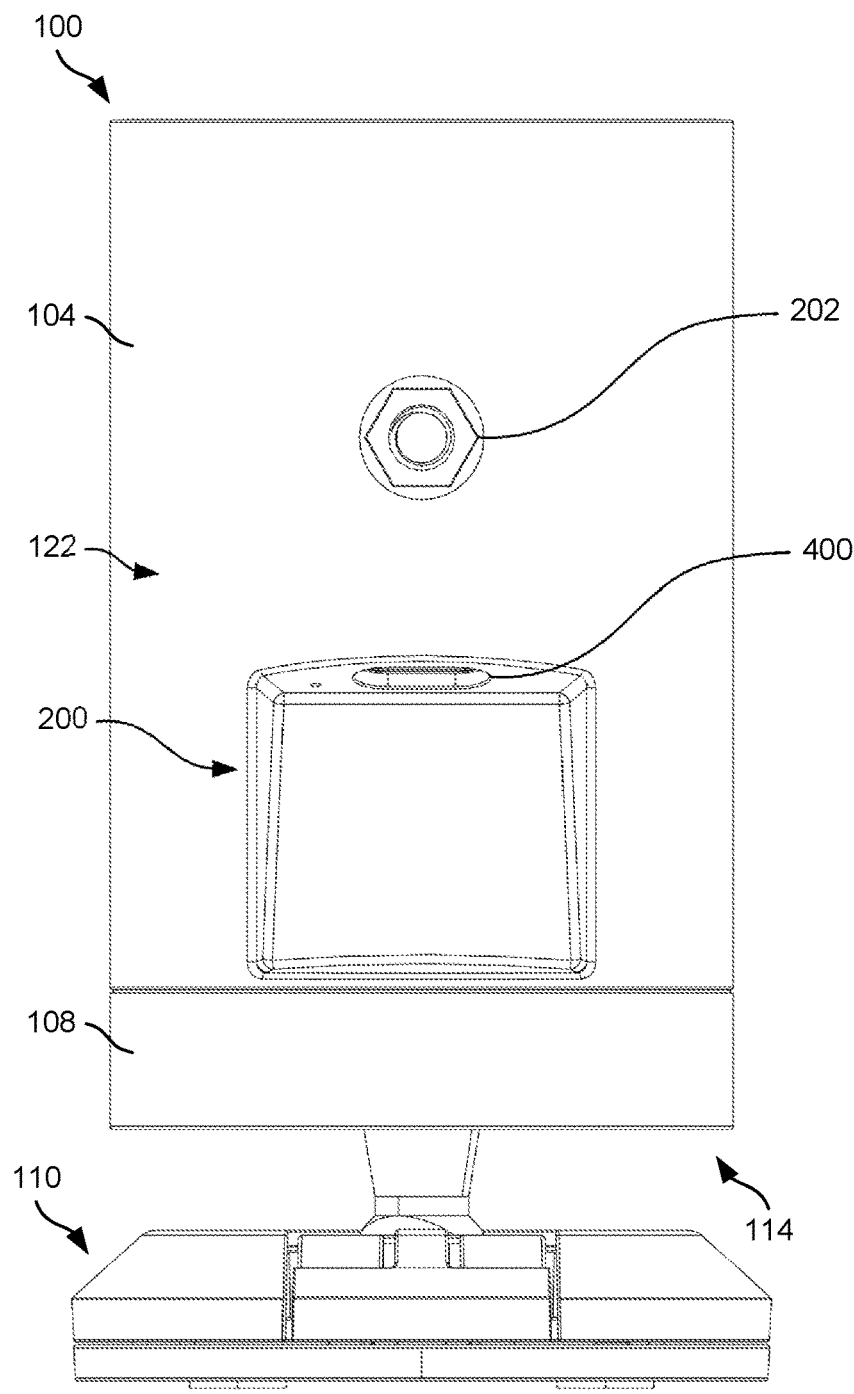
FIG. 4 illustrates a rear view of the device of FIG. 1, according to an example of the present disclosure.

FIG. 4 illustrates a back view of the device 100, according to an example of the present disclosure. The stand 110 is shown coupled to the bottom 114 of the camera assembly 102, via the second cover 108, for example. Additionally, the pocket 200 is shown being formed within the housing 104. A port 400 may be located within the pocket 200 for receiving cables (e.g., power, USB-C, Ethernet, etc.). As such, cables, wires, or other connectors may be routed into the pocket 200 and communicatively connect to the port 400. The receptacle 202 is further shown for receiving the stand 110 at the back 122.

Figure 5A:
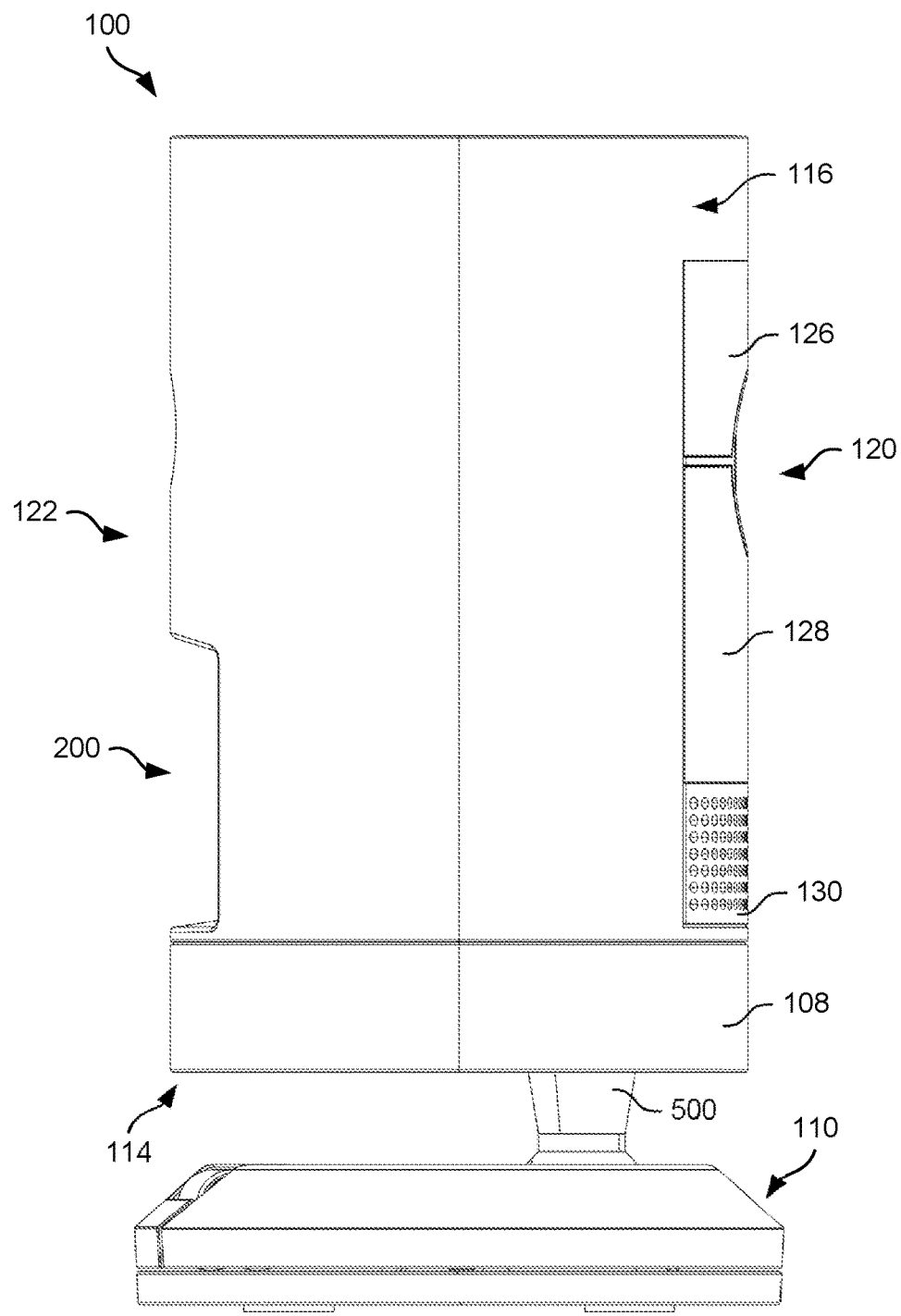
FIG. 5A illustrates a first side view of the device of FIG. 1, according to an example of the present disclosure.
Figure 5B:
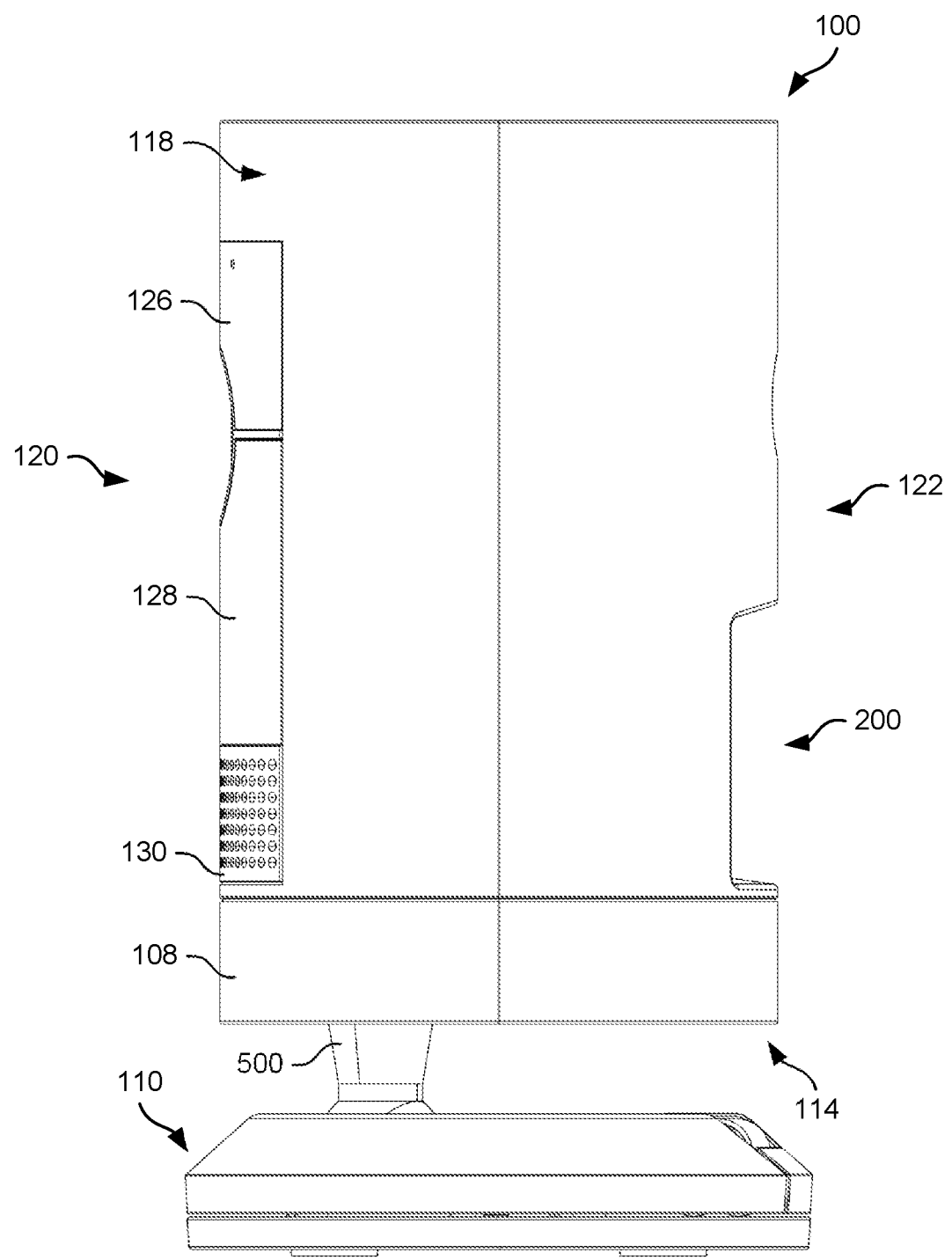
FIG. 5B illustrates a second side view of the device of FIG. 1, according to an example of the present disclosure.

FIGS. 5A and 5B illustrate a first side view and a second side view of the device 100, according to an example of the present disclosure. More particularly, FIG. 5A illustrates the first side 116, while FIG. 7B illustrates the second side 118.

The camera assembly 102 includes the window 126 and the lens 128 disposed at the front 120, and the pocket 200 disposed at the back 122. The second cover 108 may couple to the camera assembly 102 at the bottom 114, while the third cover 130 may couple to the camera assembly 102 at the front 120. The stand 110 may further couple to the second cover 108, for example, proximate to the bottom 114. As shown, the stand 110 may include a linkage 500 that couples to, or is received by, the second cover 108. In some instances, when coupled to the second cover 108, the linkage 500 couples to the second cover 108 more proximate to the front 120 than the back 122.

Figure 6:
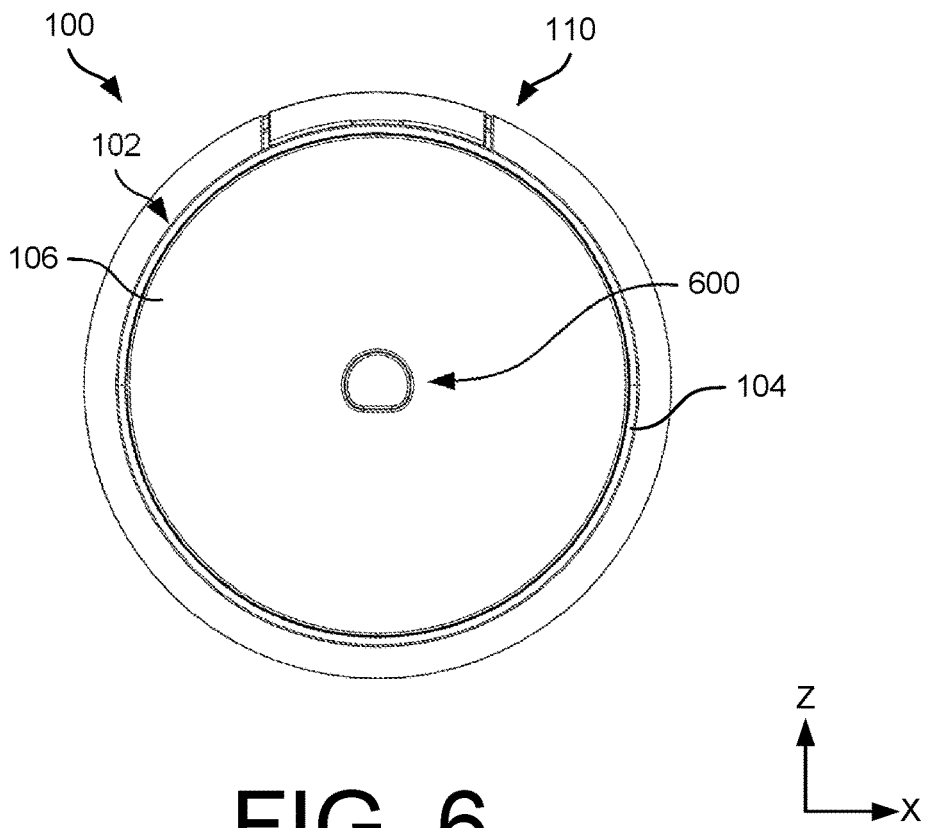
FIG. 6 illustrates a top view of the device of FIG. 1, according to an example of the present disclosure.

FIG. 6 illustrates a top view of the device 100, according to examples of the present disclosure. The first cover 106 couples to the housing 104, at the top 112 of the camera assembly 102. In some instances, the first cover 106 is substantially circular in shape. The first cover 106 is shown including a recess 600 (e.g., pocket, receptacle, etc.) that may be configured to receive an accessory coupled to the camera assembly 102. For example, an accessory may represent a privacy cover, and the recess 600 may receive a portion of the privacy cover. The engagement between the privacy cover and the recess 600 may permit the privacy cover to rotate between positions associated with obstructing and unobstructing the camera 124.

In some instances, the camera assembly 102 includes a width (e.g., in the X-direction and/or the Z-direction) that is less than a width of the stand 110 (e.g., in the X-direction and/or the Z-direction). The greater width of the stand 110 (e.g., diameter) may securely support the device 100 on a horizontal surface, for example.

Figure 7:
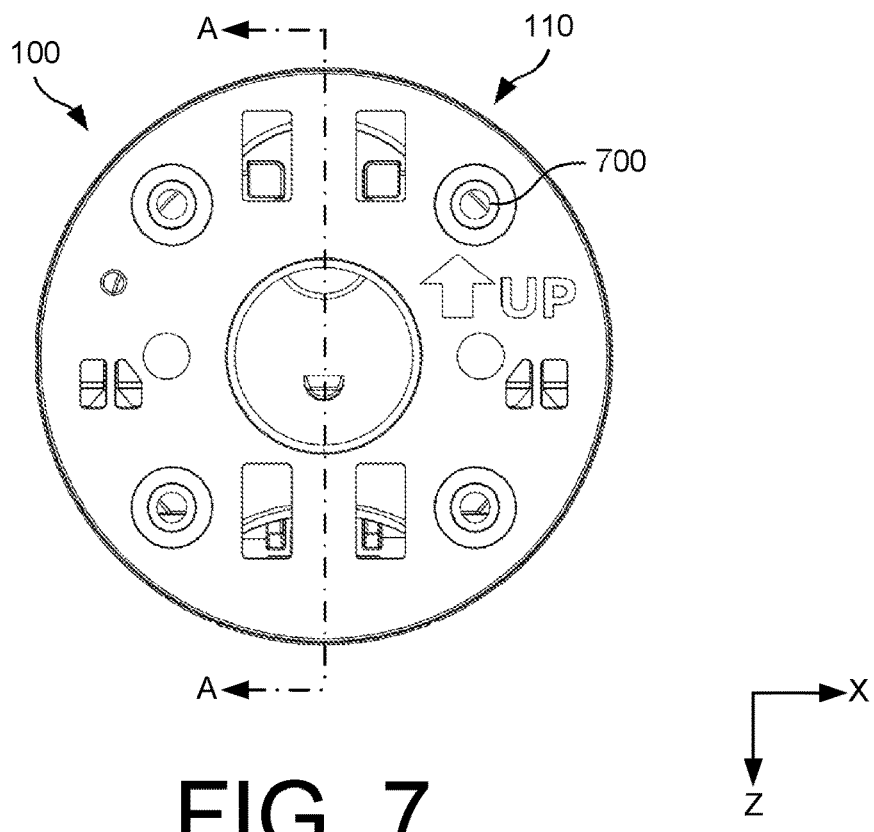
FIG. 7 illustrates a bottom view of the device of FIG. 1, according to an example of the present disclosure.

FIG. 7 illustrates a bottom view of the device 100, according to examples of the present disclosure. The stand 110 is shown including holes 700 for receiving fasteners (e.g., screws) that may couple the stand 110 to a surface (e.g., wall). For example, fasteners may be disposed through the holes 700 and secured into a surface for coupling the stand 110 to the surface. However, as also discussed herein, the stand 110 may rest on a horizontal surface to dispose the device 100 within an environment.

Figure 9:
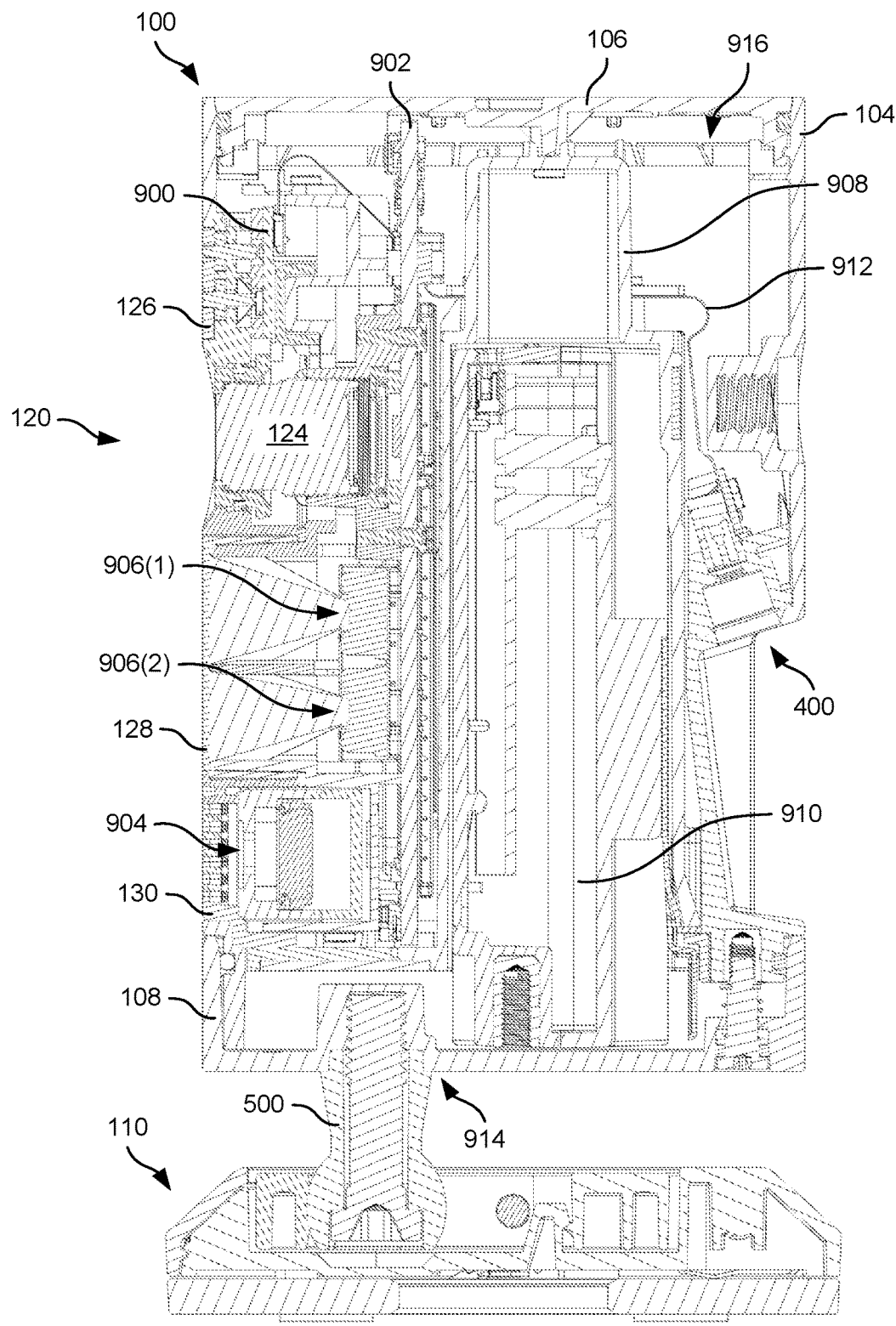
FIG. 9 illustrates a cross-sectional view of the device of FIG. 1, taken along line A-A of FIG. 7, according to an example of the present disclosure.

A line A-A is further shown extending through the device 100, which is used to illustrate a cross-sectional view of the device in FIG. 9.

Figure 8:
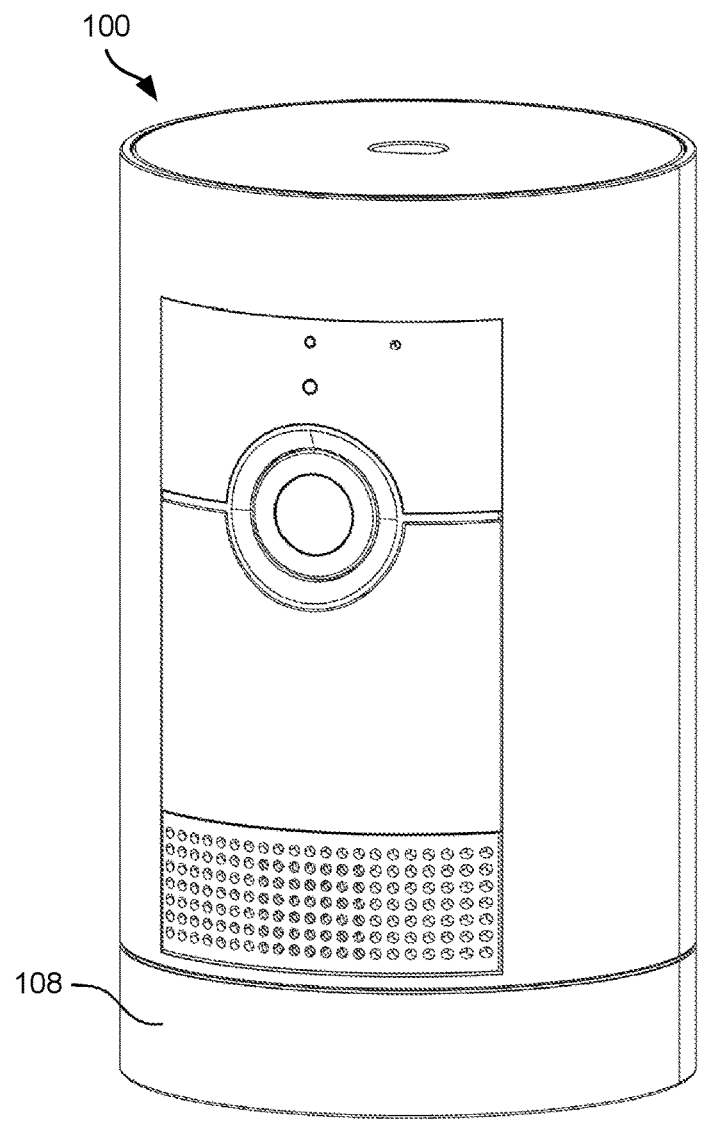
FIG. 8 illustrates a partially exploded view of the device of FIG. 1, showing the stand being spaced apart from the camera assembly, according to an example of the present disclosure.
Figure 8:
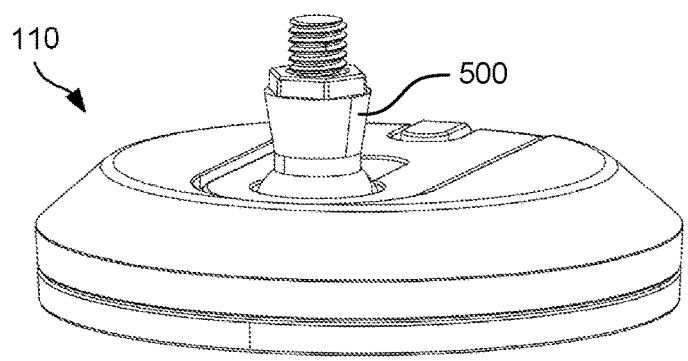
Figure 8:
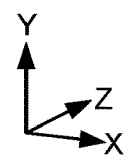

FIG. 8 illustrates a partially exploded view of the device 100, according to examples of the present disclosure. For example, the stand 110 is shown being separated (e.g., uncoupled) from the second cover 108. The stand 110 may include the linkage 500 that is received within a receptacle of the second cover 108. In doing so, the stand 110 may be coupled to the back 122 of the camera assembly 102 (e.g., via the receptacle 202), and/or accessory may be coupled to the camera assembly 102 (in lieu of the stand 110 and/or the second cover 108).

FIG. 9 illustrates a cross-sectional view of the device 100, taken along line A-A of FIG. 7, according to examples of the present disclosure.

The housing 104 of the camera assembly 102 may at least partially define an interior cavity 916 within which components of the device 100 reside. Additionally, the interior cavity 916 may be at least partially defined, or enclosed by the first cover 106, the second cover 108, and/or the third cover 130.

In some instances, the device 100 includes a first PCB 900 and a second PCB 902. The first PCB 900 may reside closer to the front 120 of the device 100 than the second PCB 902. Among other components, the device 100 may include the camera 124, a speaker 904, a first PIR sensor 906(1), and a second PIR sensor 906(2). In some instances, the camera 124, the speaker 904, the first PIR sensor 906(1), the second PIR sensor 906(2) may be disposed on (e.g., mounted to) the second PCB 902. The camera 124, the speaker 904, the first PIR sensor 906(1), the second PIR sensor 906(2) are shown being oriented towards the front 120. Additionally, the speaker 904 resides beneath (e.g., in the Z-direction) the orifices 132 of the third cover 130, while the first PIR sensor 906(1) and the second PIR sensor 906(2) reside beneath (e.g., in the Z-direction) the lens 128. As will be shown and discussed herein, the microphone, the ambient light sensor, the IR lighting elements, and/or the lighting element (e.g., status indicator) may be disposed on (e.g., mounted to) the first PCB 900, and disposed beneath the window 126 (e.g., in the Z-direction)

The device 100 may include a battery housing 908 that resides within the interior cavity 916. The battery housing 908 may receive a battery 910 of the device 100. In some instances, the device 100 may be powered via the battery 910, or may be powered via mains power via a cable connected to the port 400. A flexible printed circuit (FPC) 912 may communicatively connect to the port 400, the battery 910, the first PCB 900, and the second PCB 902.

The components of the camera assembly 102, within the interior cavity 916, may couple to various mounts, frames, brackets, and so forth. Moreover, the battery housing 908 may couple to the housing 104 for securing the battery housing 908 (and/or components coupled the battery housing 908), within the interior cavity 916.

The stand 110 couples to the second cover 108, for example, via the linkage 500. In some instances, the second cover 108 defines a receptacle 914 within which the linkage 500 of the stand 110 is received (e.g., threaded). As will be explained herein, the linkage 500 may pivotably couple to an arm of the stand 110 for adjusting an orientation of the camera assembly 102, and the camera 124, for example.

Figure 10:
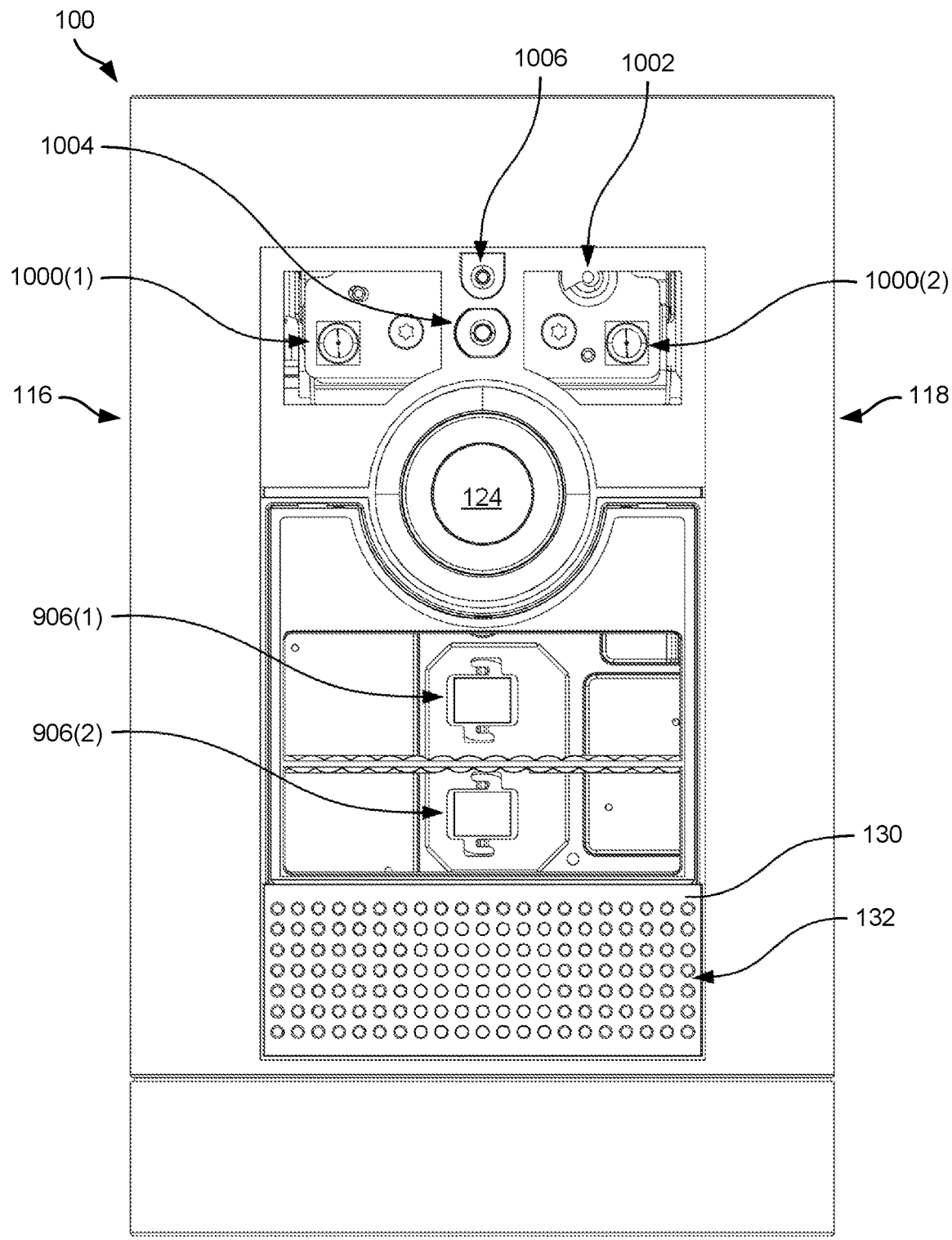
FIG. 10 illustrates example components disposed within the camera assembly of the device of FIG. 1, according to an example of the present disclosure.

FIG. 10 illustrates a front view of the device 100, showing the window 126 and the lens 128 removed, according to examples of the present disclosure.

The device 100 may include a first IR lighting element 1000(1), a second IR lighting element 1000(2), a microphone 1002, an ambient light sensor 1004, and a lighting element 1006. In some instances, the IR lighting elements 1000, the microphone 1002, the ambient light sensor 1004, and/or the lighting element 1006 are disposed on the first PCB 900. The IR lighting elements 1000, the microphone 1002, the ambient light sensor 1004, and/or the lighting element 1006 may be disposed beneath the window 126 (e.g., in the Z-direction).

The IR lighting elements 1000 are configured to output light through the window 126 and into an environment of the device 100. As such, the window 126 may be transmissive to IR light. In some instances, the IR lighting elements 1000 may be used to detect motion within the environment, and in response, the camera 124 may be caused to capture image data and/or video data within the environment. In some instances, the IR lighting elements 1000 are oriented to sense motion in front of the device 100. In some instances, the first IR lighting element 1000(1) may be located closer to the first side 116, and the second IR lighting element 1000(2) may be located closer to the second side 118. In some instances, the first IR lighting element 1000(1) may be disposed on a first side (or to a first side) of the camera 124, the ambient light sensor 1004, and/or the lighting element 1006, while the second IR lighting element 1000(2) may be disposed on a second side (or to a second side) of the camera 124, the ambient light sensor 1004, and/or the lighting element 1006.

The microphone 1002 may be aligned with the third channel 304 such that sound external to the device 100 may reach the microphone 1002 located within the camera assembly 102. That is, the microphone 1002 may receive audio, for instance, user speech, via the third channel 304. In some instances, the microphone 1002 and/or the third channel 304 may be encased with foam that acoustically seals the microphone 1002 to minimize sound received and/or generated via other portions of the device 100. For example, the foam may isolate the microphone 1002 from the speaker 904 to minimize an intensity of audio received from the speaker 904.

The lighting element 1006 may output information associated with an operational state of the device 100, such as whether the microphone 1002 is recording audio, whether the camera 124 is capturing video, and so forth. In some instances, the lighting element 1006 may represent a RGB lighting element that outputs light according to different appearance states (e.g., frequency, intensity, color, etc.). The ambient light sensor 1004 may be used to determine lighting conditions of the environment of the device 100, for example, when switching between daytime and nighttime modes (or light and dark lighting conditions). In some instances, the ambient light sensor 1004 may receive light through the second channel 302 of the window 126 for determining the lighting conditions within the environment.

The first PIR sensor 906(1) and the second PIR sensor 906(2) are shown being in a vertically stacked relationship. For example, the first PIR sensor 906(1) may be located more proximate to the top 112 than the second PIR sensor 906(2). The first PIR sensor 906(1) and the second PIR sensor 906(2) are arranged to receive light rays through the lens 128. In some instances, the first PIR sensor 906(1) and the second PIR sensor 906(2) may include, for example, two pyroelectric sensing elements and each pyroelectric sensing element may have a pyroelectric crystal. The pyroelectric sensing elements may generate electric charge in response to heat. Radiation (e.g., IR light) received at a surface of a pyroelectric sensing element generates heat, which in turn, generates electric charge. Stated alternatively, an absorbing layer of a pyroelectric sensing element transforms radiation flux change into a change in temperature and a pyroelectric component performs a thermal to electrical conversion. One or more low-noise and low leakage current field-effect transistors (e.g. JFET) or operational amplifiers are used to convert charge into a signal voltage.

In some instances, the two pyroelectric sensing elements of the first PIR sensor 906(1) may be electrically coupled together with opposite polarization to produce an output. In this way, an equal change in temperature at both of the pyroelectric sensing elements will cancel out in the output signal, thus filtering out temperature changes in the environment. However, a change in temperature at only one of the pyroelectric sensing elements of the first PIR sensor 906(1) will result in an output signal that is positive or negative (depending on which pyroelectric sensing element experienced the change in temperature).

In some instances, the first PIR sensor 906(1) may include two slots, each providing an optical path to one of the pyroelectric sensing elements. Features of a Fresnel lens formed by or within a portion of the lens 128 are configured to direct light onto the pyroelectric sensing elements.

In some instances, the two pyroelectric sensing elements of the second PIR sensor 906(2) may be electrically coupled together with opposite polarization to produce an output. In this way, an equal change in temperature at both of the pyroelectric sensing elements will cancel out in the output signal, thus filtering out temperature changes in the environment. However, a change in temperature at only one of the pyroelectric sensing elements of the second PIR sensor 906(2) will result in an output signal that is positive or negative (depending on which pyroelectric sensing element experienced the change in temperature).

In some instances, the second PIR sensor 906(2) may include two slots, each providing an optical path to one of the pyroelectric sensing elements. Features of a Fresnel lens formed by or within a portion of the lens 128 are configured to direct light onto the pyroelectric sensing elements.

In some instances, such as in the case that the device 100 includes two PIR sensors, the Fresnel lens array is configured to direct light received at a first portion of the lens 128 (e.g., upper half) onto the pyroelectric sensing elements of the first PIR sensor 906(1) and to direct light received at a second portion of the lens 128 (e.g., lower half) onto the pyroelectric sensing elements of the second PIR sensor 906(2). The first PIR sensor 906(1) and the second PIR sensor 906(2) may be analog, with an analog signal output, or may be digital, with digital data output generated utilizing an analog-to-digital converter (ADC).

In some instances, the device 100 may include the first PIR sensor 906(1) and the second PIR sensor 906(2) to detect objects. For example, the first PIR sensor 906(1) and the second PIR sensor 906(2) may output a signal or sensor data, where the device 100 uses a characteristic determined using the signal or sensor data to determine whether the first PIR sensor 906(1) and/or the second PIR sensor 906(2) detected an object. The characteristic may include a voltage represented by the signal or sensor data, an amplitude of a wave generated or determined using the signal or sensor data, an angle of the wave generated using the signal or sensor data, and/or the like.

In some instances, an interior surface of the lens 128 includes a Fresnel lens that directs light to the first PIR sensor 906(1) and the second PIR sensor 906(2), respectively.

Fresnel lenses are commonly used in optics as a way to focus light (e.g., infrared light). An example Fresnel lens may have a smooth exterior surface and an interior surface having surface features (e.g., a curved surface) that causes refraction of light rays that pass through that feature. These surface features may be curved surfaces having a curvature designed to direct light to a focal point. Features or lens portions designed to direct light to a focal point may be characterized as lens facets. The curved nature of these facets may cause the thickness of a lens at a perimeter or side of one facet to be mismatched from the thickness of the lens at a perimeter or side of an adjoining facet. These mismatched "heights" may be connected together by a surface that can be characterized as a translation edge.

In some instances, the facets and translation edges of a Fresnel lens may resemble, form, or represent grooves in a surface of the Fresnel lens. In some instances, these grooves may take the form of concentric arcs. These concentric arcs may be defined relative to a center point that corresponds to a focal point for the lens.

In some instances, a Fresnel lens may include a plurality of lens sections that each have their own focal point. A lens section may include curved surfaces shaped and dimensioned to direct light onto the respective focal point of the lens section. A lens section may include facets and translation edges that resemble, form, or represent grooves in the shape or pattern of concentric arcs defined relative to a center point that corresponds to a focal point for the lens section.

In some instances, a Fresnel lens including a plurality of lens sections is arranged in front of first and second PIR sensors, with a first plurality of the lens sections (e.g., a top row of lens sections) being shaped, dimensioned, and positioned to direct light onto the first PIR sensor, a second plurality of the lens sections (e.g., a middle row of lens sections) being shaped, dimensioned, and positioned to direct light onto the second PIR sensor, and a third plurality of the lens sections (e.g., a bottom row of lens sections) being shaped, dimensioned, and positioned to direct light onto the second PIR sensor.

In some instances, the Fresnel lens array may include individual lens elements that are assembled together to form the Fresnel lens array. That is, in some instances, lens elements or lens sections may be individually formed, and thereafter, may be assembled together to form a Fresnel lens or lens array. These individual lens elements or sections, as noted above, may include respective concentric grooves In some instances, a Fresnel lens or Fresnel lens array may include multiple focal lengths. Stated alternatively, lens sections or elements may include different focal lengths. However, the lens sections or lens elements that make up a Fresnel lens or Fresnel lens array may have a common focal point for sensing via PIR sensor(s). As such, the PIR sensor(s) may be located at the focal point.

In some instances, a Fresnel lens or lens array is configured to direct light rays to two PIR sensors. A Fresnel lens array may be symmetrical about a central axis/plane, such that a first half includes the same (or similar) lens elements (and translation edges) as a second half Although described as directing light rays to two PIR sensors, a device (or other system) employing a Fresnel lens or lens array may include more than or less than two PIR sensors.

Lens elements or sections may couple to one another in order to form a Fresnel lens array. In some instances, the lens elements may be adhered to one another, bonded to one another, sonically welded to one another, and so forth. However, although described as being separate lens elements that are individually formed from separate pieces of material, in some instances, a Fresnel lens or lens array may be made up of a single piece of material, and the lens elements or sections with the different concentric grooves may be formed within the single piece of material. In this instance, the individual lens elements or sections may not be coupled together to form the Fresnel lens or lens array, but the Fresnel lens or lens array may include a unitary structure with facets and translation edges defining concentric grooves being formed therein.

In some instances, individual lens elements or sections may include different or similar shapes and/or sizes compared to one another. For example, certain lens elements or sections may be square-shaped, while other lens elements may be rectangular-shaped, or have curved edges, etc.

In accordance with one or more preferred implementations, a mold for a Fresnel lens or lens array is manufactured by using a diamond lathe, and the mold is used to injection mold a lens or lens array. In some instances, a lens is formed from HDPE, silicon, germanium, zinc-sulfide, or zinc-selenide.

In accordance with one or more preferred implementations, a Fresnel lens may include a plurality of features that are etched, milled, cut, molded, or otherwise formed within a rearward surface oriented towards the first PIR sensor 906(1) and the second PIR sensor 906(2). The Fresnel lens may determine or increase a FoV of the first PIR sensor 906(1) and the second PIR sensor 906(2) for detecting motion within the environment. An example Fresnel lens array is described in, for example, U.S. patent application Ser. No. 17/990,200, filed Nov. 18, 2022, entitled "Fresnel Lens with Variable-Angle Translation Edges." This patent application, as well as any publications thereof or patents issuing therefrom, are hereby incorporated herein by reference.

In some instances, a device utilizes two analog PIR sensors, such as a first PIR sensor 906(1) and a second PIR sensor 906(2) that are both analog PIR sensors. Each analog PIR sensor provides an analog signal with a voltage level representing a summed voltage from two opposite polarity pyroelectric sensing elements.

In some instances, an integrated circuit component of an analog PIR sensor, such as a summing amplifier or op-amp voltage adder, sums together a voltage of a first signal for a first pyroelectric sensing element and a voltage of a second signal for a second pyroelectric sensing element. In some instances, an analog PIR sensor provides this summed voltage as output.

In some instances, an analog PIR sensor is configured such that a first signal for a first pyroelectric sensing element has a first polarity and a second signal for a second pyroelectric sensing element has a second polarity, such that an equal change in temperature at both of the pyroelectric sensing elements will cancel out in a summed output signal, thus filtering out temperature changes in the environment. However, a change in temperature at only one of the pyroelectric sensing elements will result in an output signal that is positive or negative (depending on which pyroelectric sensing element experienced the change in temperature).

In some instances, a summed voltage output from a first analog PIR sensor (e.g., the first PIR sensor 906(1)) and a summed voltage output from a second analog PIR sensor (e.g., the second PIR sensor 906(2)) are provided as input to an integrated circuit component. In some instances, an operational amplifier is utilized to determine a combined signal based on the two signals. In some instances, an operational amplifier is utilized to sum together the two signals. In some instances, output from one of the analog PIR sensors is inverted with respect to the other, and a differential amplifier is utilized to determine a difference between the two signals.

In some instances, this inversion is accomplished via an electrical component. In some instances, this inversion is accomplished by orienting the first and second PIR sensors generally parallel to one another along a first axis (e.g., with the first PIR sensor disposed above the second PIR sensor) with a first pyroelectric sensing element of the first PIR sensor associated with a first polarity (e.g. a positive polarity) being disposed on a first side (e.g. a left side), and a second pyroelectric sensing element of the first PIR sensor associated with a second polarity (e.g. a negative polarity) being disposed on a second side (e.g. a right side), a first pyroelectric sensing element of the second PIR sensor associated with the second polarity (e.g. a negative polarity) being disposed on the first side (e.g. the left side), and a second pyroelectric sensing element of the second PIR sensor associated with the first polarity (e.g. the positive polarity) being disposed on the second side (e.g. the right side). In accordance with one or more preferred implementations, this inversion is accomplished by using two identical analog PIR sensors, and installing one upside down relative to the other one.

In some instances, the inverted polarity of a first signal from a first analog PIR sensor relative to a second signal from a second analog PIR sensor causes a differential amplifier to effectively sum together magnitudes of the two signals.

As noted above, in some instances, a summed voltage output from a first analog PIR sensor (e.g., first PIR sensor 906(1)) and a summed voltage output from a second analog PIR sensor (e.g., second PIR sensor 906(2)) are provided as input to an integrated circuit component, and an operational amplifier is utilized to determine a combined signal based on the two signals. In some instances, the operational amplifier operates to generate a combined magnitude value for the two signals (e.g. by summing together the two signals or by determining a difference between the two signals where one of the signals is effectively inverted).

In some instances, such a combined signal is utilized to determine whether to send a signal indicating that motion has been detected. In accordance with one or more preferred implementations, a voltage level of an analog signal is compared to determine whether to send a signal indicating that motion has been detected. In some instances, an analog to digital converter is utilized to determine a voltage value of an analog signal, and a determined value is compared to a threshold to determine whether to send a signal indicating that motion has been detected.

In some instances, an integrated circuit component determines whether a voltage value exceeds a first threshold, and, if so, sends a logic signal (e.g. a Boolean value or an interrupt) to a controller (e.g. a microcontroller unit or MCU) of an electronic device, indicating that motion has been detected.

In some instances, an integrated circuit component determines whether a number of voltage values within a time period exceed a first threshold, and, if so, sends a logic signal (e.g. a Boolean value or an interrupt) to a controller (e.g. a microcontroller unit or MCU) of an electronic device, indicating that motion has been detected.

Figure 37:
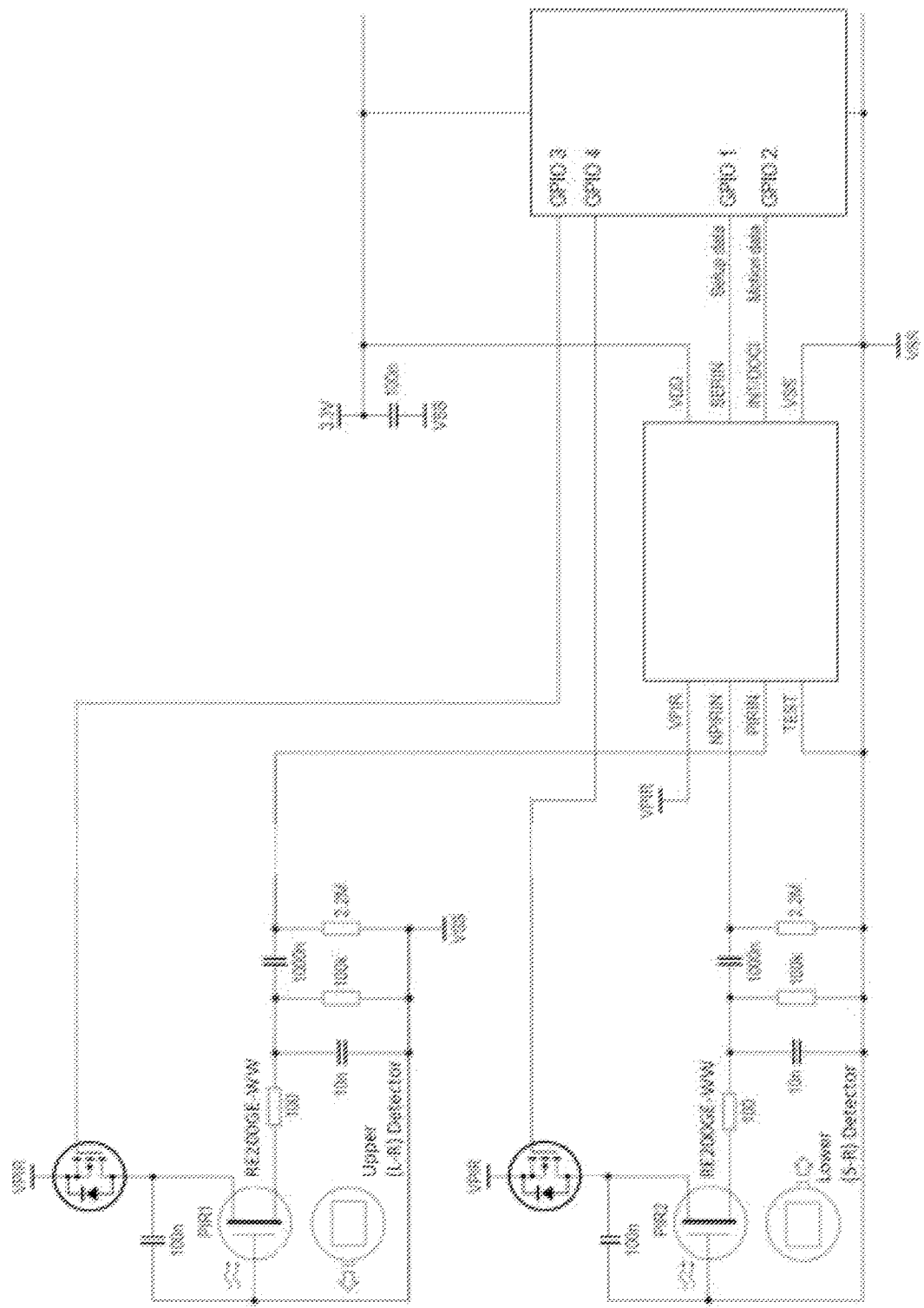
FIG. 37 illustrates an exemplary circuit diagram for passive infrared sensor components, according to examples of the present disclosure.

As noted above, in some instances, an operational amplifier operates to generate a combined magnitude value for a first signal from a first analog PIR sensor and a second signal from a second analog PIR sensor (e.g. by summing together the two signals or by determining a difference between the two signals where one of the signals is effectively inverted). FIG. 37 illustrates an exemplary circuit implementing such an approach.

In some instances, the first and second analog PIR sensors are oriented along a first axis, with a first pyroelectric sensing element of the first analog PIR sensor associated with a first polarity and a second pyroelectric sensing element of the second analog PIR sensor associated with a second polarity being lined up generally along an axis parallel with the first axis (e.g. on a left side), and a second pyroelectric sensing element of the first analog PIR sensor associated with the second polarity and a first pyroelectric sensing element of the second analog PIR sensor associated with the first polarity being lined up generally along an axis parallel with the first axis. The inverted polarity of a first signal from a first analog PIR sensor relative to a second signal from a second analog PIR sensor causes a differential amplifier of an integrated circuit component to effectively sum together magnitudes of the two signals.

One or more Fresnel lens elements direct light from a first field of view to the first analog PIR sensor, and one or more Fresnel lens elements direct light from a second field of view to the second analog PIR sensor, with the first field of view extending farther from the electronic device (and more upward) as compared with the second field of view. Because the inverted polarity of a first signal from a first analog PIR sensor relative to a second signal from a second analog PIR sensor causes a differential amplifier of the integrated circuit component to effectively sum together magnitudes of the two signals, detection is enhanced when a person is within both the first field of view and the second field of view. Based on the configuration of the field of views, this generally corresponds to a "mid-range", lying between a closest range of the second field of view and a farthest range of the first field of view.

In some instances, the lighting element 1006, the ambient light sensor 1004, the camera 124, the first PIR sensor 906(1), and the second PIR sensor 906(2) may be vertically aligned. In some instances, the lighting element 1006, the ambient light sensor 1004, the camera 124, the first PIR sensor 906(1), and the second PIR sensor 906(2) may be centrally aligned on the device 100, between the first side 116 and the second side 118. As shown, and in some instances, the first PIR sensor 906(1) and the second PIR sensor 906(2) may be interposed between the camera 124 and the speaker 904. Moreover, in some instances, the ambient light sensor 1004 may be interposed between the lighting element 1006 and the camera 124. In some instances, the microphone 1002 may be located vertically above the second IR lighting element 1000(2). In some instances, the second lighting element 1006(2) and the microphone 1002 are horizontally aligned, and/or the IR lighting elements 1000 may be aligned with the ambient light sensor 1004. However, although the lighting elements 1006, the ambient light sensor 1004, the camera 124, the first PIR sensor 906(1), and the second PIR sensor 906(2) are shown at a certain position and/or orientation, the lighting elements 1006, the ambient light sensor 1004, the camera 124, the first PIR sensor 906(1), and/or the second PIR sensor 906(2) may be arranged differently than shown and described.

In addition to defining the orifices 132, the third cover 130 may define various cutouts, receptacles, and the like for receiving the window 126 and the lens 128. In some instances, the window 126 and the lens 128 may couple to the third cover 130 via snap-fits, fasteners, adhesives, and so forth. The third cover 130 may also define various keyways, slots, and so forth that receive corresponding features of the window 126 and/or the lens 128 for aligning or coupling the window 126 and/or the lens 128 to the third cover 130.

Figure 11:
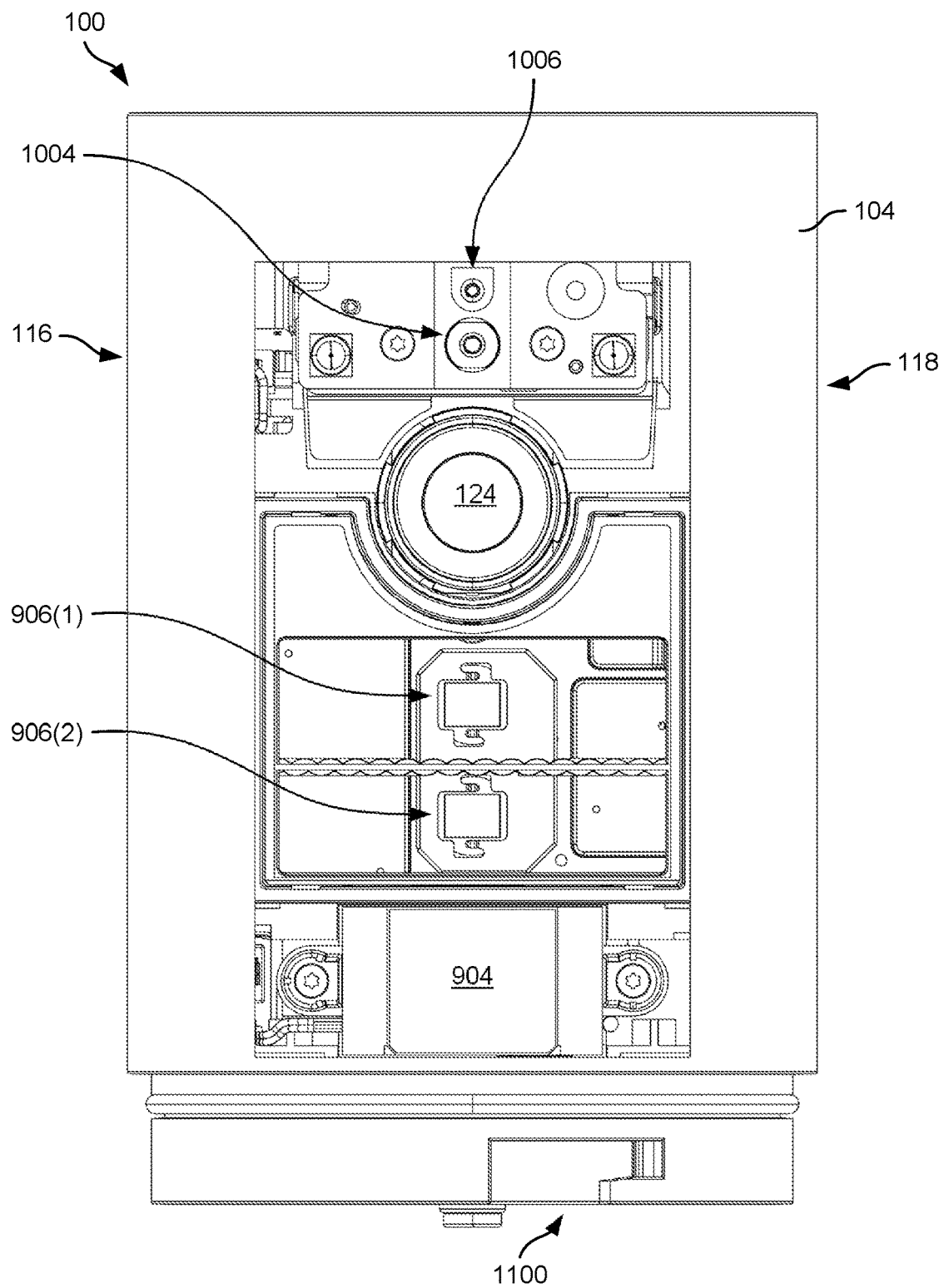
FIG. 11 illustrates example components disposed within the camera assembly of the device of FIG. 1, according to an example of the present disclosure.

FIG. 11 illustrates a front view of the device 100, showing the third cover 130 removed, according to examples of the present disclosure. Removing the third cover 130 exposes the speaker 904, which is arranged and oriented to output sound through the orifices 132. In some instances, the speaker 904 is vertically aligned with the ambient light sensor 1004, the lighting element 1006, the camera 124, the first PIR sensor 906(1), and/or the second PIR sensor 906(2).

The camera assembly 102, or the housing 104, may define first attachment mechanisms 1100, which in some instances, may be arranged at the bottom 114. The first attachment mechanisms 1100 are configured to engage with second attachment mechanisms of the second cover 108, or second attachment mechanism disposed on accessories that may couple to the camera assembly 102. In some instances, the first attachment mechanisms 1100 may resemble tabs, hooks, protrusions, keys, keyways, slots, or other male/female connectors that are complimentary to engage with the second attachment mechanisms (e.g., tabs, hooks, protrusions, keys, keyways, slots, or other male/female connectors).

The first attachment mechanisms 1100 may engage with the second attachment mechanisms when the housing 104, the second cover 108, and/or the accessory is rotated. That is, the first attachment mechanisms 1100 may engage with and secure to the second attachment mechanisms when the housing 104, the second cover 108, and/or the accessory are rotated into contact with one another. As an example, the first attachment mechanisms 1100 may include a keyway, and the second attachment mechanisms may include a hook or a tab that is configured to engage with the keyway when rotated. In some instances, rotation in a first direction (e.g., clockwise about the Y-axis) may engage the first attachment mechanisms 1100 and the second attachment mechanisms, while rotation in a second direction (e.g., counterclockwise about the Y-axis) may disengage the first attachment mechanisms 1100 and the second attachment mechanisms.

In some instances, the first attachment mechanisms 1100 may be formed on and/or within the exterior surface of the housing 104. The first attachment mechanisms 1100 may be disposed annularly around a perimeter at the bottom 114 of the camera assembly 102. The perimeter of the housing 104 is insertable into the second cover 108, for example, or stated alternatively, a portion of the second cover 108 is configured to be disposed over the perimeter of the housing 104 for engaging the first attachment mechanisms 1100 and the second attachment mechanisms. Any number of the first attachment mechanisms 1100 and second attachment mechanisms may be included. For example, the housing 104 may include three of the first attachment mechanisms 1100 that engage with three of the second attachment mechanisms, respectively. However, more than or less than three of the first attachment mechanisms 1100 and the second attachment mechanisms may be included.

Figure 12:
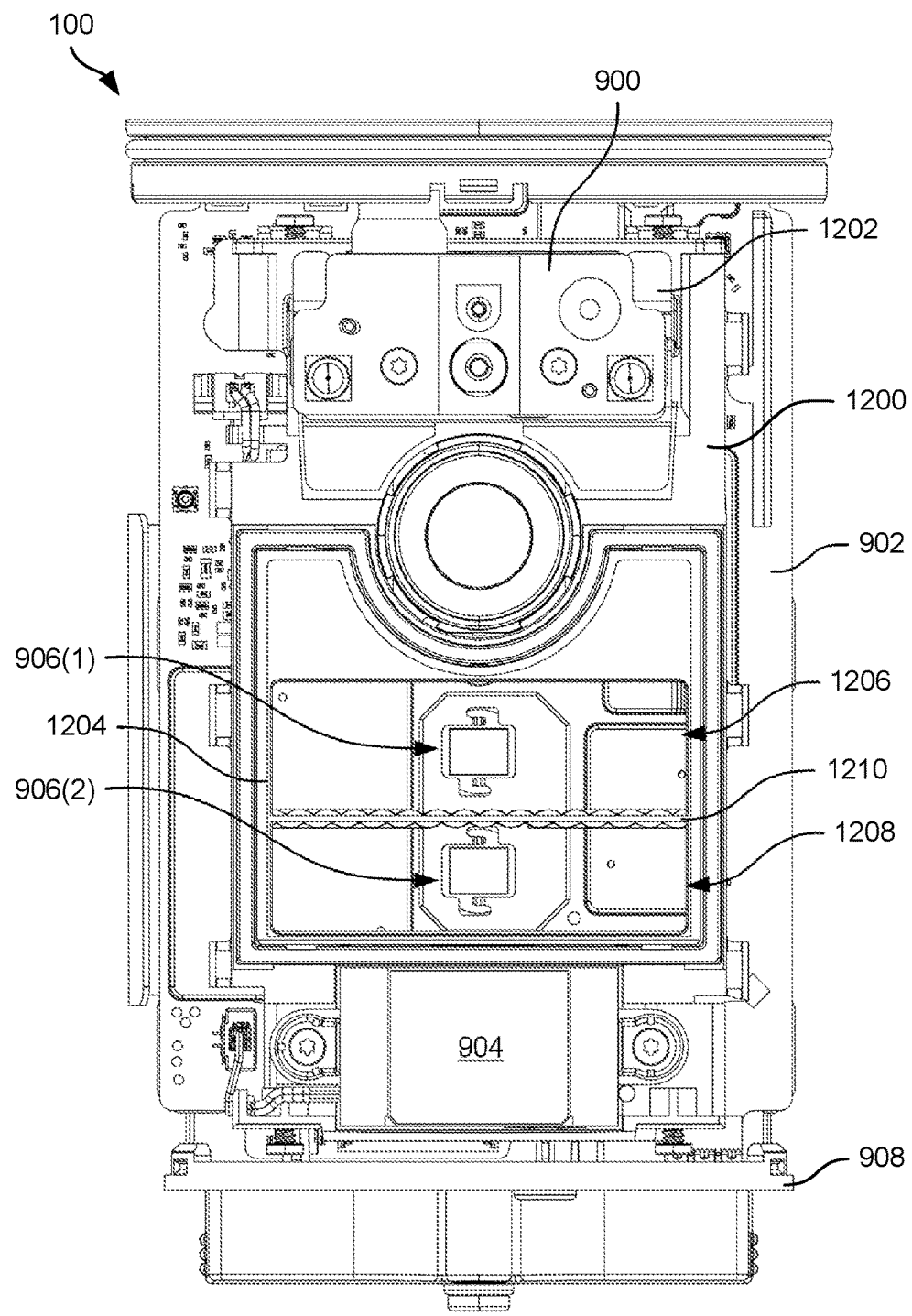
FIG. 12 illustrates example components disposed within the camera assembly of the device of FIG. 1, according to an example of the present disclosure.

FIG. 12 illustrates a front view of the device 100, showing the housing 104 removed, according to examples of the present disclosure. In some instances, the first PCB 900 and/or the second PCB 902 may be coupled to a frame 1200, which in turn, may be coupled to the battery housing 908. In some instances, the first PCB 900 may couple to the frame 1200 via a bracket 1202. In some instances, the first PCB 900 may be disposed on a first side of the frame 1200, while the second PCB 902 may be disposed on a second side of the frame 1200 opposite the first side. Additionally, in some instances, the speaker 904 may couple to the frame 1200.

As will be discussed herein, the frame 1200 may define a window 1204 such that the first PIR sensor 906(1) and the second PIR sensor 906(2) receive light from the environment. In some instances, the window 1204 may include a first section 1206 and a second section 1208 arranged vertically below the first section 1206. A divider 1210 may be disposed between the first section 1206 and the second section 1208 for separating light received via the first PIR sensor 906(1) and the second PIR sensor 906(2), respectively.

Figure 13:
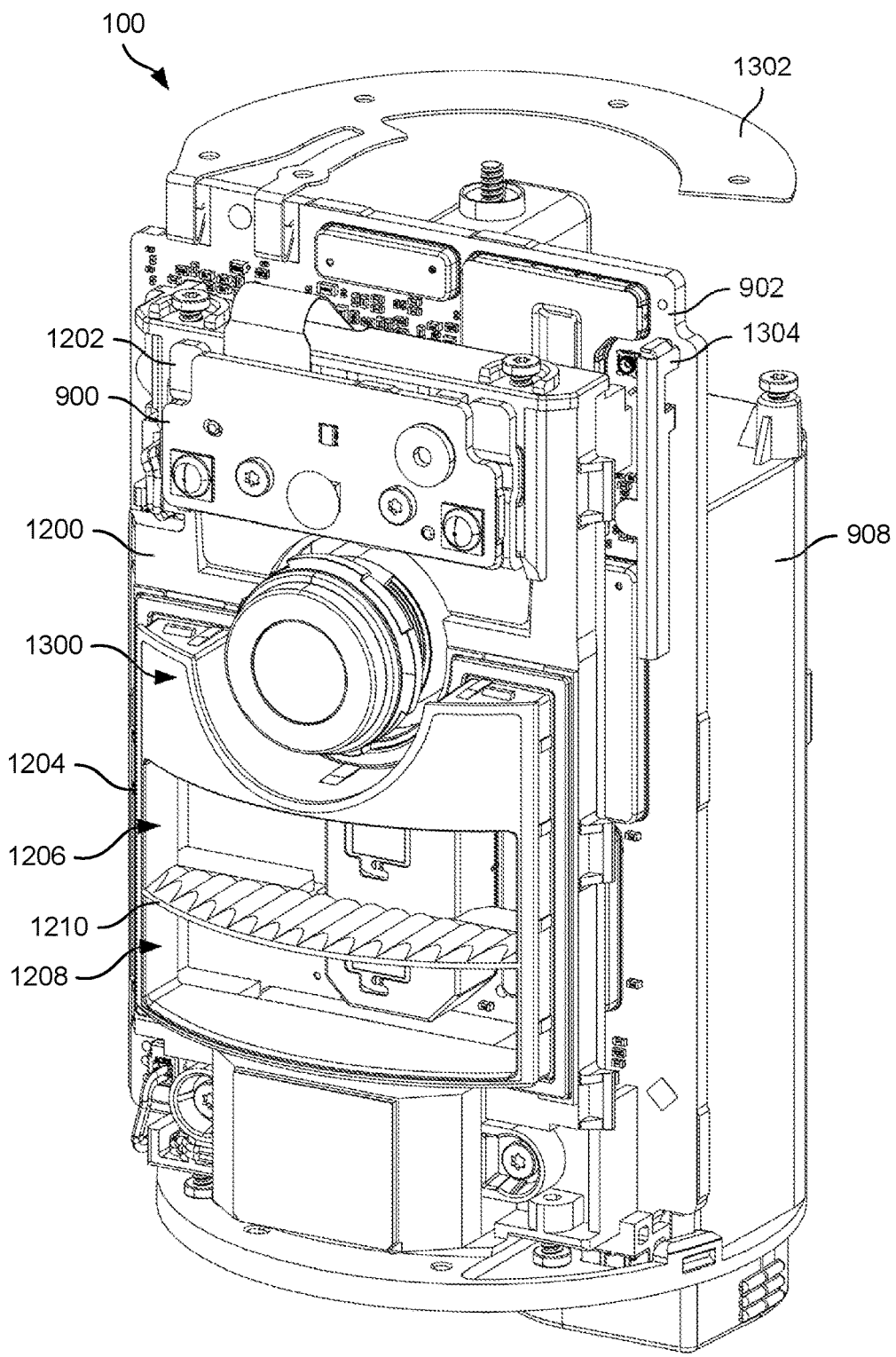
FIG. 13 illustrates example components disposed within the camera assembly of the device of FIG. 1, according to an example of the present disclosure.
Figure 13:
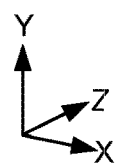

FIG. 13 illustrates a front perspective view of the device 100, showing the first cover 106 removed, according to examples of the present disclosure. As introduced above, the first PCB 900 may be disposed on a first side of the frame 1200, while the second PCB 902 may be disposed on a second side of the frame 1200. In some instances, the first PCB 900 couples to the frame 1200 via the bracket 1202. The frame 1200, in addition to defining the window 1204 having the first section 1206, the second section 1208, and the divider 1210, may define an indentation 1300 that at least partially wraps around the camera 124 (or a body of the camera 124). As shown, the indentation 1300 may be half circular shaped for accommodating the camera 124. The first PCB 900, the second PCB 902, and/or the frame 1200 may couple to the battery housing 908.

The device 100 may include antennas for communicatively coupling with other devices. In some instances, the device 100 includes a first antenna 1302 and a second antenna 1304. The first antenna 1302 may be disposed proximate to the top 112. In some instances, and as shown, the first antenna 1302 may include a circular shape. In some instances, the first antenna 1302 may couple to an underneath side of the first cover 106, and communicatively coupled to the second PCB 902 via one or more prongs when the device 100 is assembled. The second antenna 1304 may be disposed beneath or adjacent to the second side 118 of the camera assembly 102. In some instances, the second antenna 1304 couples to the second PCB 902.

Figure 14:
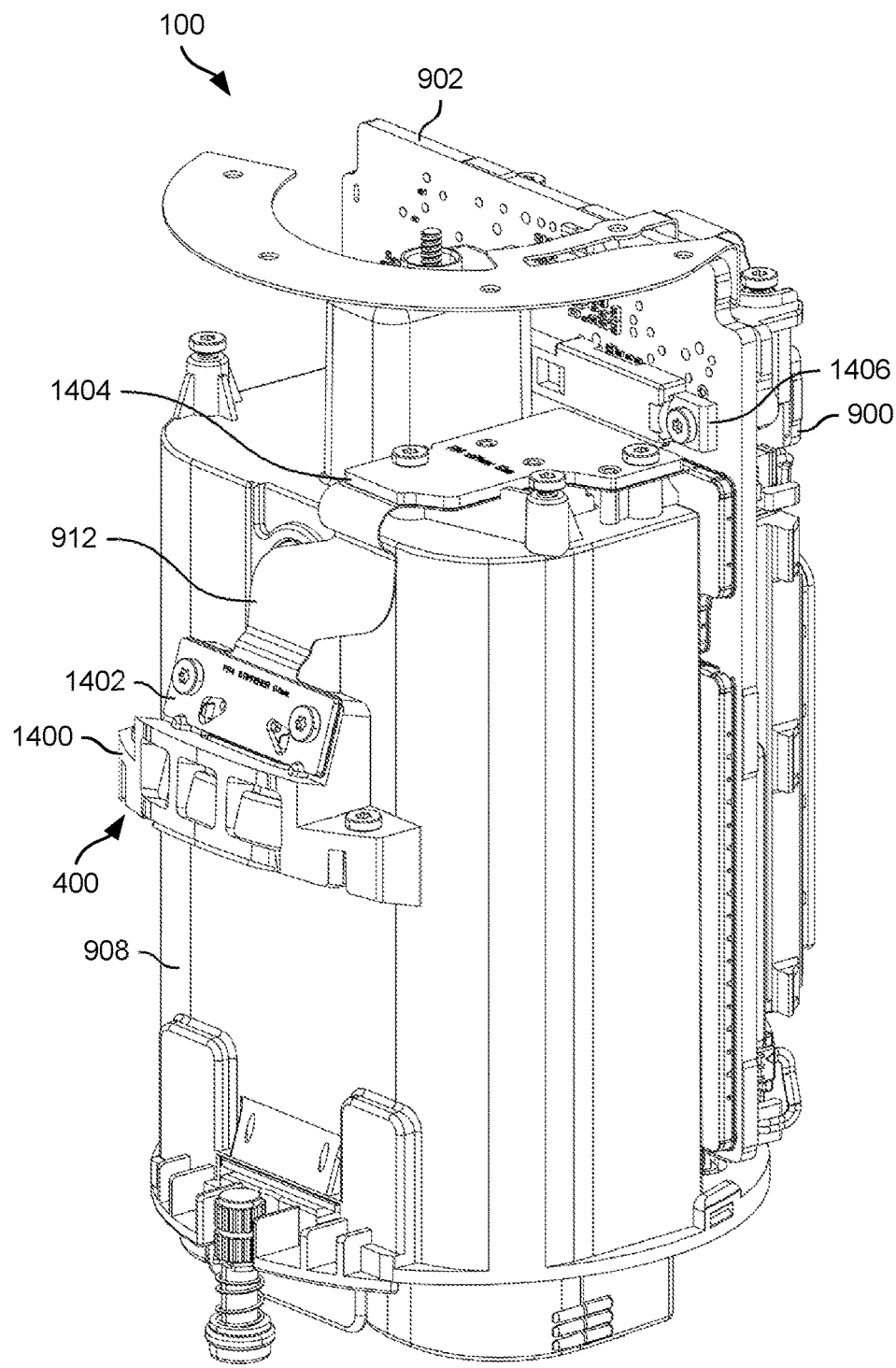
FIG. 14 illustrates an example battery housing disposed within the camera assembly of the device of FIG. 1, showing example components coupled thereto, according to an example of the present disclosure.

FIG. 14 illustrates a rear perspective view of the device 100, according to examples of the present disclosure. The FPC 912 may route from the port 400 to the first PCB 900 and/or the second PCB 902 in order to supply power to components of the device 100 and/or communicatively couple components of the device 100 to one another.

Between the port 400 and the first PCB 900 and/or the second PCB 902, the FPC 912 may be secured in place. For example, a mount 1400 may be coupled to the battery housing 908, and the FPC 912 may be coupled to the mount 1400. In some instances, a first plate 1402 with fasteners disposed therethrough may secure the first plate 1402 to the mount 1400. The mount 1400, in some instances, may define the port 400. As shown, the mount 1400 may be coupled to the battery housing 908 proximate to the back 122.

The FPC 912 may route alongside an end of the battery housing 908, opposite an end of the battery housing 908 in which the battery 910 is inserted. Along the end of the battery housing 908, the FPC 912 may communicatively connect to the battery 910 (e.g., via a pinned connection). Such communicative connection may charge the battery 910, such as in instances in which the battery 910 is being charged via a cable coupled to the port 400, may provide power to components of the device 100, such as in instances in which the device 100 is mains powered, and/or may provide power from the battery 910 to the components of the device 100, such as in instances in which the device 100 is being powered via the battery 910. In some instances, the FPC 912 couples to the battery housing 908 via a second plate 1404 and fasteners disposed therethrough.

The FPC 912 may also be coupled to the second PCB 902 via a third plate 1406. For example, fasteners may be disposed through the third plate 1406 and into the second PCB 902 for securing the FPC 912 thereto. In some instances, the fasteners may be disposed through the second PCB 902 and into the frame 1200 for securing the third plate 1406 and the FPC 912 in place. In some instances, the FPC 912 connects to the second PCB 902 at a side opposite the camera 124, the first PIR sensor 906(1), and/or the second PIR sensor 906(2). As will be discussed herein, other cables, wires, FPCs, etc. may communicatively couple the second PCB 902 to the first PCB 900.

Figure 15:
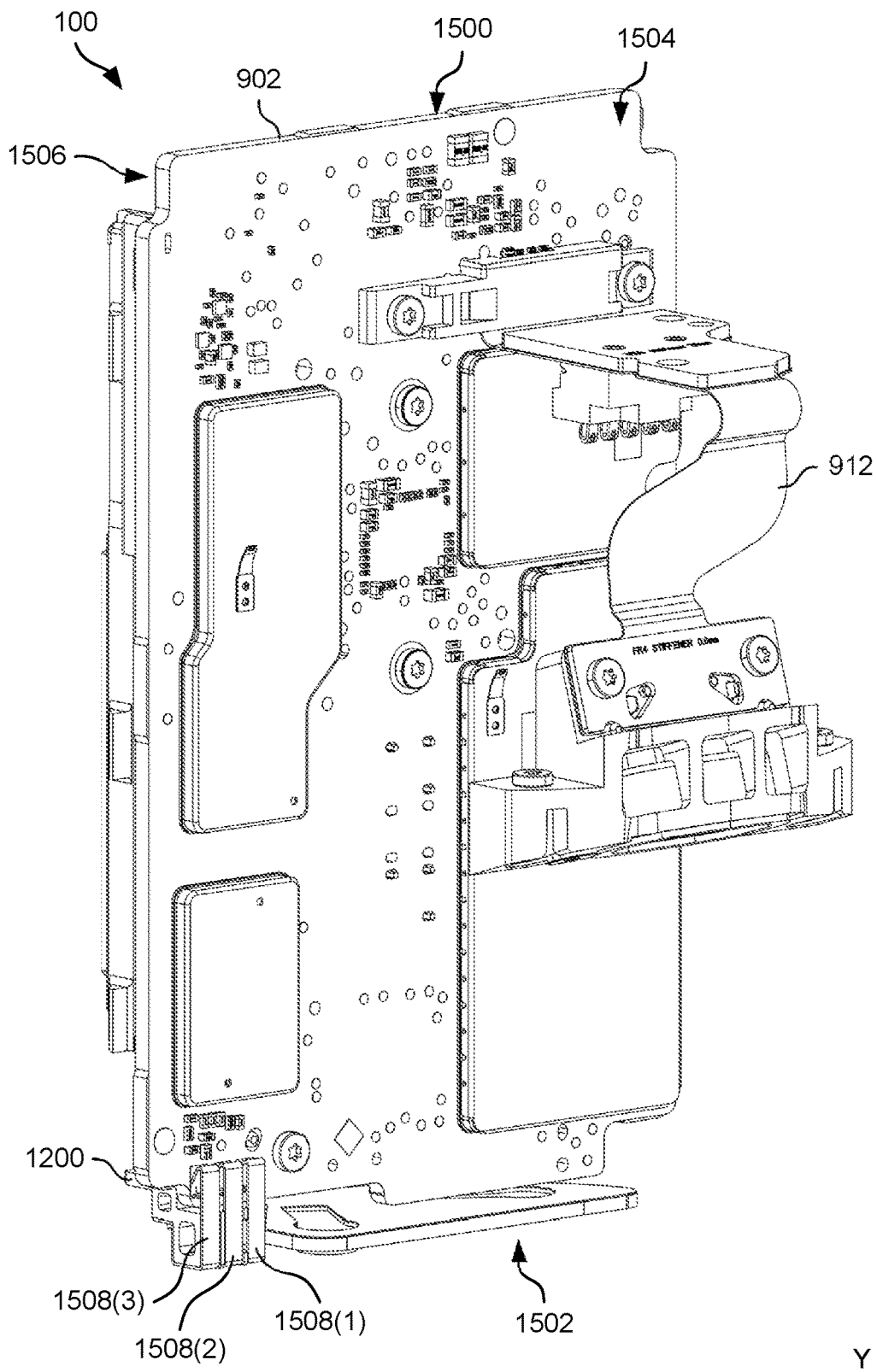
FIG. 15 illustrates example components disposed within the camera assembly of the device of FIG. 1, according to an example of the present disclosure.

FIG. 15 illustrates a rear perspective view of the device 100, showing the battery housing 908 and the battery 910 removed, according to examples of the present disclosure.

In some instances, the second PCB 902 may include a first end 1500 and a second end 1502 opposite the first end 1500 (e.g., spaced apart in the Y-direction). In some instances, the FPC 912 may couple to a second side 1504 of the second PCB 902, opposite a first side 1506 in which the camera 124 is disposed. As shown, the FPC 912 may connect to the second side 1504 of the second PCB 902 proximate to the first end 1500. The second side 1504 of the second PCB 902 may also include various shielding plates, foams, and the like dispose over computing components of the device 100. For example, in some instances, various shielding plates and/or shielding foams may be disposed over components of the device 100, such as component circuitry (e.g., processor(s), memory, capacitors, resistors, modules, etc.).

The second PCB 902 may also include contacts 1508 that communicatively connect the second PCB 902, or more generally, the device 100, to one or more accessories. In some instances, the contacts 1508 are disposed at or proximate to the second end 1502 of the second PCB 902. As shown, the contacts 1508 may include three contacts, such as a first contact 1508(1), a second contact 1508(2), and a third contact 1508(3). In some instances, the first contact 1508(1) may correspond to a ground contact, the second contact 1508(2) may correspond to a signal (e.g., digital) contact, and the third contact 1508(3) may correspond to a power contact. As will be discussed herein, in instances in which an accessory attaches to the camera assembly 102, and the accessory includes computing components (e.g., lights, motors, etc.), the contacts 1508 may serve to transfer power, signals, data, and so forth between the camera assembly 102 and the accessory. In some instances, the contacts 1508 may wrap or be disposed around a portion of the frame 1200. The contacts 1508 may be the same size, or in some instances, the contacts 1508 may be sized differently. As shown, the contacts 1508 are communicatively connected to the second PCB 902.

Figure 16:
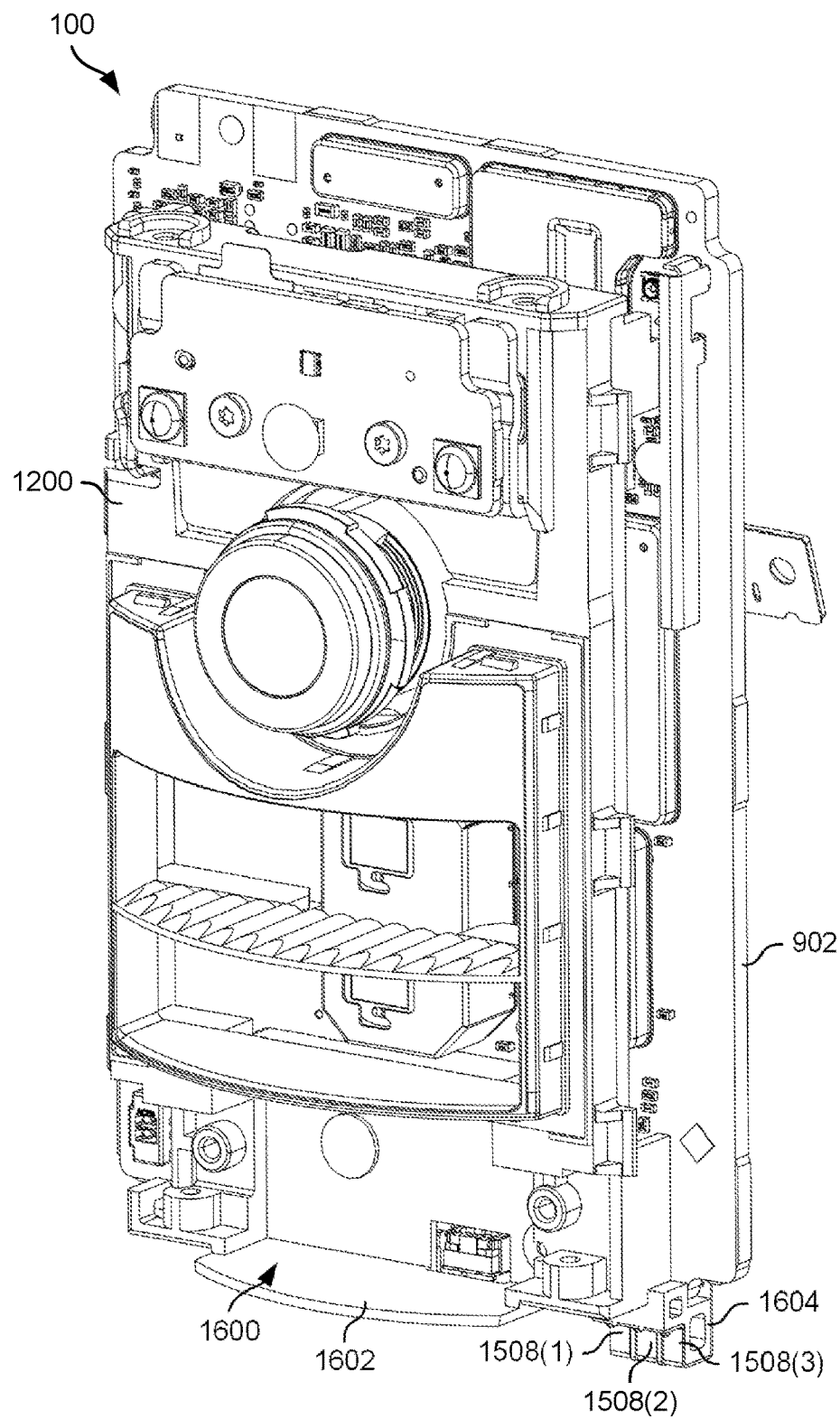
FIG. 16 illustrates example components disposed within the camera assembly of the device of FIG. 1, according to an example of the present disclosure.
Figure 16:
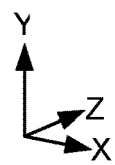

FIG. 16 illustrates a front perspective view of the device 100, showing the speaker 904 removed, according to examples of the present disclosure. In some instances, the frame 1200 includes a chamber 1600 for receiving the speaker 904. The frame 1200 may also include a shelf 1602 upon which a portion of the speaker 904 rests or sits. The contacts 1508, such as the first contact 1508(1), the second contact 1508(2), and the third contact 1508(3) may wrap or be disposed around a post 1604 of the frame 1200. As such, the contacts 1508 may wrap around the second PCB 902, from the first side 1506 to the second side 1504. The post 1604 may provide support to the contacts 1208.

Figure 17:
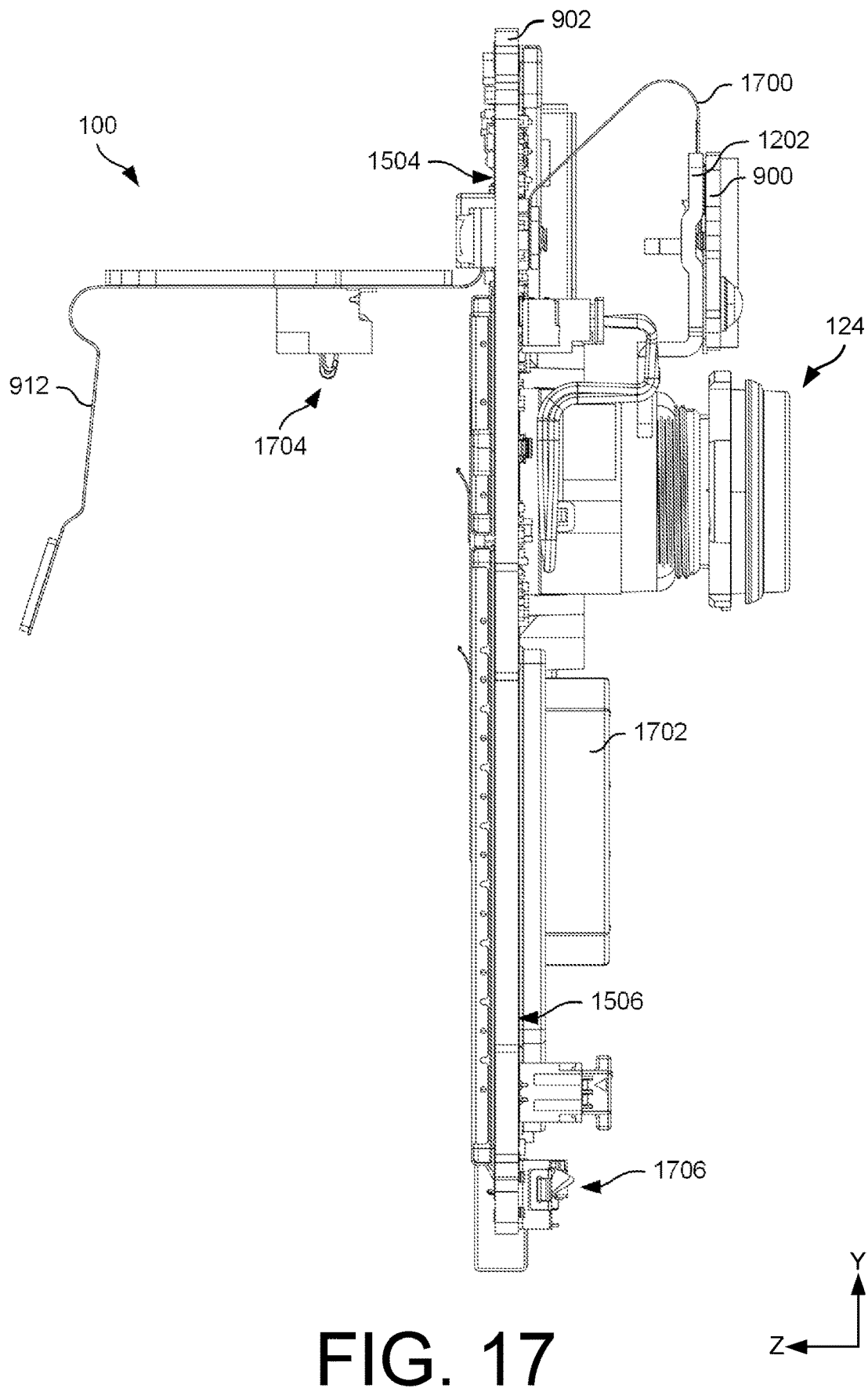
FIG. 17 illustrates example printed circuit boards (PCBs) disposed within the camera assembly of the device of FIG. 1, according to an example of the present disclosure.

FIG. 17 illustrates a side view of the first PCB 900, the second PCB 902, the FPC 912, and components of the camera assembly 102, according to examples of the present disclosure.

The first PCB 900 is shown disposed in front of (e.g., more proximate to the front 120) the second PCB 902. In some instances, the first PCB 900 couples or mounts to the bracket 1202, which in turn, couples or mounts to the frame 1200. The camera 124 mounts to the first side 1506 of the second PCB 902, opposite the second side 1504 in which the FPC 912 couples to the second PCB 902. In some instances, a flex circuit 1700 may route between the first PCB 900 and the second PCB 902. The PIR sensors 906 are disposed on the first side 1506 of the second PCB 902. In some instances, the PIR sensors 906 are mounted to a PIR frame 1702 on the first side 1506.

The device 100 is also shown including pins or prongs 1704 that serve to electrically connect the FPC 912 to the battery 910. For example, the prongs 1704 may be disposed through an opening of the battery housing 908 for engaging with contacts of the battery 910. The prongs 1704 electrically connect with the FPC 912 for transferring power to the device 100, or being recharged, and so forth.

The device 100 may include a switch 1706 that deactivates and activates the camera 124, as well as other components of the device 100, such as the microphone 1002. In some instances, the switch 1706 is mounted to the second PCB 902, on the first side 1506. In FIG. 17, the switch 1706 is shown in a deactivated state. However, as will be discussed herein, a tab of the battery housing 908 may be configured to engage with the switch 1706 by translating in the Y-direction. For example, when an accessory including a privacy cover couples to the camera assembly 102, when the privacy cover is in a position associated with deactivating the camera 124, a feature of the privacy cover may engage with a lever of the switch 1706. In other words, the tab of the battery housing 908 may translate upwards to contact the lever of the switch 1706. Through a contact with the switch 1706, the camera 124 may be deactivated. The tab may be a component of the battery housing 908, where tab is configured to be deflected from a resting state to a depressed state in order to engage the switch 1706.

Figure 18:
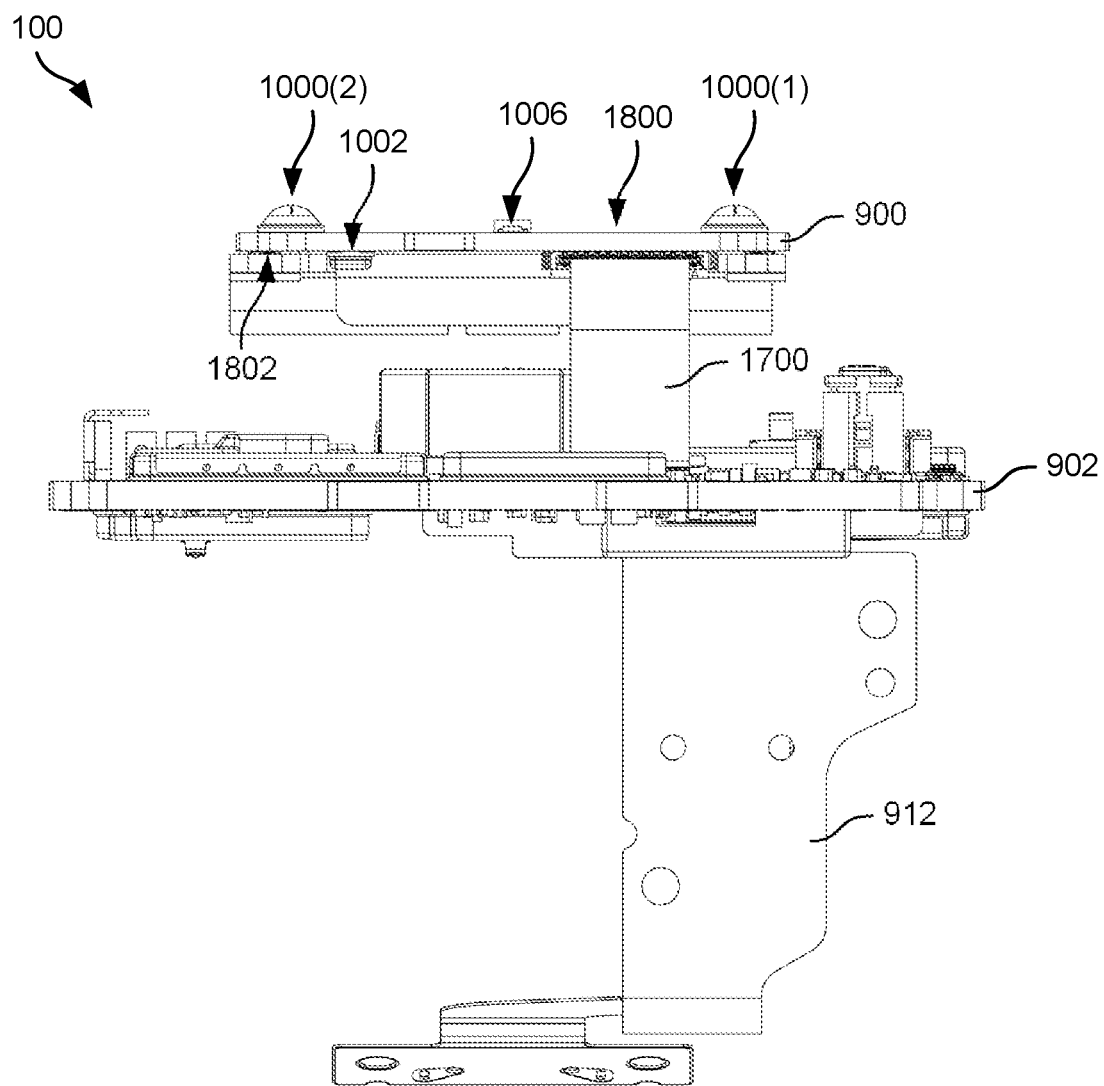
FIG. 18 illustrates the PCBs of FIG. 17, according to an example of the present disclosure.

FIG. 18 illustrates a top view of the first PCB 900, the second PCB 902, the FPC 912, and components of the camera assembly 102, according to examples of the present disclosure.

The first PCB 900 includes the first IR lighting element 1000(1), the second IR lighting element 1000(2), the lighting element 1006, the ambient light sensor 1004, and the microphone 1002. In some instances, the first IR lighting element 1000(1), the second IR lighting element 1000(2), the lighting element 1006, and the ambient light sensor 1004 are disposed on a first side 1800 of the first PCB 900, while the microphone 1002 may be disposed on a second side 1802 of the first PCB 900. The first PCB 900 may include a channel that directs sound to the microphone 1002, and the channel may align with other channels (e.g., the third channel 304) for routing sound to the microphone 1002.

The flex circuit 1700 communicatively couples the first PCB 900 and the second PCB 902, and may route between the second side 1802 of the first PCB 900 and the first side 1506 of the second PCB 902.

Figure 19:
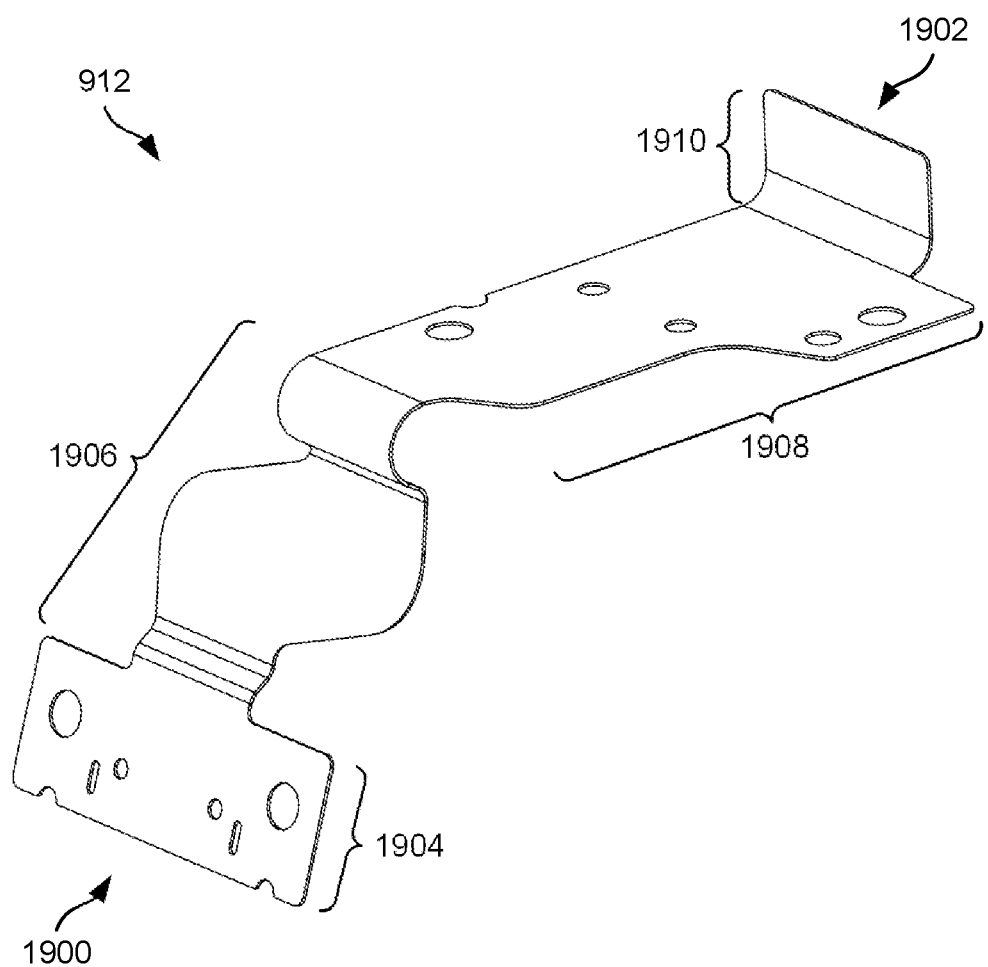
FIG. 19 illustrates an example flexible printed circuit (FPC) that communicatively connects to the PCBs of FIG. 17, according to an example of the present disclosure.
Figure 19:
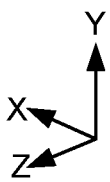

FIG. 19 illustrates a perspective view of the FPC 912, according to examples of the present disclosure. In some instances, the FPC 912 includes a first end 1900 and a second end 1902 opposite to the first end 1900. The first end 1900 may communicatively couple to the port 400, and may be coupled to the mount 1400 via the first plate 1402. The second end 1902 may communicatively connect to the second PCB 902, and/or may be coupled to the frame 1200 via the second plate 1404.

In some instances, the FPC 912 includes a first segment 1904, a second segment 1906, a third segment 1908, and a fourth segment 1910. The first segment 1904 may be disposed at the first end 1900, while the fourth segment 1910 may be disposed at the second end 1902. The second segment 1906 may be disposed between the first segment 1904 and the third segment 1908, while the third segment 1908 may be disposed between the second segment 1906 and the fourth segment 1910. The third segment 1908 may be coupled to the battery housing 908 via the second plate 1404. In some instances, the fourth segment 1910 may extend transverse to the third segment 1908. As shown, the FPC 912 may include a horky, tortuous, or other snaking profile for routing between the port 400, along/over the battery housing 908, and to the second PCB 902.

Figure 20:
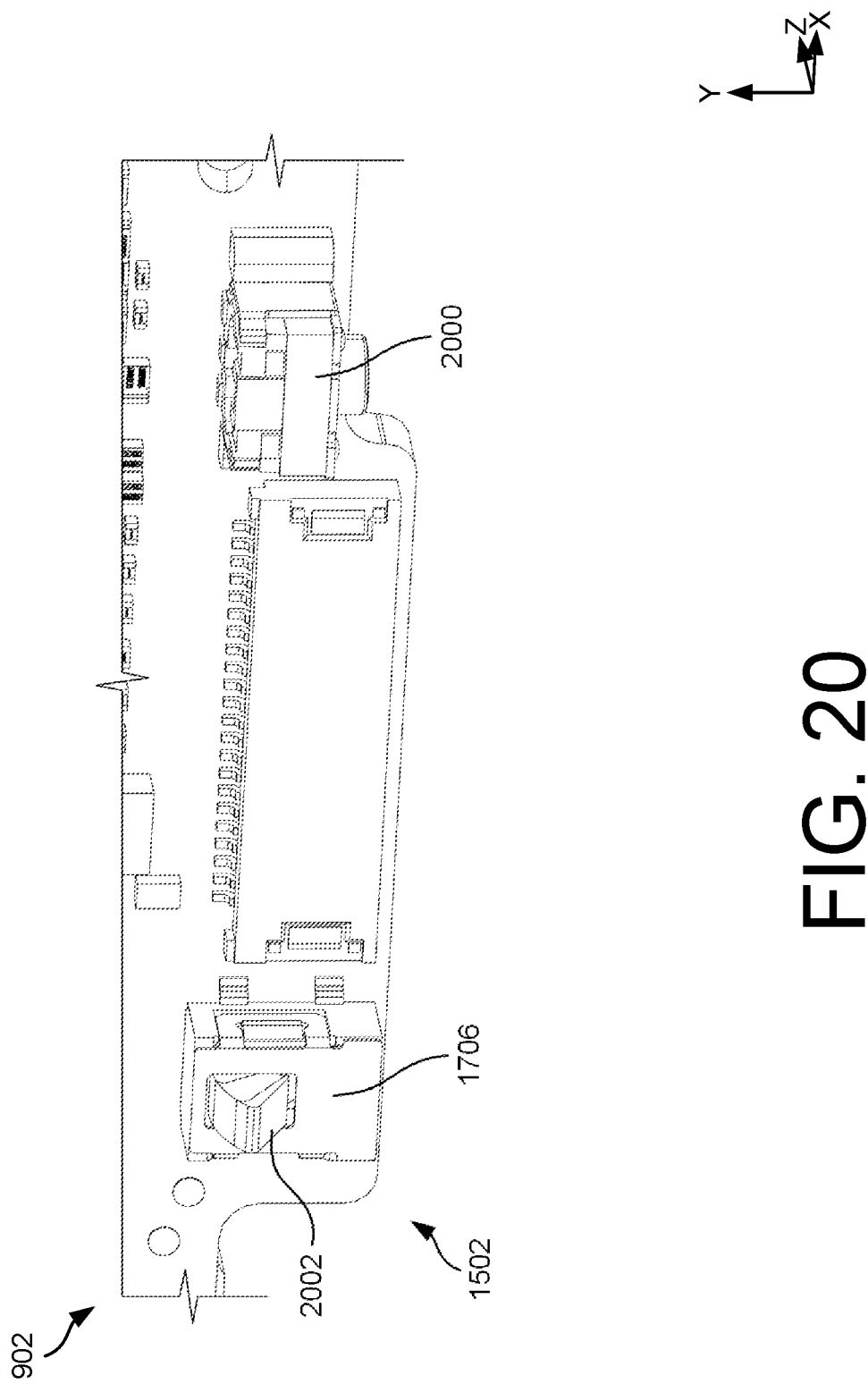
FIG. 20 illustrates an example switch and example button that at least partially control an operation of the device of FIG. 1, according to an example of the present disclosure.

FIG. 20 illustrates an end view of the second PCB 902, according to examples of the present disclosure. The second end 1502 of the second PCB 902 includes the switch 1706 and a button 2000. The switch 1706 includes the lever 2002 that is configured to be engaged by a tab of the battery housing 908. An engagement between the tab and the lever 2002 may cause the lever 2002 to rotate into the switch 1706 (e.g., about the Z-axis). In response, the switch 1706 may sense the movement of the lever 2002 and correspondingly the camera 124 and/or other components of the device 100 may be deactivated.

In some instances, the button 2000 may correspond to a reset button, a setup button, a synchronization button, and so forth. In some instances, the button 2000 may be actuated via removing the second cover 108. The button 2000 may be activated via pressing a knob on the bottom 114 of the camera assembly 102.

Figure 21:
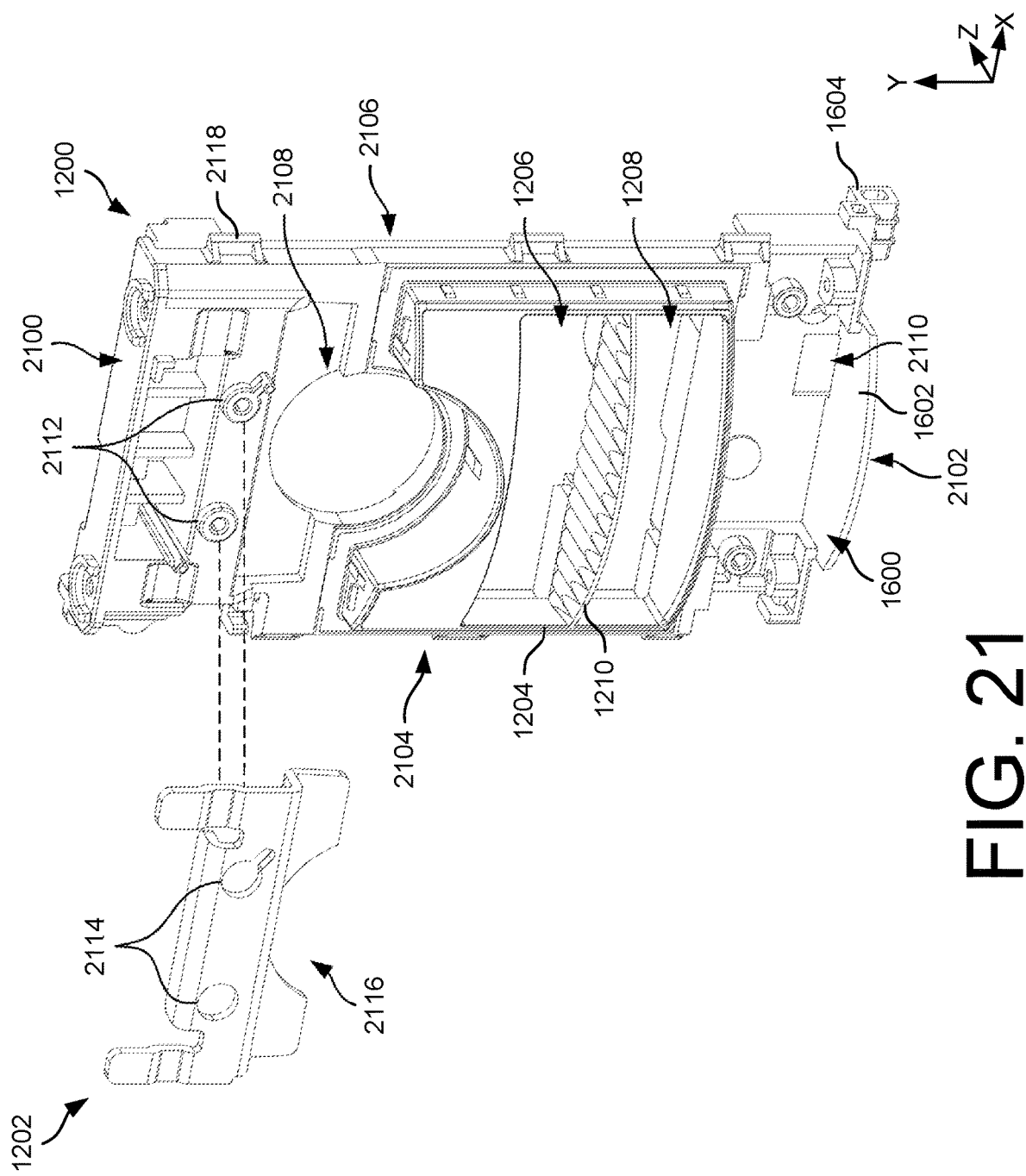
FIG. 21 illustrates an example frame and an example bracket disposed within the camera assembly of the device of FIG. 1, according to an example of the present disclosure.

FIG. 21 illustrates a perspective view of the frame 1200 and the bracket 1202, according to examples of the present disclosure.

The frame 1200 may include a first end 2100 and a second end 2102 spaced apart from the first end 2100 (e.g., in the Y-direction). Additionally, the frame 1200 may include a first side 2104 and a second side 2106 spaced apart from the first side 2104 (e.g., in the X-direction). The first end 2100 may be arranged along the top 112 of the camera assembly 102, while the second end 2102 may be arranged alongside the bottom 114 of the camera assembly 102. The first side 2104 may be arranged along the first side 116 of the camera assembly 102, while the second side 2106 may be arranged alongside the second side 118 of the camera assembly 102.

The frame 1200 may define, or otherwise include various features for receiving components of the camera assembly 102 or which components of the camera assembly 102 couple. For example, as introduced above, the frame 1200 may define the chamber 1600 for receiving the speaker 904, and/or the shelf 1602 upon which the speaker 904 rests. The frame 1200 may also define a first opening 2108 and a second opening 2110. The first opening 2108 may receive a portion of the camera 124. For example, a body of the camera 124 may extend at least partially through the first opening 2108. The second opening 2110 may provide channel through which wires, cables, or other components are routed between the second PCB 902 and the speaker 904.

Additionally, the frame 1200 includes the window 1204 that has the first section 1206 and the second section 1208 arranged vertically below the first section 1206. Additionally, the divider 1210 is disposed between the first section 1206 and the second section 1208 for separating light received via the first PIR sensor 906(1) and the second PIR sensor 906(2), respectively. In some instances, the window 1204 may be rectangular shaped, and/or the first section 1206 and/or the second section 1208 may be rectangular shaped. In some instances, the first section 1206 and the second section are equal in size (e.g., area), or may be different in size. In some instances, surfaces of the divider 1210 are scalloped-shaped. The scalloped-shaped surface of the divider 1210 may reduce glare of incoming light rays being received by the first PIR sensor 906(1) and the second PIR sensor 906(2), respectively.

The bracket 1202 may couple to the frame 1200. For example, the frame 1200 may include receptacles 2112 that alight with channels 2114 disposed through the bracket 1202. Fasteners, for example, may be placed through the channels 2114 and into the receptacles 2112. The bracket 1202 may also include a cutout 2116 that aligns or otherwise corresponds to the first opening 2108 for accommodating the camera 124.

The frame 1200, at the second end 2102, may also include the post 1604 around which the contacts 1508 are secured. For example, the contacts 1508 may at least partially wrap around the post 1604. Additionally, the frame 1200 includes various flanges 2118 that receive attachment mechanisms of the third cover 130, the lens 128, and/or the window 126. For example, the third cover 130, the lens 128, and/or the window 126 may be snap-fit to the frame 1200.

Figure 22A:
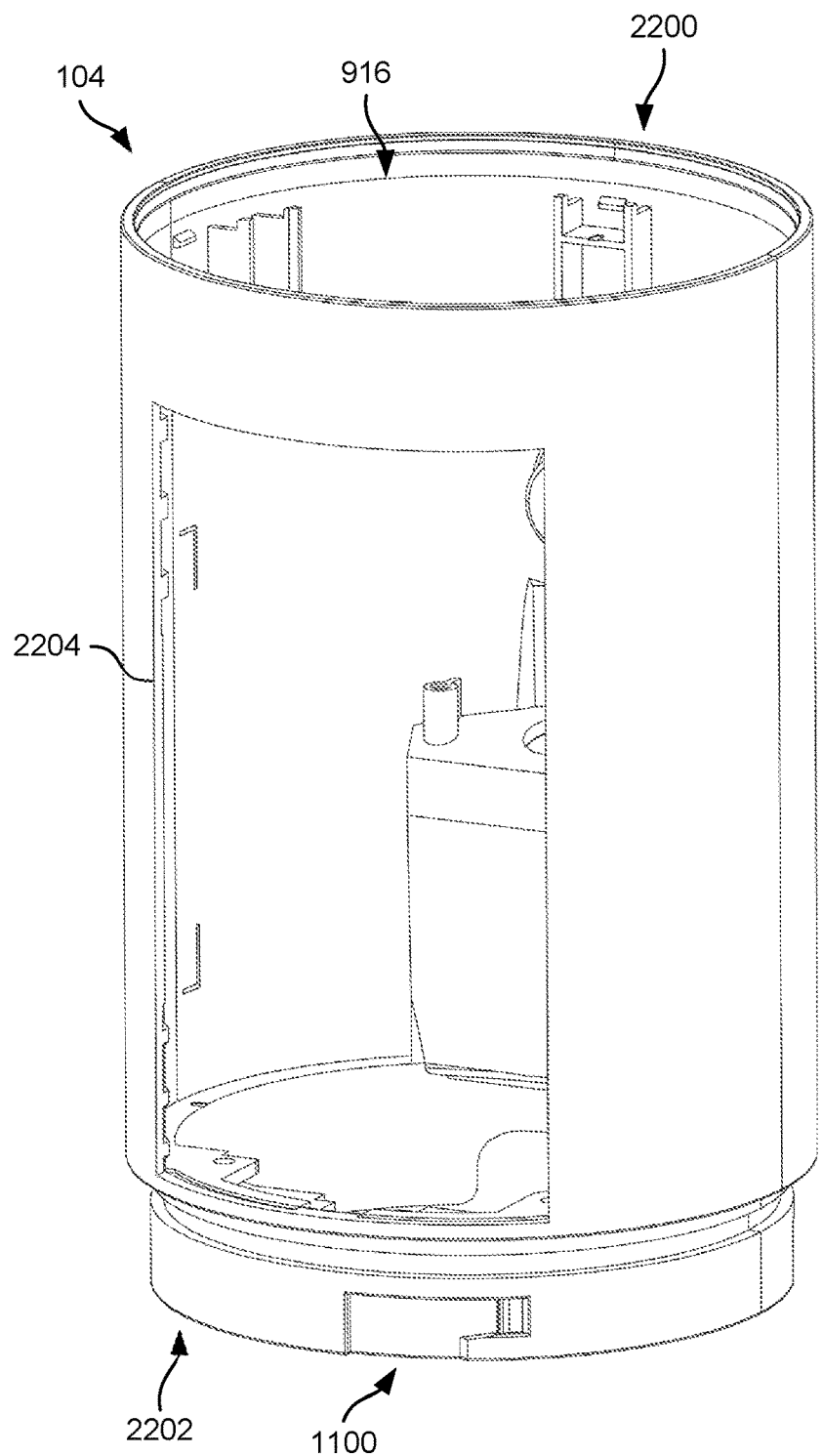
FIGS. 22A-22D illustrate an example housing of the camera assembly of the device of FIG. 1, according to an example of the present disclosure.
Figure 22B:
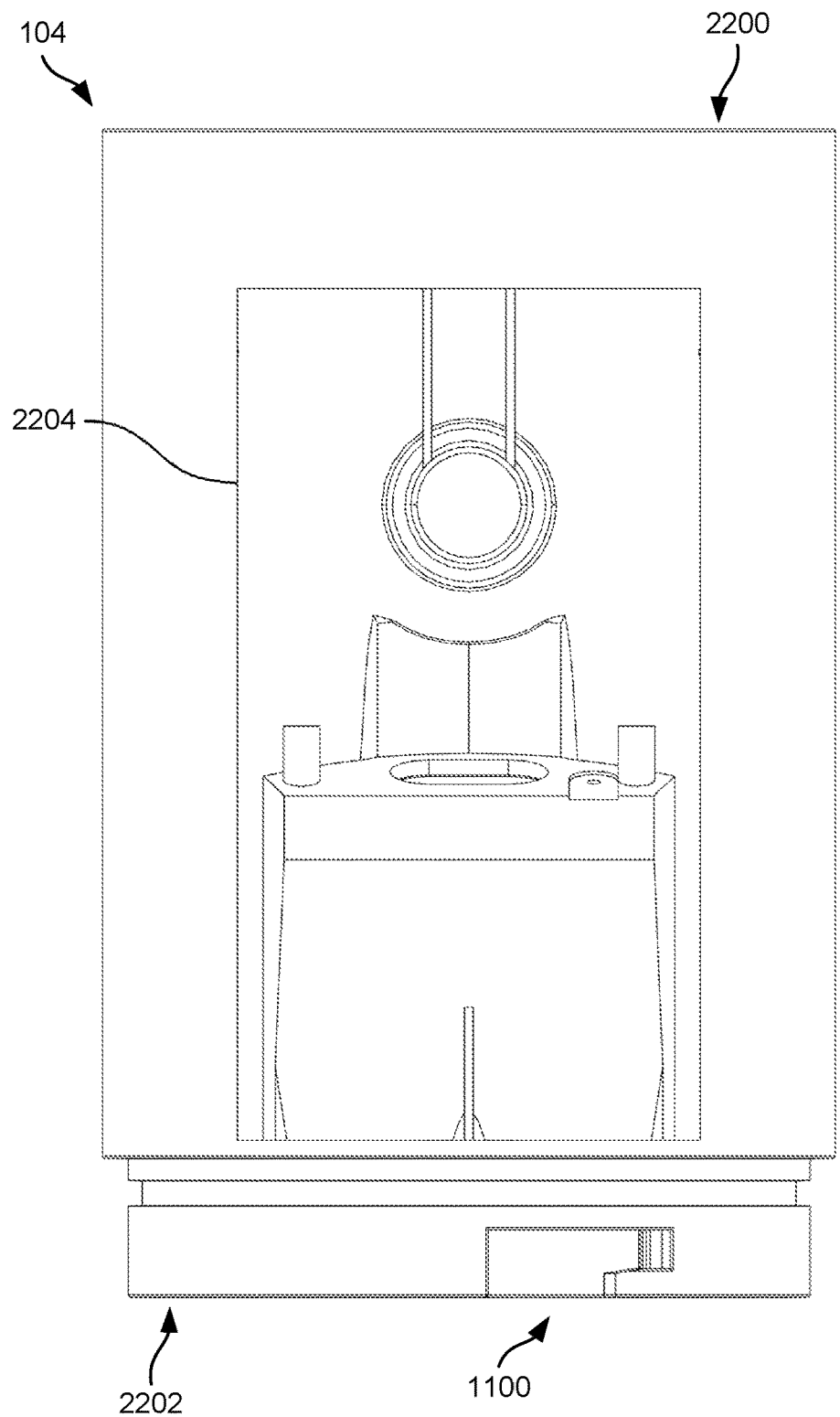
Figure 22C:
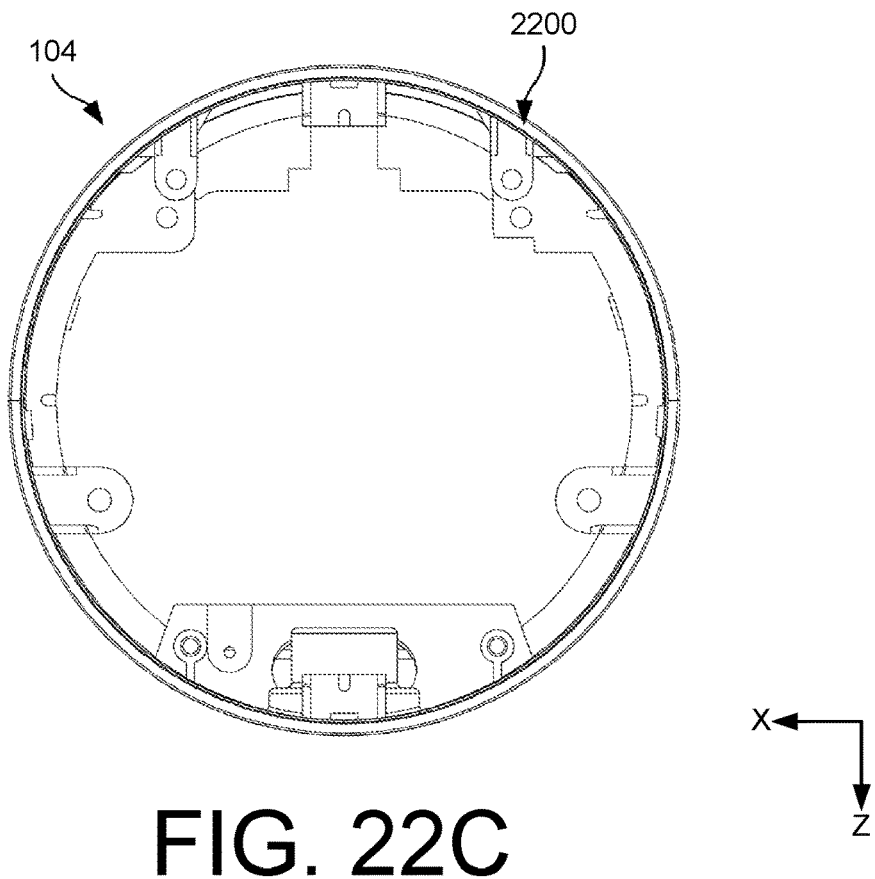
Figure 22D:
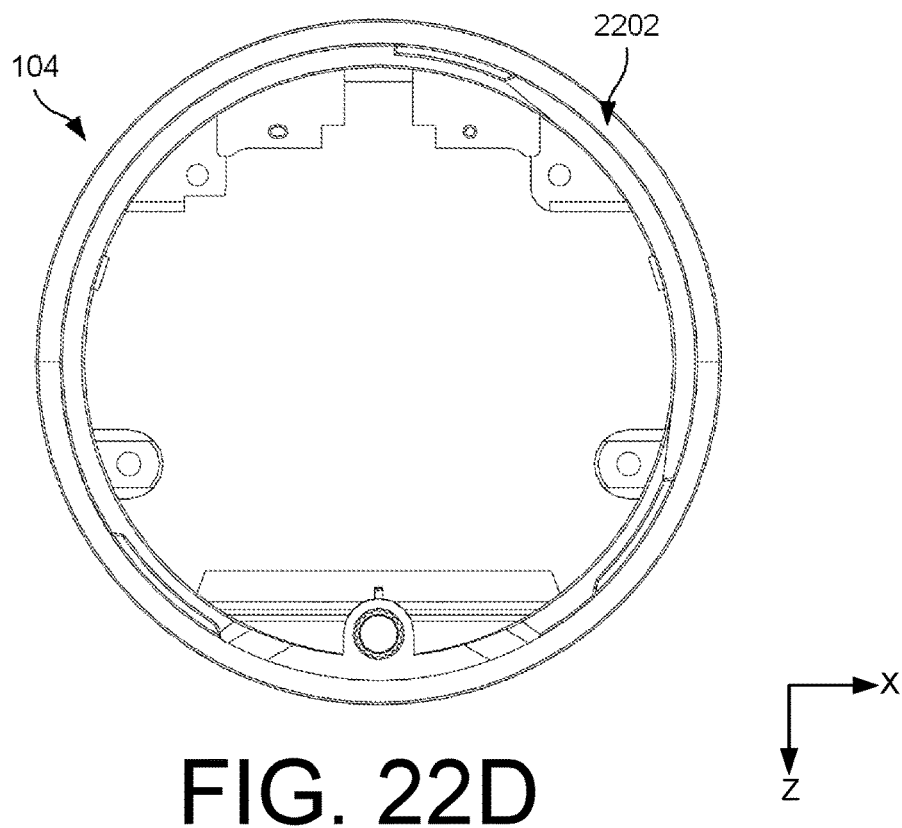

FIGS. 22A-22D illustrate the housing 104, according to examples of the present disclosure. FIG. 22A illustrates a front perspective view of the housing 104, FIG. 22B illustrates a front planar view of the housing 104, FIG. 22C illustrates a first end view of the housing 104, and FIG. 22D illustrates a second end view of the housing 104. In some instances, the housing 104 may be a unibody structure that substantially encircles, encompasses, or surrounds components residing within the camera assembly 102.

The housing 104 may include a top 2200, which may correspond to the top 112 of the camera assembly 102, and a bottom 2202, which may correspond to the bottom 114 of the camera assembly 102. In some instances, the first cover 106 may reside within an annulus of the top 2200. The bottom 2202 is also open such that the battery 910 may be replaced and/or the contacts 1508 may communicatively couple with the accessories. In some instances, the battery housing 908 (which components coupled thereto) may be inserted into the interior cavity 916 via the top 2200 or the bottom 2202. Thereafter, the first cover 106, the second cover 108 (or an accessory), and/or the third cover 130 may be secured to the housing 104. The interior cavity 916 may be formed at least in part via the housing 104.

The housing 104 may define a various receptacle for receiving the third cover 130. For example, third cover 130 may couple to the housing 104 within a receptacle 2204. As shown, the receptacle 2204 may be substantially rectangular in shape. When coupled to the housing 104, the third cover 130 may be disposed within the receptacle 2204. In some instances, the housing 104 may define various keyways, slots, and so forth into which or within which features of the third cover 130 engages for coupling the third cover 130 to the housing 104. In some instances, the keyways, slots, and so forth may align the components within the interior cavity 916, and/or may be used to secure the battery housing 908 and/or other components to the housing 104. Additionally, various flanges, shelves, and posts may extend from an interior surface of the housing 104 for fastening or otherwise coupling the battery housing 908, for example, within the interior cavity 916. As will be discussed herein, the third cover 130 may include various receptacles for receiving the window 1204, lens 128, and so forth.

The bottom 2202 is further shown including the first attachment mechanisms 1100 to which the second attachment mechanisms of the second cover 108 and/or the accessories couple.

Figure 23A:
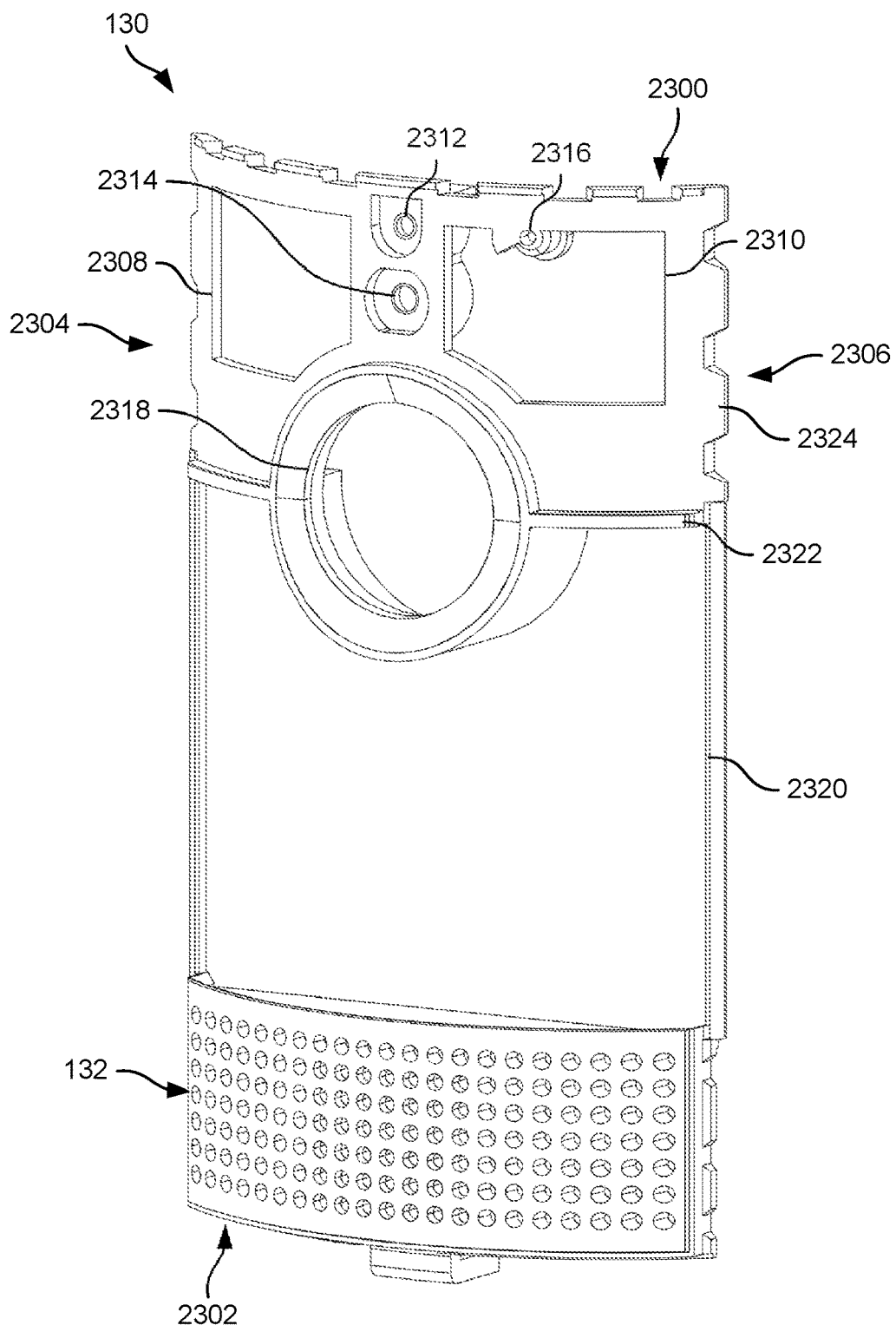
FIG. 23A illustrates an example cover that couples to the housing of FIGS. 22A-22D, according to an example of the present disclosure.

FIG. 23A illustrates a perspective view of the third cover 130, according to examples of the present disclosure. The third cover 130 may include a first end 2300 and a second end 2302 spaced apart from the first end 2300 (e.g., in the Y-direction). The third cover 130 also includes a first side 2304 and a second side 2306 spaced apart from the first side 2304 (e.g., in the X-direction). The first end 2300 may couple to and/or be disposed adjacent to the first end 2100 of the frame 1200, while the second end 2302 may couple to and/or be disposed adjacent to the second end 2102 of the frame 1200. Additionally, the first side 2304 may couple to and/or be disposed adjacent to the first side 2104 of the frame 1200, while the second side 2306 may couple to and/or be disposed adjacent to the second side 2106 of the frame 1200.

The third cover 130 defines the orifices 132, which are disposed at the second end 2302, for allowing sound to be output from the speaker 904. The third cover 130 also defines a first opening 2308 and a second opening 2310. The first opening 2308 may accommodate the first IR lighting element 1000(1), while the second opening 2310 may accommodate the second IR lighting element 1000(2). For example, the first IR lighting element 1000(1) may output light into the environment via the first opening 2308 and the window 126, and the second IR lighting element 1000(1) may output light into the environment via the second opening 2310 and the window 126.

The third cover 130 includes a first channel 2312, a second channel 2314, a third channel 2316, and a fourth channel 2318. The first channel 2312 may align with the lighting element 1006 and the first channel 300 of the window 126 for enabling light emitted via the lighting element 1006 to be output into the environment. The second channel 2314 may align with the ambient light sensor 1004 and the second channel 302 of the window 126 for enabling light to reach the ambient light sensor 1004. Additionally, the third channel 2316 may align with the microphone 1002 and the third channel 304 of the window 126 for enabling sound to reach the microphone 1002. In some instances, a light pipe may be disposed in the first channel 2312 and/or the second channel 2314, respectively. The fourth channel 2318 may align with the first opening 2108 of the frame 1200, and the camera 124 may be at least partially disposed within the fourth channel 2318 for imaging the environment.

The third cover 130 may additionally include an aperture 2320 that resides adjacent to the window 1204 of the frame 1200. For example, when the third cover 130 couples to the frame 1200 and/or the housing 104, the window 1204 may reside at least partially within the aperture 2320. In some instances, a flange 2322 is disposed between the aperture 2320 and the first opening 2308 and the second opening

2310. For example, the window 126 may engage with, or abut, a top surface of the flange 2322, while the lens 128 may engage with, or about, a bottom surface of the flange 2322.

The third cover 130 may also include various prongs, posts, or tabs 2324 for engaging with the various flanges 2118 of the frame 1200 and/or the housing 104. An engagement between the tabs 2324 and the flanges 2118 may align, couple, or otherwise secure the third cover 130 to the frame 1200 and/or the housing 104.

Figure 23B:
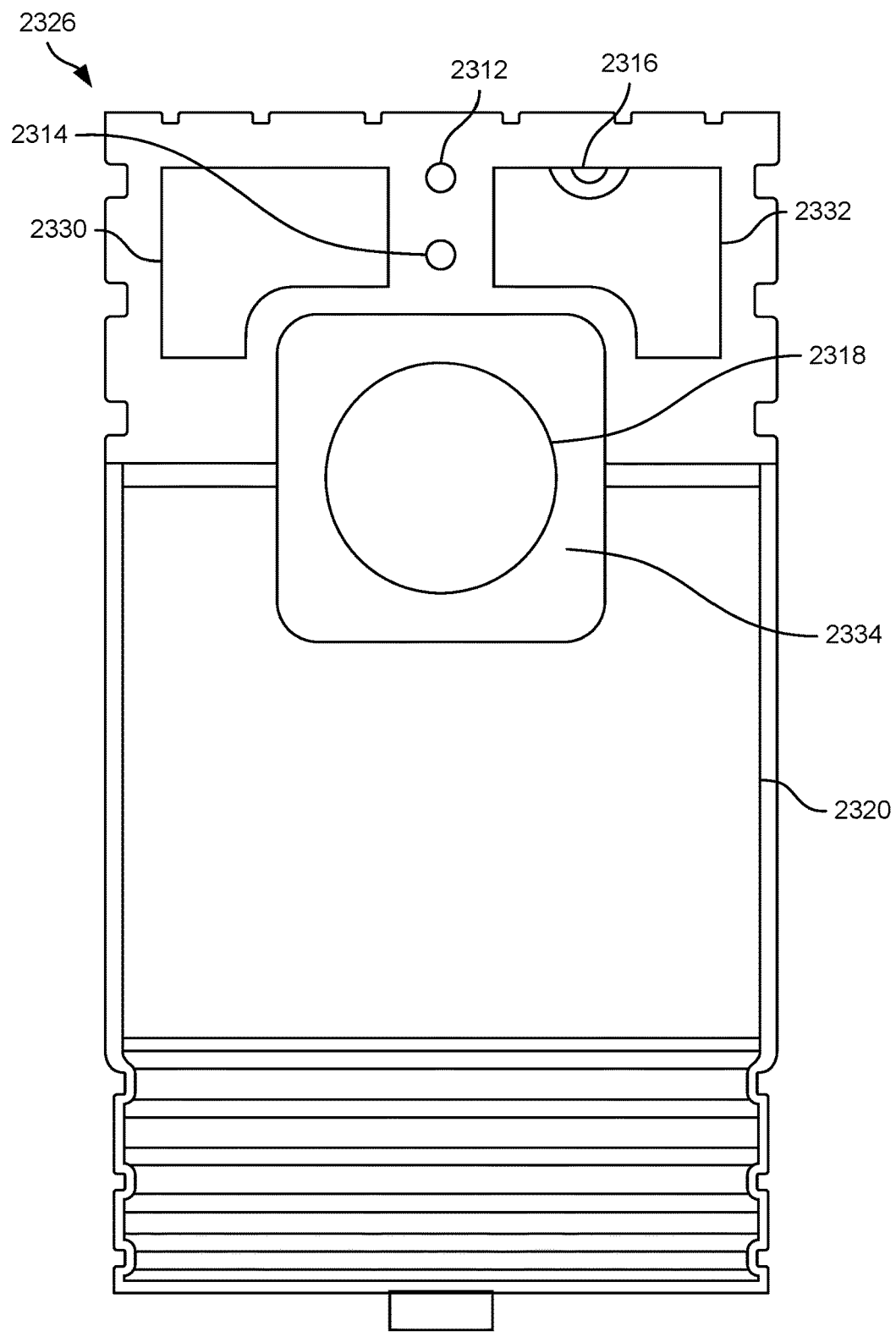
FIG. 23B illustrates an example cover that couples to the housing of FIGS. 22A-22D, according to an example of the present disclosure.

FIG. 23B illustrates an alternative example of a third cover 2326 that may be usable within the device 100. In some instances, the third cover 2326 may be similar to the third cover 130 as described above. For example, the third cover 2326 may include the first channel 2312, the second channel 2314, and the third channel 2316 for accommodating the lighting element 1006, the light sensor 1004, and the microphone 1002, respectively. Additionally, the third cover 2326 includes the aperture 2320 that resides adjacent to the window 1204 of the frame 1200. The third cover 2326 also includes the orifices 132 for outputting sound from the speaker 904. However, in comparison to the third cover 130, the third cover 2326 may include a square shaped recession 2334 around the fourth channel 2318. In such instances, a first opening 2330 and a second opening 2332 may be shaped differently than the first opening 2308 and the second opening 2310.

Figure 24A:
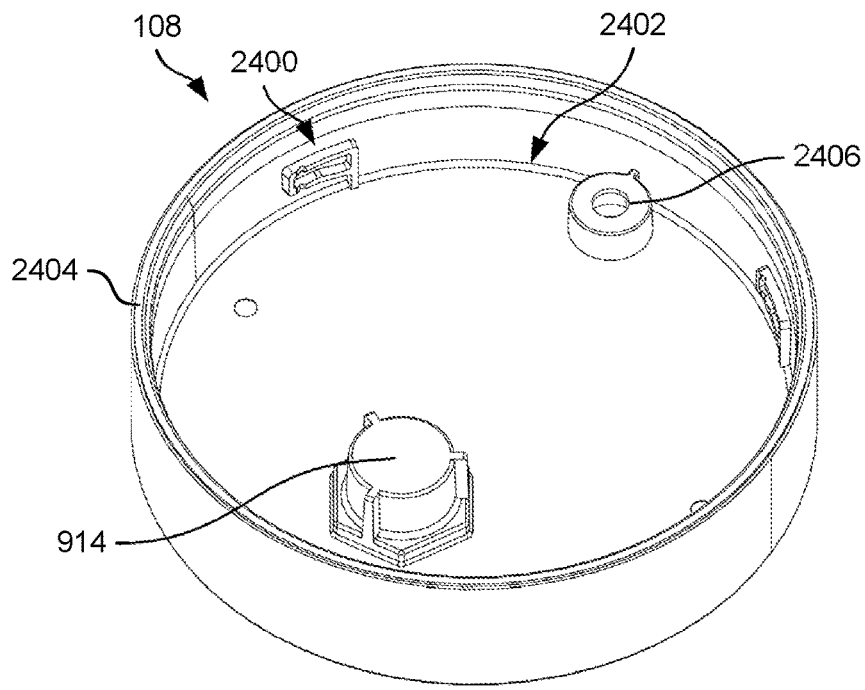
FIGS. 24A and 24B illustrate an example cover of the device of FIG. 1, according to an example of the present disclosure.
Figure 24B:
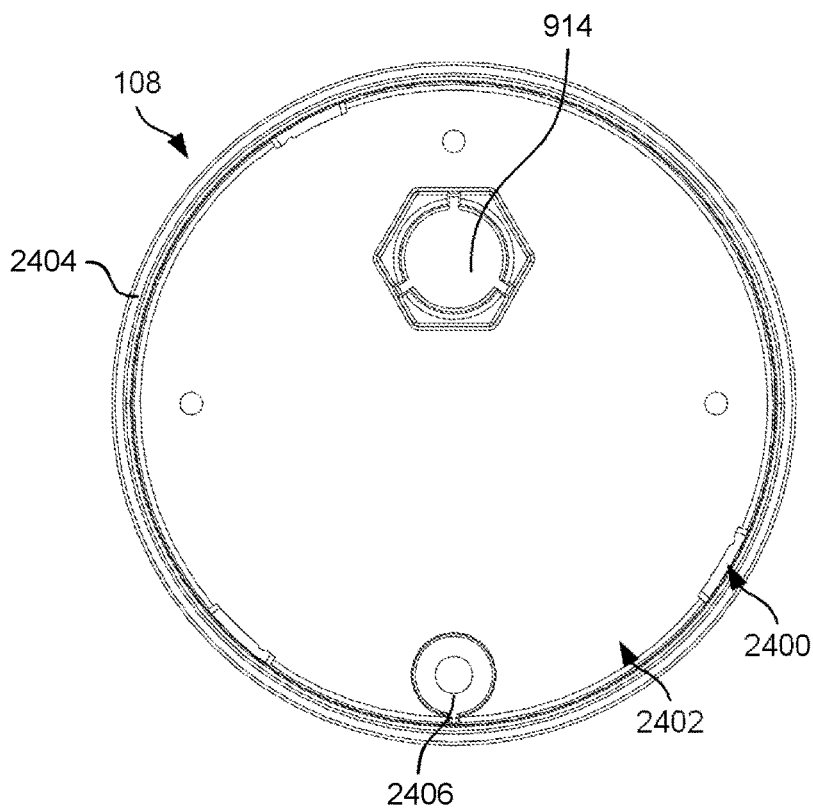

FIGS. 24A and 24B illustrate the second cover 108, according to examples of the present disclosure. FIG. 24A illustrates a perspective view of the second cover 108, while FIG. 24B illustrates a top view of the second cover 108.

The second cover 108 is configured to couple to the housing 104. For example, the second cover 108 may couple to the bottom 114 of the camera assembly 102. In some instances, the second cover 108 includes second attachment mechanisms 2400 that engage with the first attachment mechanisms 1100 of the housing 104. The second attachment mechanisms 2400 may be disposed within a cavity 2402 (e.g., interior) of the second cover 108, where the cavity 2402 may receive the bottom 114 of the housing 104. The cavity 2402 may be defined, or accessed, via an annulus 2404. In some instances, the second attachment mechanisms 2400 may be defined by or within the cavity 2402 of the second cover 108. When the housing 104 and the second cover 108 couple together, the bottom 114 of the housing 104 may be inserted through the annulus 2404 and into the cavity 2402. Therein, the second cover 108 may be rotated to engage the first attachment mechanisms 1100 and the second attachment mechanisms 2400. Rotation in a first direction (e.g., clockwise) may engage the first attachment mechanisms 1100 and the second attachment mechanisms 2400, while rotation in a second direction (e.g., counter-clockwise) may disengage the first attachment mechanisms 1100 and the second attachment mechanisms 2400.

The second cover 108 may also include the receptacle 914 that receives the linkage 500 of the stand 110. Additionally, the second cover 108 may include a passageway 2406 that receives a fastener for coupling the second cover 108 to the camera assembly 102. For example, the fastener may serve to secure the second cover 108 to the camera assembly 102. When the fastener is disposed through the passageway 2406 and coupled to the camera assembly 102, the second cover 108 may not be permitted to be removed.

Although the discussion herein is with regard to the second cover 108, the accessories that may couple to the camera assembly 102 may include similar attachment mechanisms for coupling to the camera assembly 102. For example, the accessories may include similar twist and lock mechanisms, such as the second attachment mechanisms 2400, that engage and disengage with the first attachment mechanisms 1100 when rotated. Such coupling may permit different accessories to be conveniently replaced, interchanged, and so forth.

Figure 25:
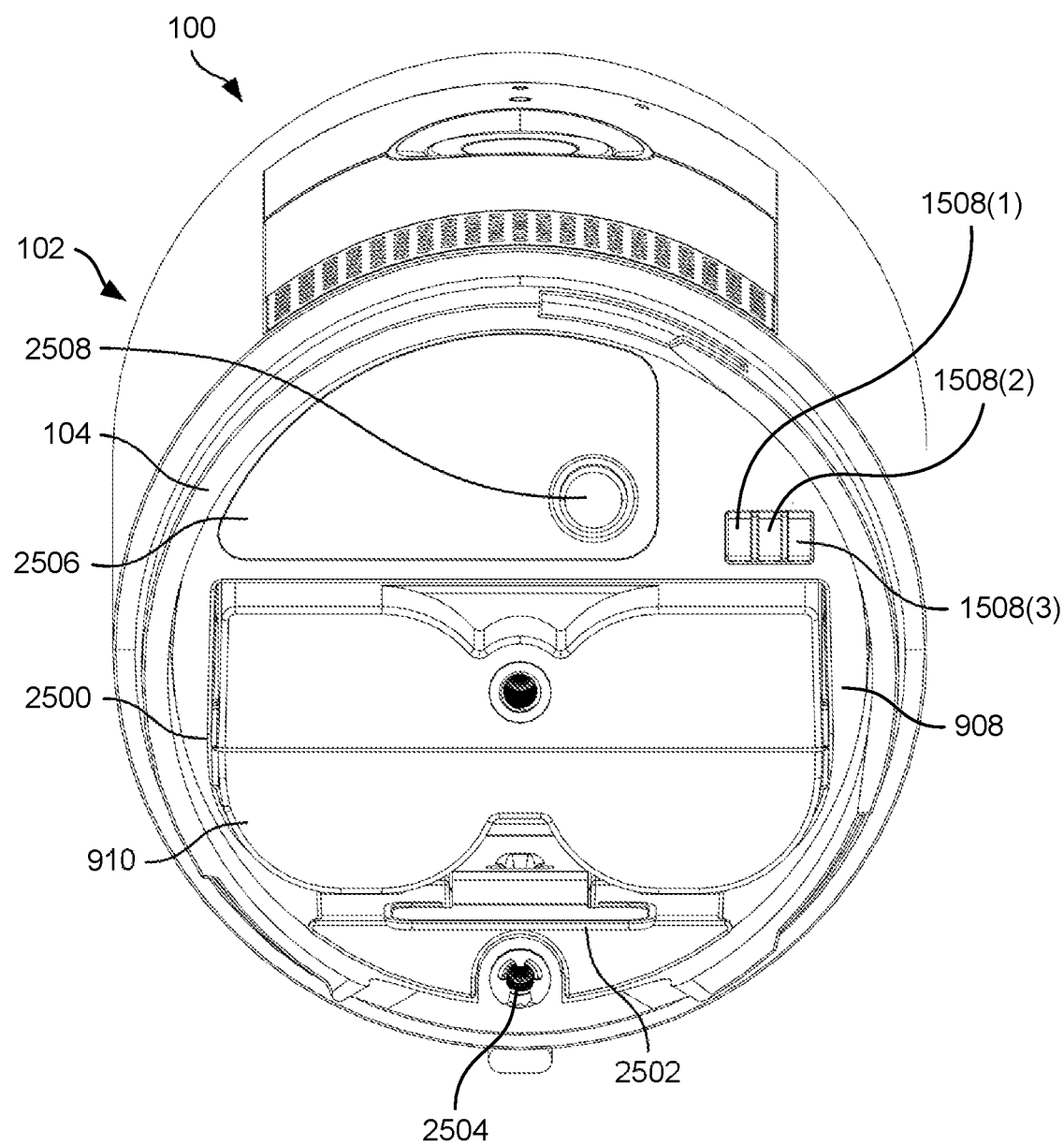
FIG. 25 illustrates an example end view of the device of FIG. 1, according to an example of the present disclosure.

FIG. 25 illustrates an end view of the camera assembly 102, showing the second cover 108 removed, according to examples of the present disclosure.

The device 100 includes the battery housing 908 that resides within the housing 104. The battery housing 908 defines a battery receptacle 2500 that receives the battery 910. The battery 910 is removably coupled within the battery housing 908 via uncoupling the second cover 108 from the camera assembly 102. As such, the battery 910 may be insertable into the battery housing 908 via the bottom 114 of the camera assembly 102. In some instances, a tab 2502 of the battery 910 may engage with a feature of the battery housing 908 to secure the battery 910 within the battery receptacle 2500. Pressing the tab 2502 (e.g., in the Z-direction and towards a center of the device 100) may permit the battery 910 to be pulled out of the battery receptacle 2500. Although a single battery receptacle and battery are shown, the battery housing 908 may include more than one battery receptacle and battery.

In some instances, a fastener may be inserted into a receptacle 2504 of the housing 104 for securing the second cover 108 (or an accessory) to the camera assembly 102. For example, the fastener may be disposed through the passageway 2406 and into the receptacle 2504 for securing the second cover 108 to the camera assembly 102. The camera assembly 102 may further include a membrane 2506. The switch 1706 may be activated via a tab of the battery housing 908 being depressed when a features of the accessory contacts a portion of the membrane 2506 (e.g., in the Y-direction). The membrane 2506 may environmentally seal an interior cavity 916 of the device 100 from the environment.

A knob 2508 is shown disposed on the bottom 114. The knob 2508 may engage with the button 2000 disposed on the second PCB 902. For example, pressing the knob 2508 (e.g., in the Y-direction) may deflect a tab of the battery housing 908 for engaging with the button 2000. That is, pressing the knob 2508 may translate a portion of the battery housing 908 into contact with the button 2000 in order to sense the press of the knob 2508.

The bottom 114 is further shown including the contacts 1508, such as the first contact 1508(1), the second contact 1508(2), and the third contact 1508(1). In some instances, the first contact 1508(1) is located closest to a center of the camera assembly 102, while the third contact 1508(3) may be located farther from the center of the camera assembly 102. The first contact 1508(1) may correspond to a ground contact, and as such, during a coupling of the accessory to the camera assembly 102, the components of the accessory may first be grounded. As the first contact 1508(1) is closest to the center of rotation, a corresponding ground contact of the accessory may engage with the first contact 1508(1) before other contacts of the accessory engage with the second contact 1508(2) and the third contact 1508(3), respectively. Grounding the accessory first, before other contacts, may prevent damage to the accessory and/or the camera assembly 102. In some instances, the contacts 1508 may be similarly sized and/or shaped. The second contact 1508(2) may correspond to a digital contact in which signals (or data) are capable of being transmitted between the camera assembly 102 and the accessory. The third contact 1508(3) may correspond to a power contact for transferring power between the camera assembly 102 and the accessory. However, in some instances, the contacts 1508 may be differently sized and/or shaped compared to one another. For example, the contacts 1508 may include a curved profile (e.g., semicircular).

Figure 36:
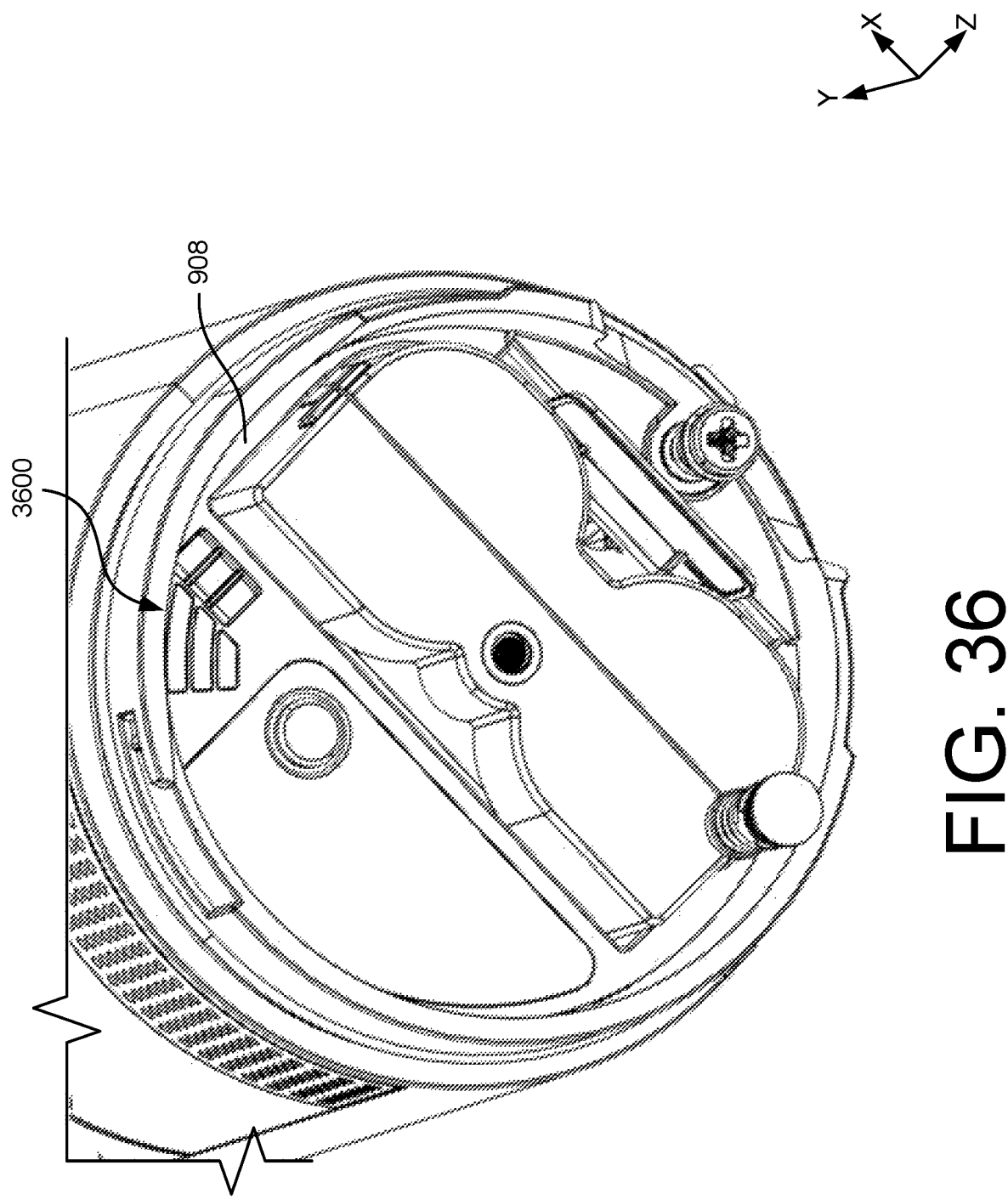
FIG. 36 illustrates exemplary pads of a camera device, according to examples of the present disclosure.

In some instances, a surface disposed adjacent the contacts 1508 includes one or more pads secured thereto or padding surfaces formed thereon that provide resistance to scratching of the surface from repeated connection of accessories. This surface may be, for example, a surface of the battery housing 908. For example, FIG. 36 illustrates exemplary pads 3600 secured to a surface of the battery housing 908.

Figure 26A:
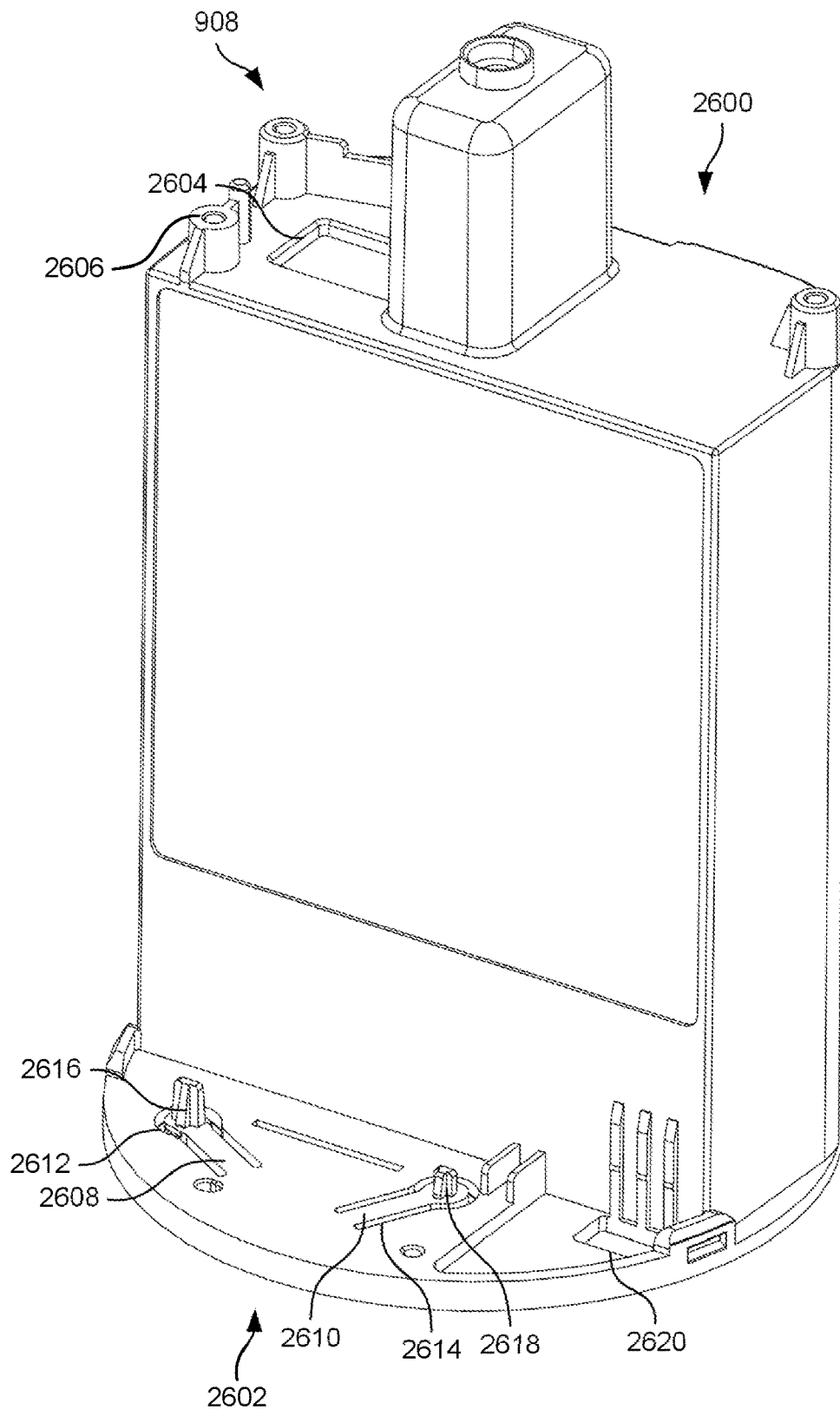
FIGS. 26A-26D illustrate the battery housing of FIG. 14, according to an example of the present disclosure.
Figure 26B:
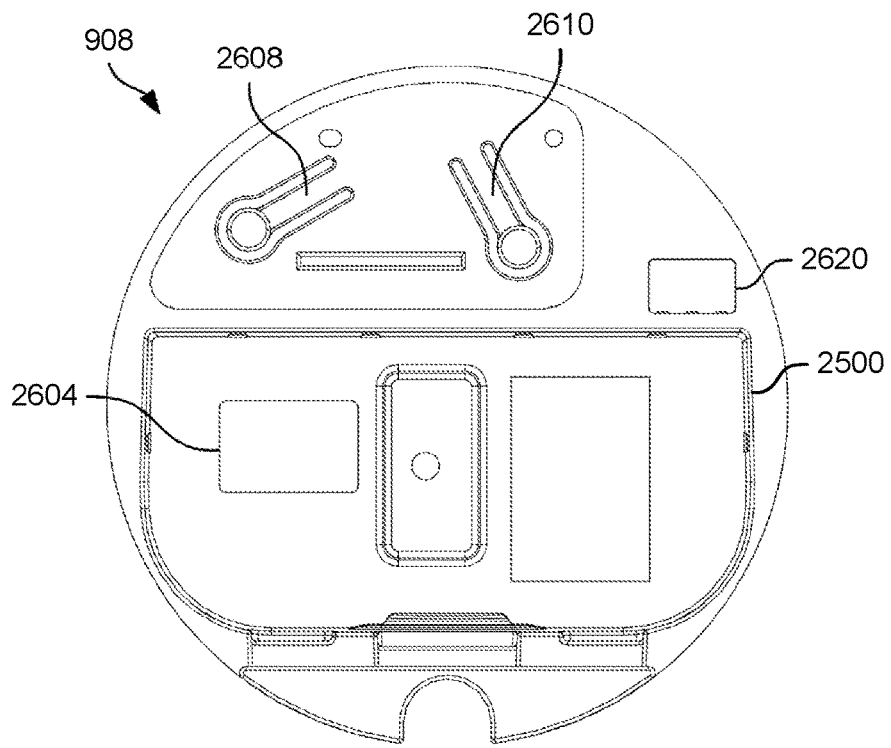
Figure 26C:
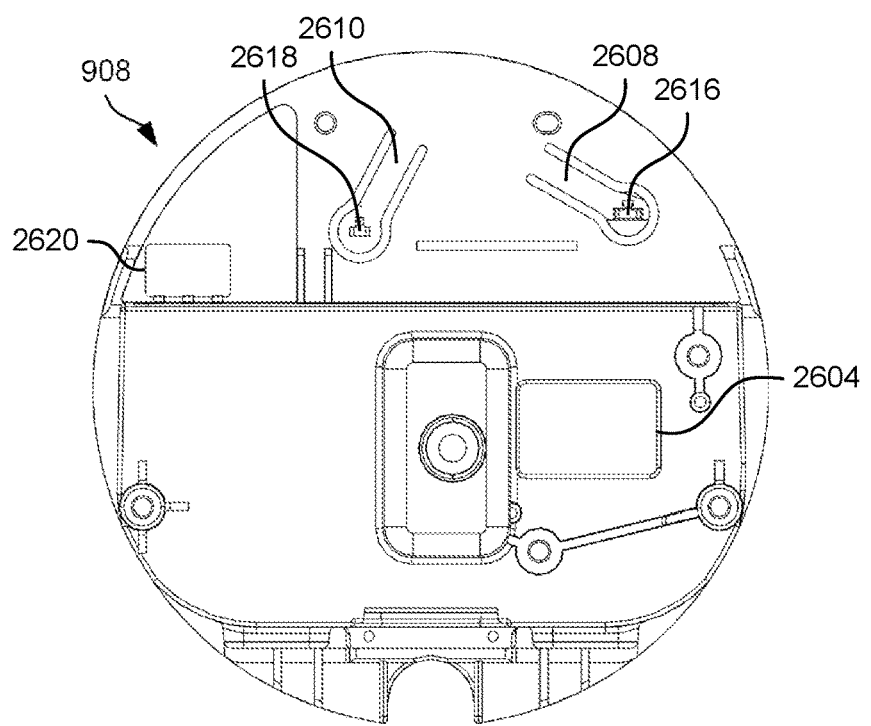
Figure 26D:
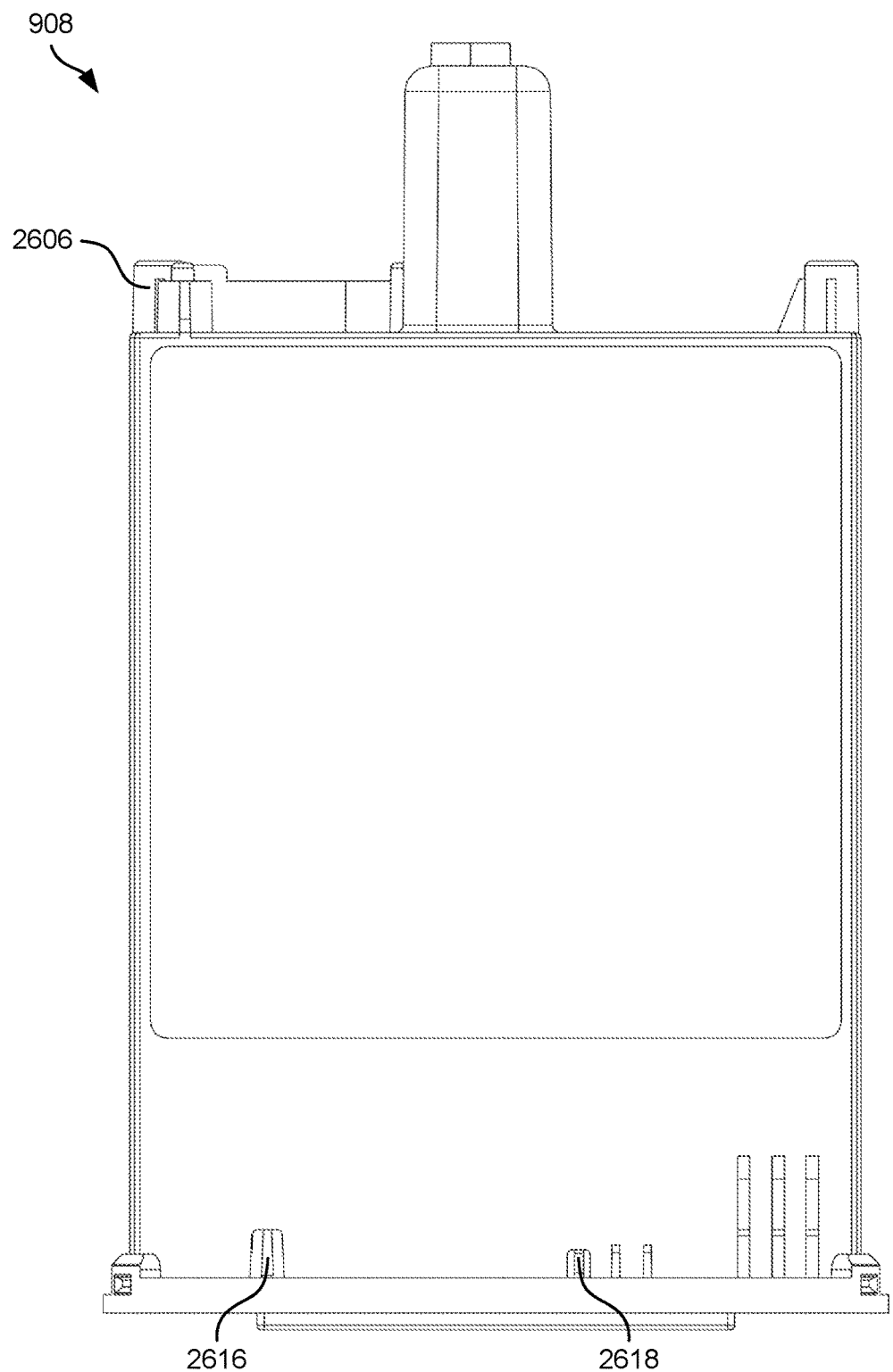

FIGS. 26A-26D illustrate the battery housing 908, according to examples of the present disclosure. FIG. 26A illustrates a perspective view of the battery housing 908, FIG. 26B illustrates a first end view of the battery housing 908, FIG. 26C illustrates a second end view of the battery housing 908, and FIG. 26D illustrates a front view of the battery housing 908.

The battery housing 908 may include a first end 2600 and a second end 2602 spaced apart from the first end 2600 (e.g., in the Y-direction). The first end 2600 may be disposed proximate to the top 112 of the camera assembly 102, while the second end 2602 may be disposed proximate to the bottom 114 of the camera assembly 102. In some instances, the first end 2600 couples to the first cover 106, vice versa.

The battery housing 908 defines the battery receptacle 2500 that receives the battery 910. The battery receptacle 2500 may be accessible at the second end 2602, such that the battery 910 may be removed from the battery receptacle 2500 (e.g., charging, replacement, etc.). The battery housing 908 may include a first opening 2604 for communicatively coupling the FPC 912 to the battery 910. For example, the prongs 1704 may be disposed at least partially through the first opening 2604 for connecting to the battery 910. Such connection may serve to charge the battery 910 (e.g., when the device 100 is coupled to a charging cable) and/or route power from the battery 910 to components of the device 100 (e.g., during battery power). The battery housing 908 may also include prongs 2606 to which the second plate 1404 is secured to for disposing the FPC 912 along/over the battery housing 908.

The second end 2602 may define a first arm 2608, a second arm 2610, a first groove 2612, and a second groove 2614. The first arm 2608 may be at least partially received within the first groove 2612 and the second arm 2610 may be at least partially received within the second groove 2614. The first arm 2608 and the second arm 2610 may be capable of being deflected to engage with switches or buttons of the device 100. For example, the first arm 2608 may include a first tab 2616 and the second arm 2610 may include a second tab 2618. The first tab 2616, for example, may engage the switch 1706 of the device 100 to deactivate the camera 124. For example, as the first arm 2608 is deflected upward (e.g., in the Y-direction), the first tab 2616 may engage with the switch 1706 to deactivate the camera 124. Similarly, the second tab 2618 may engage the button 2000 of the device 100 to reset or setup the device 100. For example, as the second arm 2610 is deflected upward (e.g., in the Y-direction), the second tab 2618 may engaged with the button 2000 to reset or setup the device 100, for example.

The battery housing 908 may also define a second opening 2620 for accommodating the contacts 1508. In some instances, the battery housing 908 also includes slots for receiving a portion of the contacts 1508.

Figure 27:
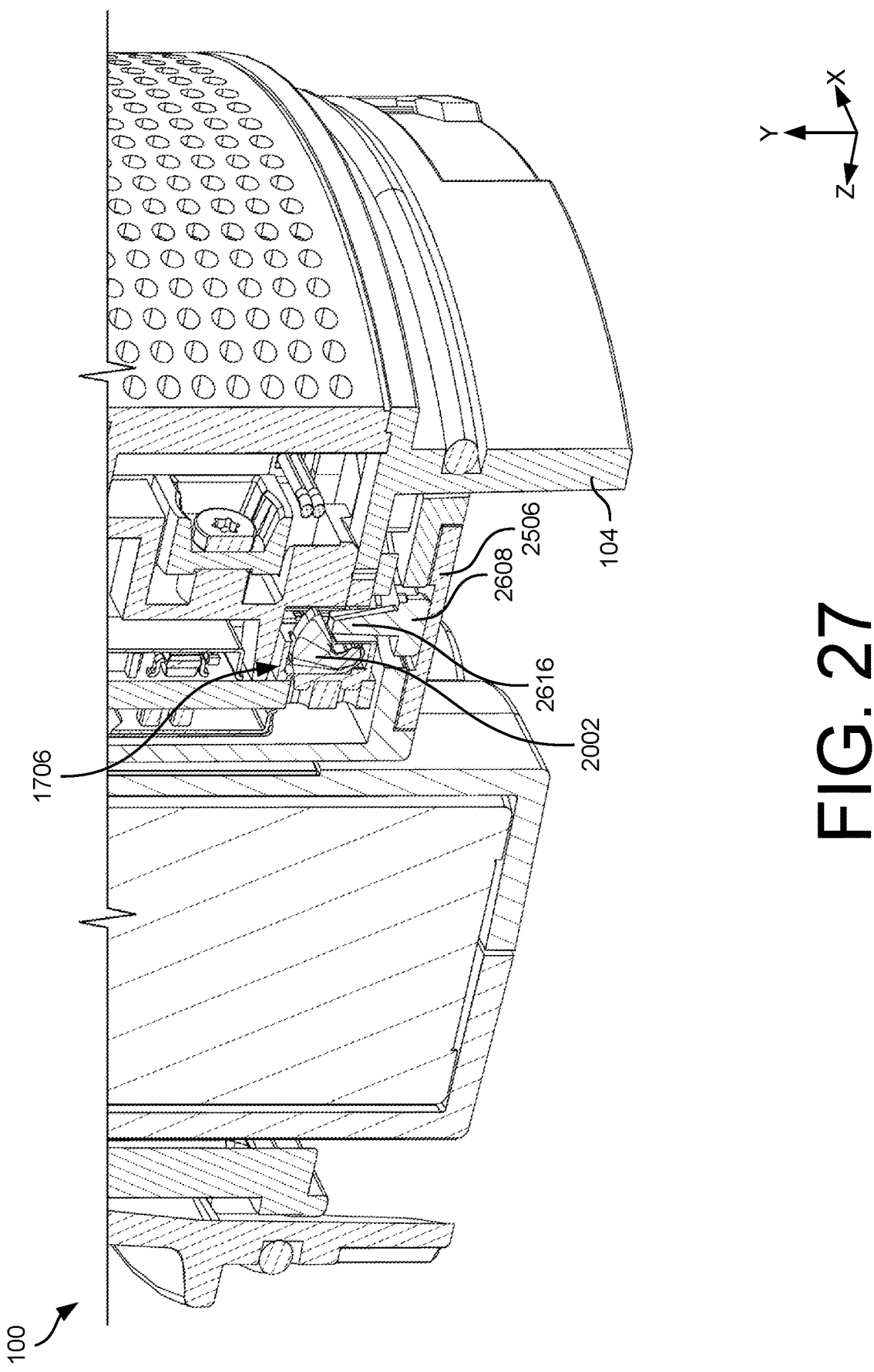
FIG. 27 illustrates an example engagement between a portion of the battery housing of FIGS. 26A-26D and the switch of FIG. 20, according to an example of the present disclosure.

FIG. 27 illustrates a cross-sectional view of the camera assembly 102, showing an engagement between the first tab 2616 of the battery housing 908 and the switch 1706. In FIG. 27, the second cover 108 is shown uncoupled from the housing 104.

The first arm 2608 of the battery housing 908 is shown in a resting state. In this position, the first tab 2616 does not engage (or activate) the switch 1706. For example, the first tab 2616 may not depress the lever 2002. When an accessory including a privacy cover, for example, couples to the housing 104 (e.g., via the first attachment mechanisms 1100), the privacy cover may include a feature that depresses the first tab 2616. For example, the privacy cover may move between a position for deactivating and obscuring the camera 124, and a position in which the privacy cover does not deactivate and obscure the camera 124. In the position associated with deactivating and obscuring the camera 124, the feature of the privacy cover (e.g., rib), may contact a portion of the membrane 2506 adjacent (e.g., below) the first arm 2608. In turn, the membrane 2506 may deflect upward, thereby causing the first arm 2608 to translate upwards such that the first tab 2616 engages with the lever 2002. In doing so, the switch 1706 may sense the movement of the lever 2002 and correspondingly deactivate the camera 124 or cause the camera to be deactivated. Comparatively, when not engaged with the feature of the privacy cover, the first arm 2608 may return to a resting state such that the first tab 2616 does not deflect the lever 2002.

In some instances, the switch 1706 may represent a binary logic, and when the switch 1706 is engaged by the first tab 2616, the switch 1706 may draw between 1.8V and 0V. The amount of voltage being drawn may pass through a series of logic inversions/voltage level shifting/buffers. Ultimately, when the switch 1706 is engaged, an enable pin of the camera 124 is disengaged, thereby turning the camera 124 off. Additionally, activation of the switch 1706 may deactivate a power load switch to the microphone 1002.

Figure 28A:
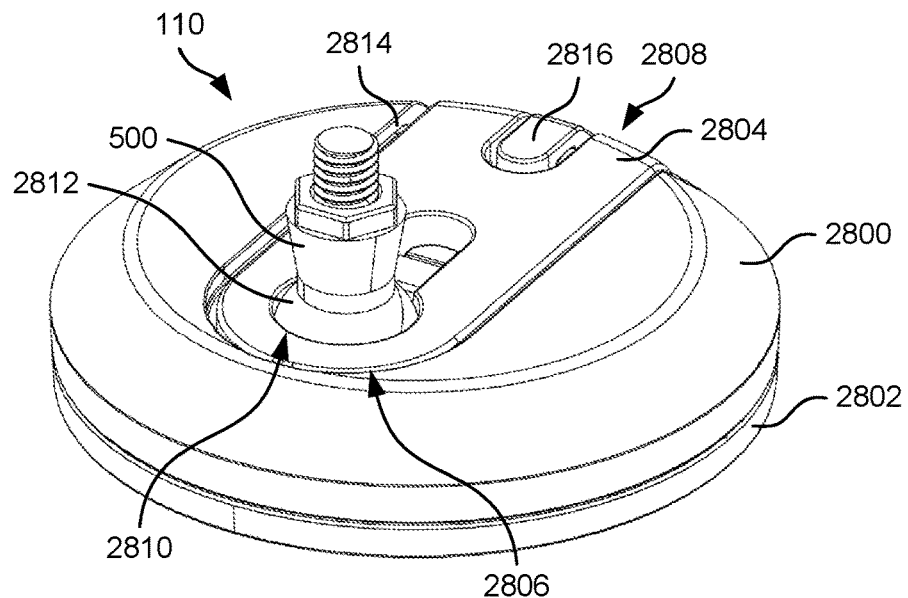
FIGS. 28A-28C illustrate the stand of the device of FIG. 1, according to an example of the present disclosure.
Figure 28B:
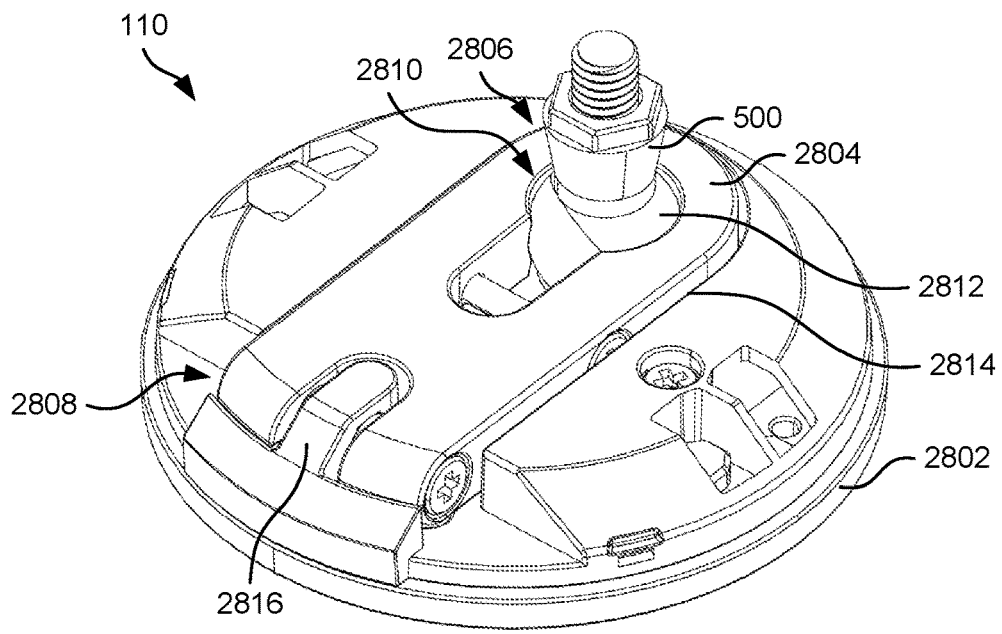
Figure 28C:
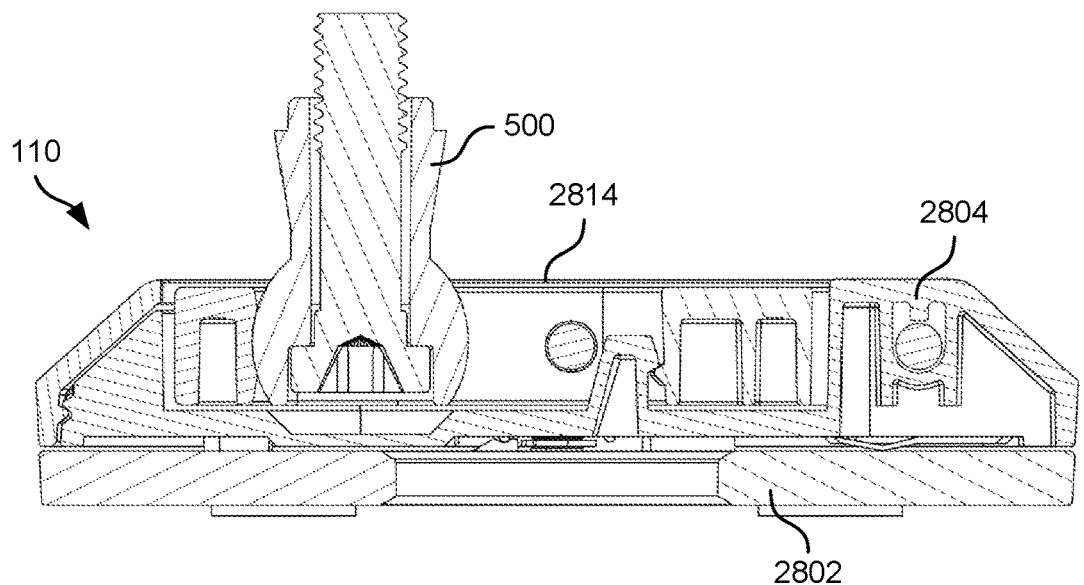

FIGS. 28A-28C illustrate the stand 110, according to examples of the present disclosure. FIG. 28 illustrates a first perspective view of the stand 110, FIG. 28B illustrates a second perspective view of the stand 110, with a cover 2800 of the stand 110 removed, and FIG. 28C illustrates a cross-sectional view of the stand 110.

The stand 110 includes a base 2802, the linkage 500, and the cover 2800 coupled to the base 2802. Additionally, an arm 2804 hingedly couples to the base 2802. For example, the arm 2804 may include a first end 2806 and a second end 2808 spaced apart from the first end 2806 (e.g., in the Z-direction) that hingedly couples to the base 2802. The arm 2804 defines a socket 2810 that receives the linkage 500. For example, as shown, the linkage 500 may include a distal end and a proximal end. The distal end may be secured to the second cover 108, for example, within the receptacle 914. The proximal end may include a ball 2812 that is received within the socket 2810. The engagement between the ball 2812 and the socket 2810 may resemble a ball and socket joint such that an orientation of the camera assembly 102 may be adjusted. Adjustment may also come by way of the hinged coupling of the second end 2808 of the arm 2804 to the base 2802. For example, the first end 2806 may be disposed away from the base 2802 (e.g., in the Y-direction) given the pivotable coupling of the second end 2808 to the base 2802.

The base 2802 may also define a receptacle 2814 that receives the arm 2804, when the arm 2804 is in a retracted state (as shown in FIGS. 28A-28C). Additionally, a fastener, for example, may be disposed through the arm 2804 at the second end 2808, as well as a lip 2816 of the base 2802, for hingedly coupling the arm 2804 to the base 2802.

Figure 29:
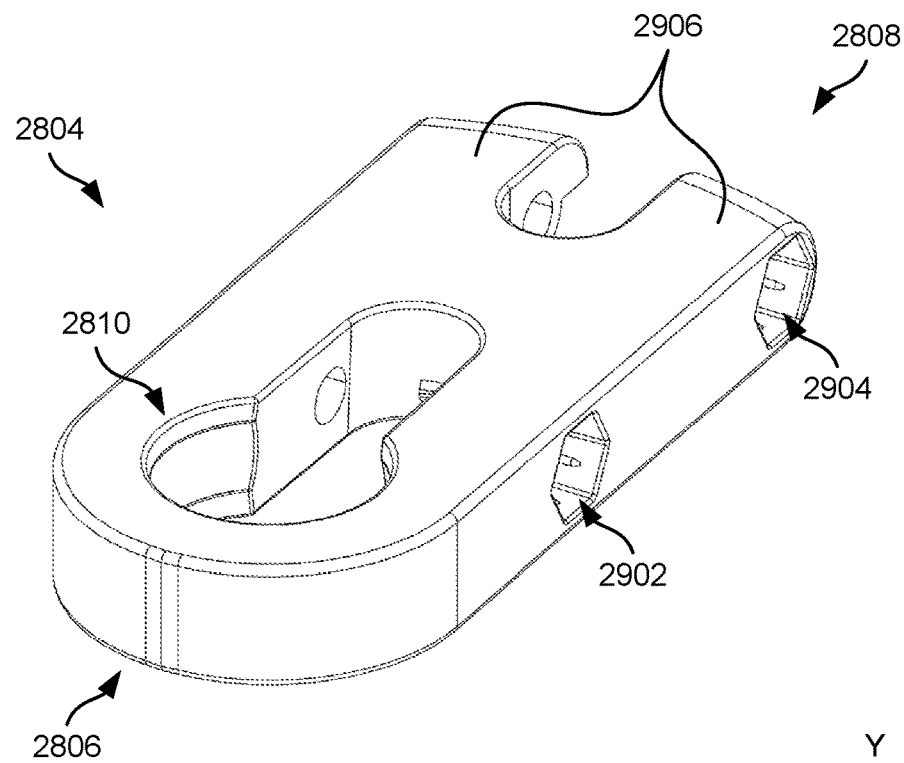
FIG. 29 illustrates an example arm of the stand of FIGS. 28A-28C, according to an example of the present disclosure.

FIG. 29 illustrates a perspective view of the arm 2804, according to examples of the present disclosure. The arm 2804 includes the first end 2806 that defines the socket 2810, and the second end 2808 that hingedly couples to the base 2802. The arm 2804 may include a first channel 2902 and a second channel 2904. In some instances, fasteners may be disposed through the first channel 2902 and the second channel 2904, respectively. For example, a first fastener may be disposed through the first channel 2902 to compress or otherwise secure the ball 2812 within the socket 2810. A second fastener may be disposed through the second channel 2904 for hingedly coupling the arm 2804 to the base 2802. The second fastener may also be disposed through the lip 2816. In some instances, the second fastener is used to compress or otherwise the secure prongs 2906 at the second end 2808 to the lip 2816. Such compression, may secure the arm 2804 in place when the arm 2804 extends upward from the base 2802.

Figure 30:
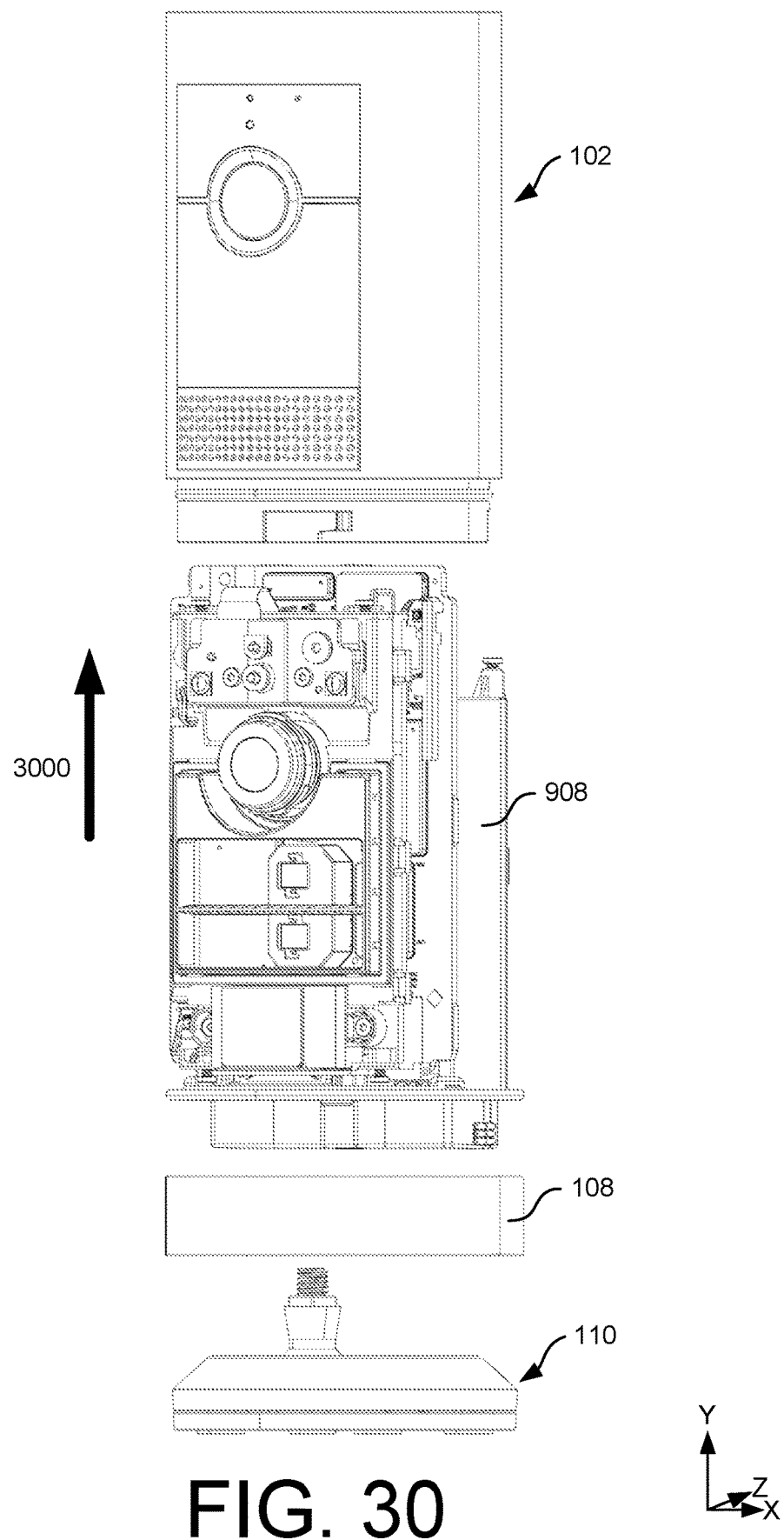
FIG. 30 illustrates an example assembly of the device of FIG. 1, according to an example of the present disclosure.

FIG. 30 illustrates an example assembly of the camera assembly 102, according to examples of the present disclose. Initially, components of the camera assembly 102 may be coupled together. For example, the camera 124, the frame 1200, the first PCB 900, the second PCB 902, the frame 1200, battery housing 908, etc. may be assembled together. Therein, components of the camera assembly 102 may be inserted into the housing 104, for example, from the bottom 114 and in a direction 3000. After residing within the housing 104, the third cover 130, the lens 128, and/or the window 126 may be coupled to the housing 104 (or otherwise the camera assembly 102). Further, the second cover 108 may couple to the camera assembly 102, and the stand 110 to the second cover 108.

Figure 31A:
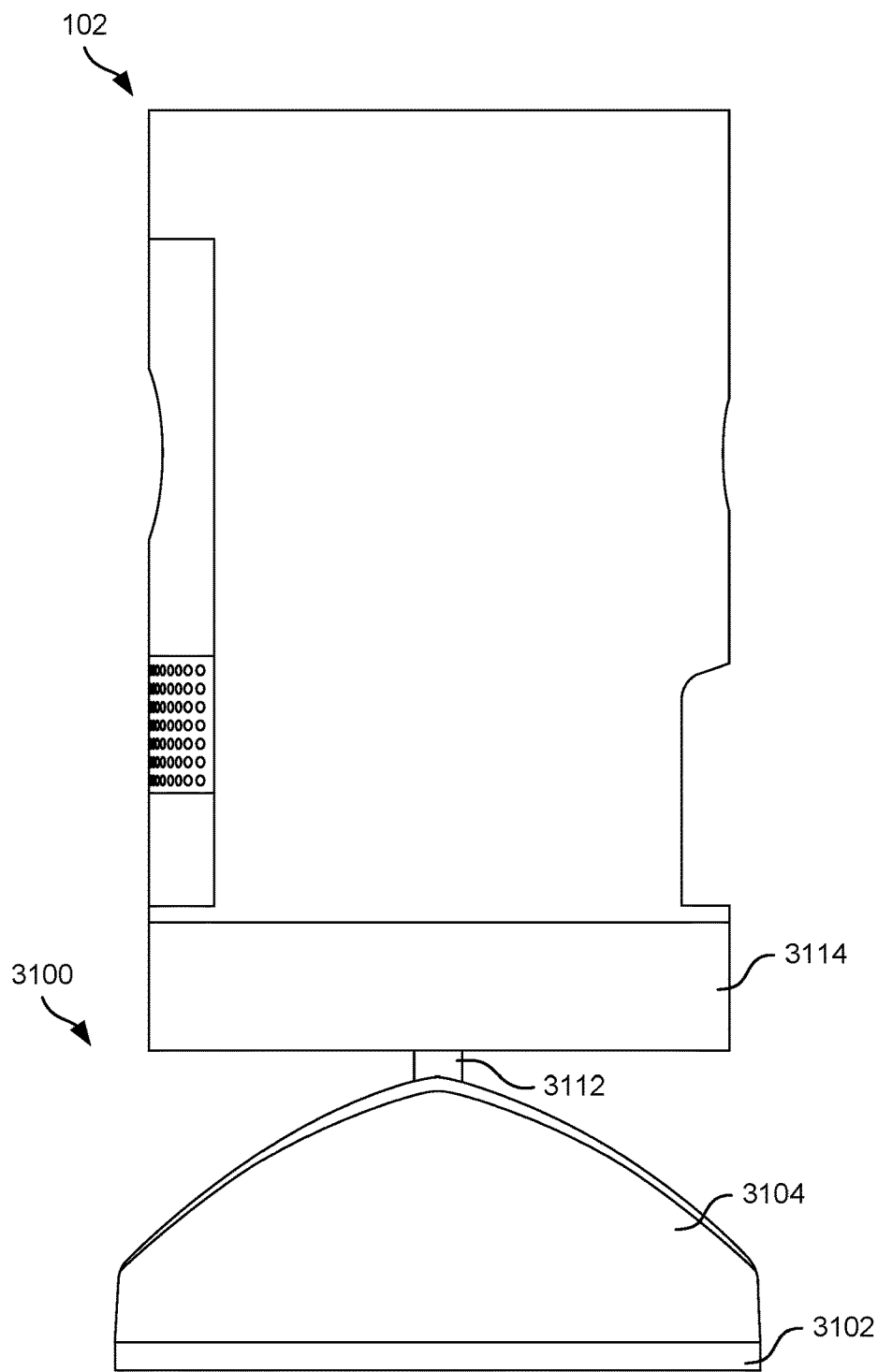
FIGS. 31A and 31B illustrate an example accessory usable with the camera assembly of FIG. 1, according to an example of the present disclosure.
Figure 31B:
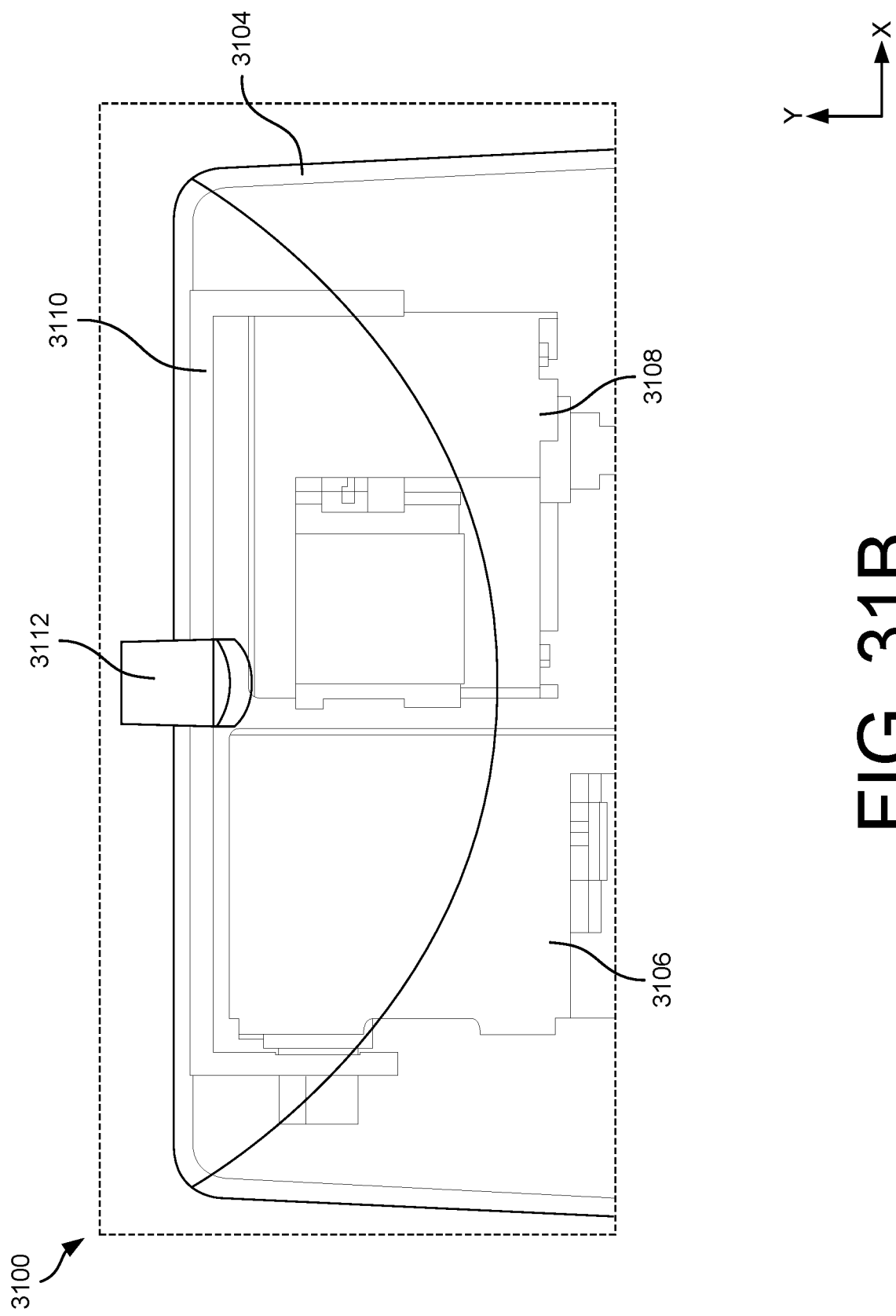

FIGS. 31A and 31B illustrate an example accessory 3100 usable with the camera assembly 102, according to examples of the present disclosure. FIG. 31A illustrates a side view of the camera assembly 102 with the accessory 3100, while FIG. 31B illustrates a front view of the accessory 3100.

In some instances, the accessory 3100 couples to the bottom 114 of the camera assembly 102. The accessory 3100 may represent a motorized stand that changes an orientation of the camera assembly 102. For example, the accessory 3100 may have a base 3102 and a first cover 3104 coupled to the base 3102. In FIG. 31B, the first cover 3104 is shown as being transparent to illustrate components residing therebeneath.

The accessory 3100 may include one or more motors disposed beneath the first cover 3104. For example, the accessory 3100 may include a first motor 3106 and a second motor 3108. In some instances, the first motor 3106 corresponds to a tilt motor (e.g., about the X-axis), while the second motor 3108 may correspond to a pan motor (e.g., about the Y-axis). In some instances, the first motor 3106 and/or the second motor 3108 may couple to a bracket 3110. The bracket 3110 may include a post 3112 that couples to the camera assembly 102. Additionally, cables (e.g., power) may route through the post 3112 for supplying power and/or signals in order to control the first motor 3106 and/or the second motor 3108. In operation, the first motor 3106 and/or the second motor 3108 may be controlled (or otherwise instructed) to actuate in order to adjust a field of view of the camera 124, PIR sensors 906, and so forth. For example, a user may use their mobile device (e.g., smart phone) to remotely control the accessory 3100 and change a field of view of the camera 124. In some instances, the base 3102 may remain stationary while the bracket 3110 moves the camera assembly 102.

A second cover 3114 couples to the camera assembly 102, and the post 3112 may be coupled to the second cover 3114. The second cover 3114 may include pegs or prongs for communicatively connecting with the contacts 1508. The prongs may be connected to the wires routed through the post 3112 for connecting with the first motor 3106 and the second motor 3108.

Figure 32:
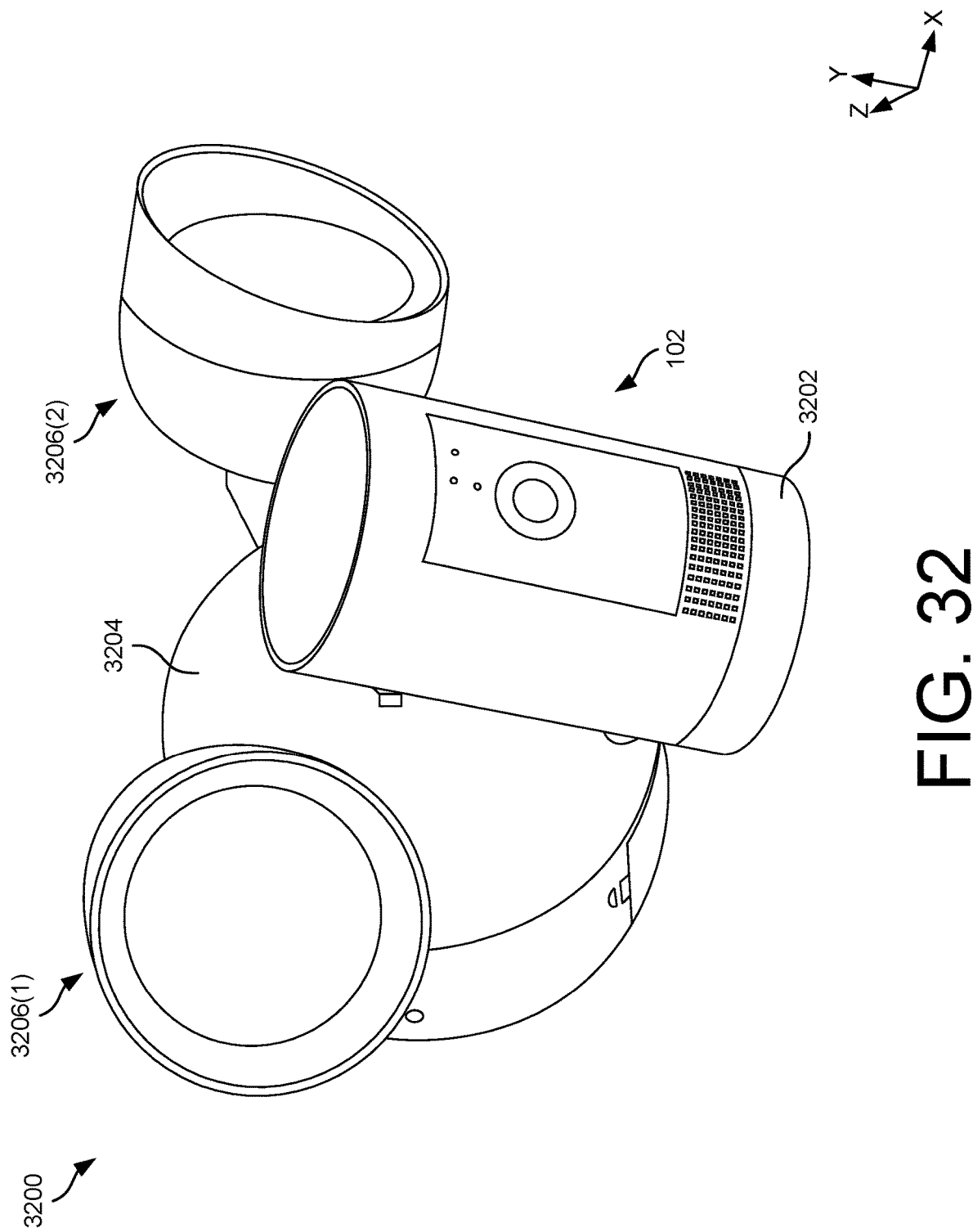
FIG. 32 illustrates an example accessory usable with the camera assembly of FIG. 1, according to an example of the present disclosure.

FIG. 32 illustrates an example accessory 3200 usable with the camera assembly 102, according to examples of the present disclosure. In FIG. 32, a cover 3202 is shown coupled to the camera assembly 102 to enclose the bottom 114 of the camera assembly 102. The camera assembly 102 may attach to a mount 3204 having one or more lighting elements 3206, such as a first lighting element 3206(1) and a second lighting element 3206(2). The mounting of the camera assembly 102 to the mount 3204 may come by way to the receptacle 202 disposed on the back 122 of the camera assembly 102. In some instances, power or other signals may be routed through the receptacle 202, between the camera assembly and the mount 3204. As such, a first accessory (e.g., the accessory 3200) and a second accessory (e.g., the cover 3202) may mount to the camera assembly 102. In some instances, the camera assembly 102 may be pivotably mounted to the mount 3204. Additionally, the lighting elements 3206 may be pivotably coupled to the mount 3204.

In some instances, the mount 3204 couples to a junction box, and power may be routed from the junction box to the lighting elements 3206 and/or the camera assembly 102. The camera assembly 102 may also be communicatively connected to the lighting elements 3206 for at least partially controlling an operation thereof. For example, in response to motion being detected by the PIR sensors 906, the lighting elements 3206 may illuminate a portion of the environment. As example routing of cables, wires, etc. between the camera assembly 102 and the lighting elements 3206 are described in, for example, U.S. patent application Ser. No. 18/081,030, filed Dec. 14, 2022, entitled "Device with Rotatable Light Housings." This patent application, as well as any publications thereof or patents issuing therefrom, are herein incorporated by reference.

Figure 33A:
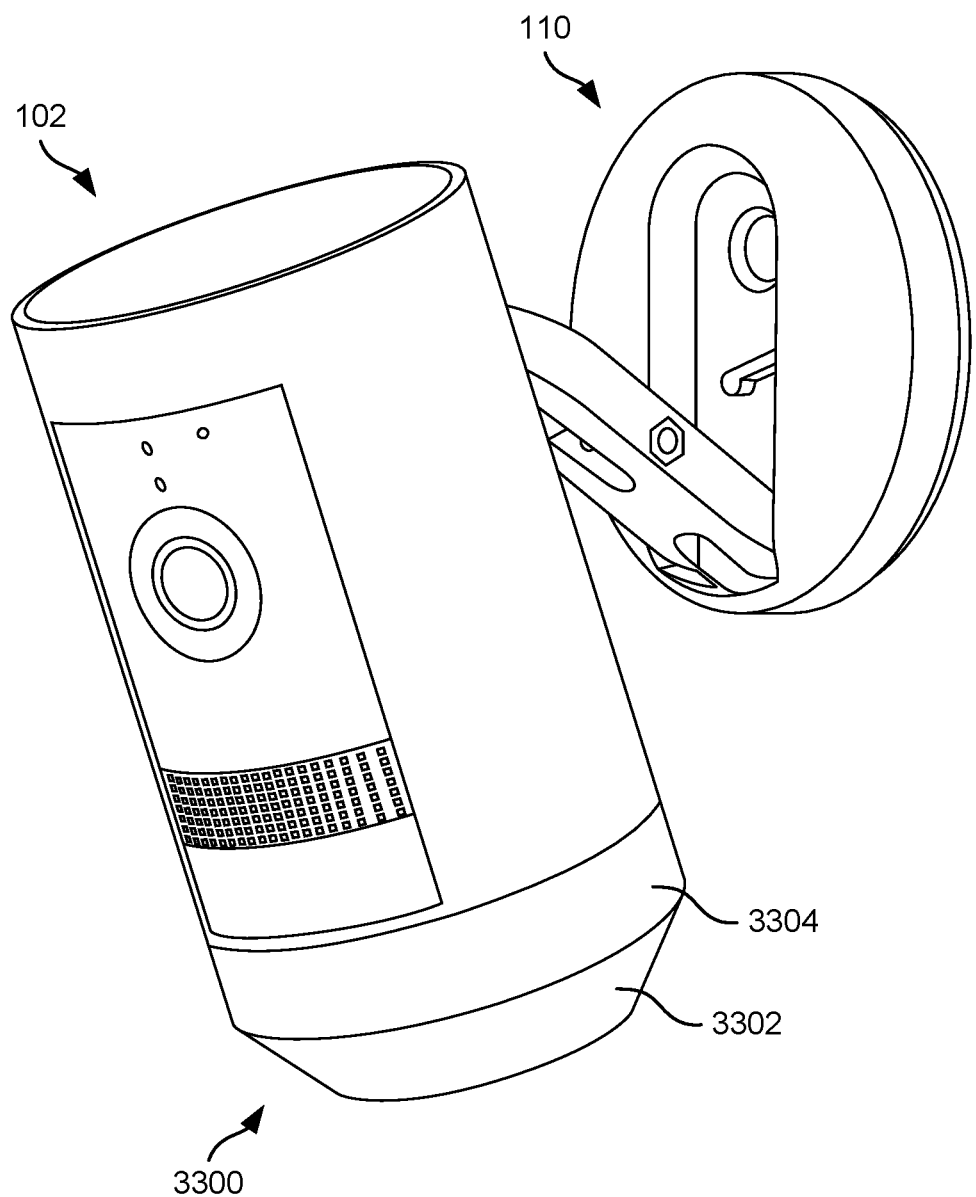
FIGS. 33A and 33B illustrates an example accessory usable with the camera assembly of FIG. 1, according to an example of the present disclosure.
Figure 33B:
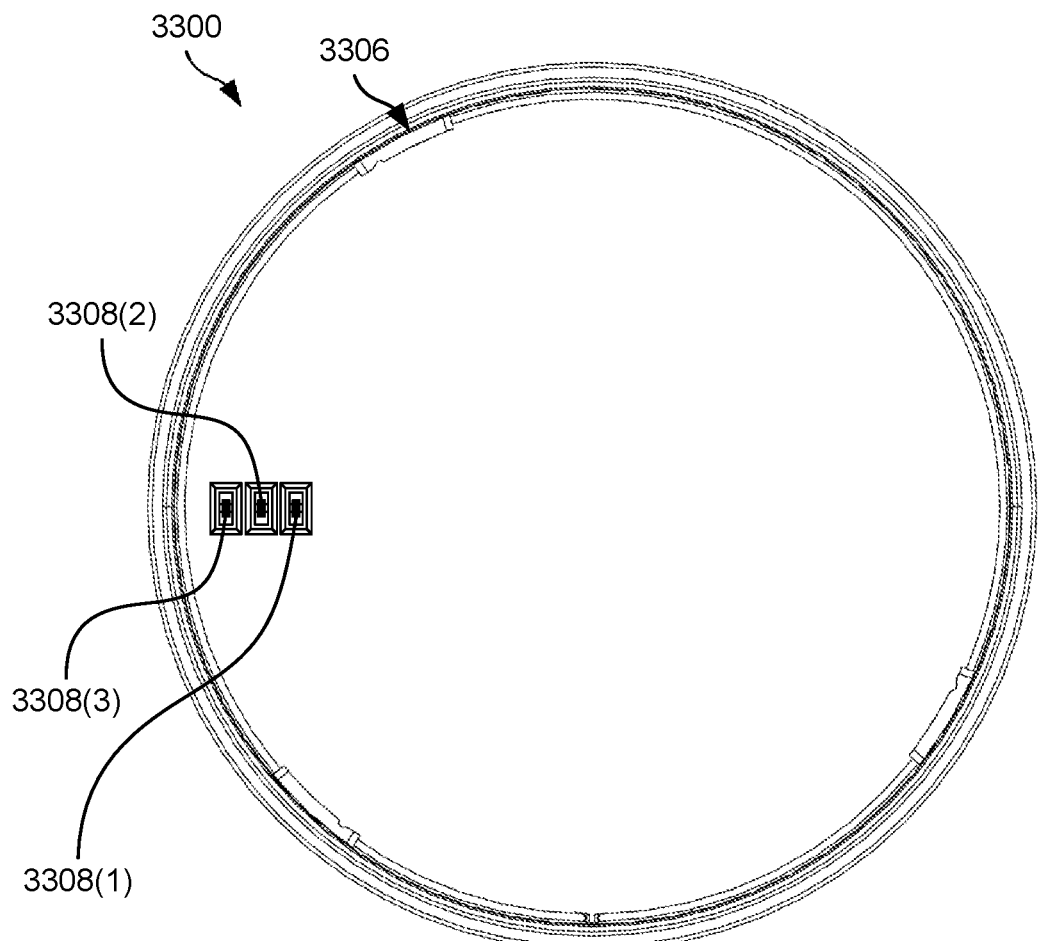

FIGS. 33A and 33B illustrates an example accessory 3300 usable with the camera assembly 102, according to examples of the present disclosure. FIG. 33A illustrates a perspective view of the accessory 3300, and FIG. 33B illustrates a top view of the accessory 3300.

In some instances, the accessory 3300 may correspond to a lighting element having a window 3302 through which light is emitted into the environment. The accessory 3300 may include a cover 3304 to which the window 3302 is attached or otherwise coupled. In some instances, the accessory 3300 couples to the camera assembly 102 via a twist and lock mechanism similar to the second cover 108. For example, the cover 3304 may include attachment mechanisms 3306 that couple to the first attachment mechanisms 1100 of the camera assembly 102.

The accessory 3300 may include pin, prongs, wires, and so forth for receiving power from the contacts 1508 of the camera assembly 102. For example, as shown in FIG. 33B, the accessory 3300 may include prongs 3308 that engage with the contacts 1508, such as first prong 3308(1), a second prong 3308(2), and a third prong 3308(3). The prongs 3308 may be biased into contact with the contacts 1508 for communicatively connecting the accessory 3300 to the camera assembly 102. The first prong 3308(1) may represent a ground contact that engages with the first contact 1508(1), the second prong 3308(2) may represent a digital contact that engages with the second contact 1508(2), and the third prong 3308(3) may represent a power contact that engages with the third contact 1508(3). As also shown, the stand 110 may couple to the camera assembly 102 at the back 122. The stand 110 is shown in an extended (or partially extended) state.

Example components of the accessories that are configured to engage with the contacts 1508 are described in, for example, U.S. patent application Ser. No. 17/953,780, filed Sep. 27, 2022, entitled "Security Camera Device." This patent application, as well as any publications thereof or patents issuing therefrom, are herein incorporated by reference. Additionally, it is to be understood that other accessories, such as the accessory 3100, that couple to the camera assembly 102 may include similar prongs and attachment mechanisms for coupling to the camera assembly 102.

Figure 34A:
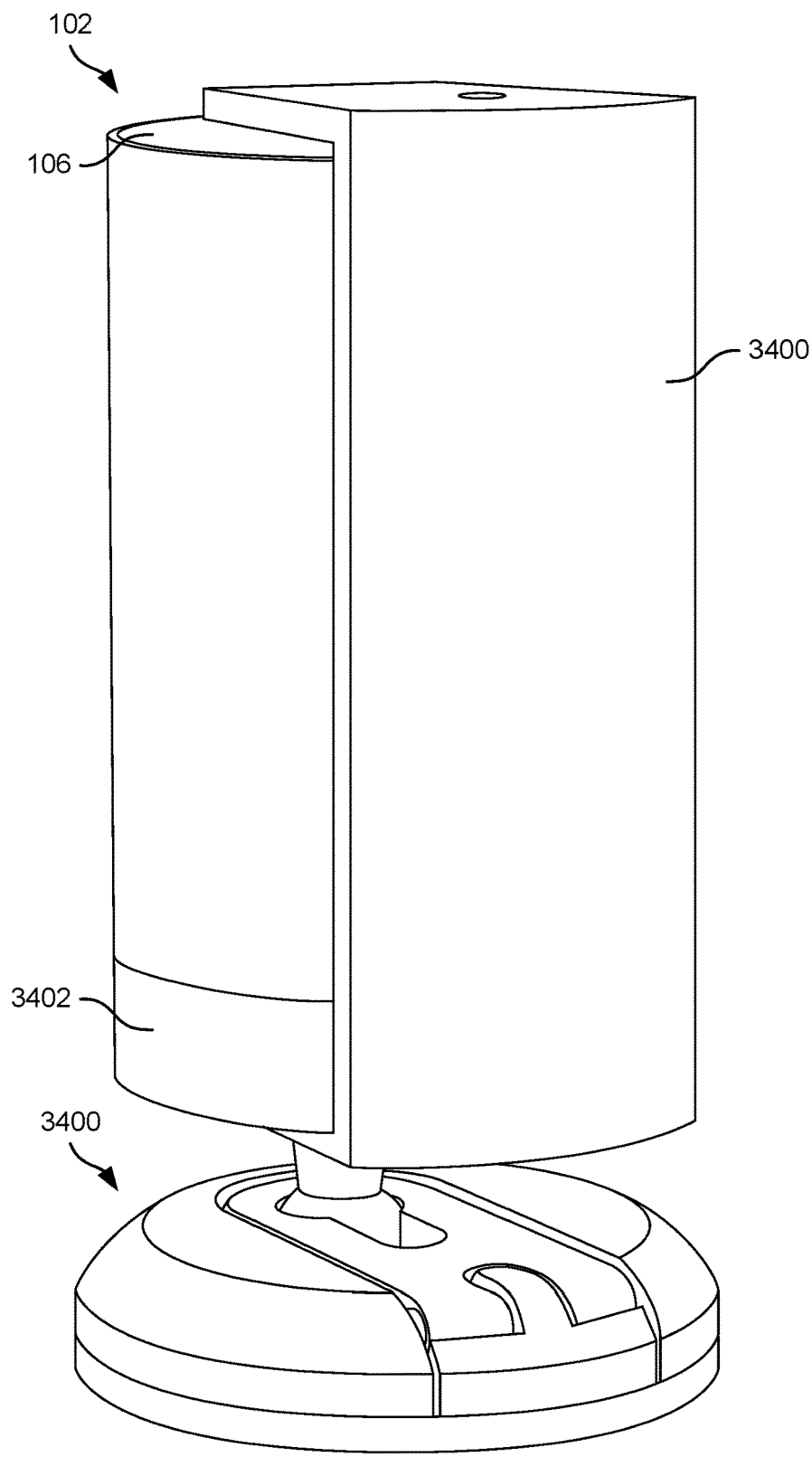
FIGS. 34A and 34B illustrate an example accessory usable with the camera assembly of FIG. 1, according to an example of the present disclosure.
Figure 34B:
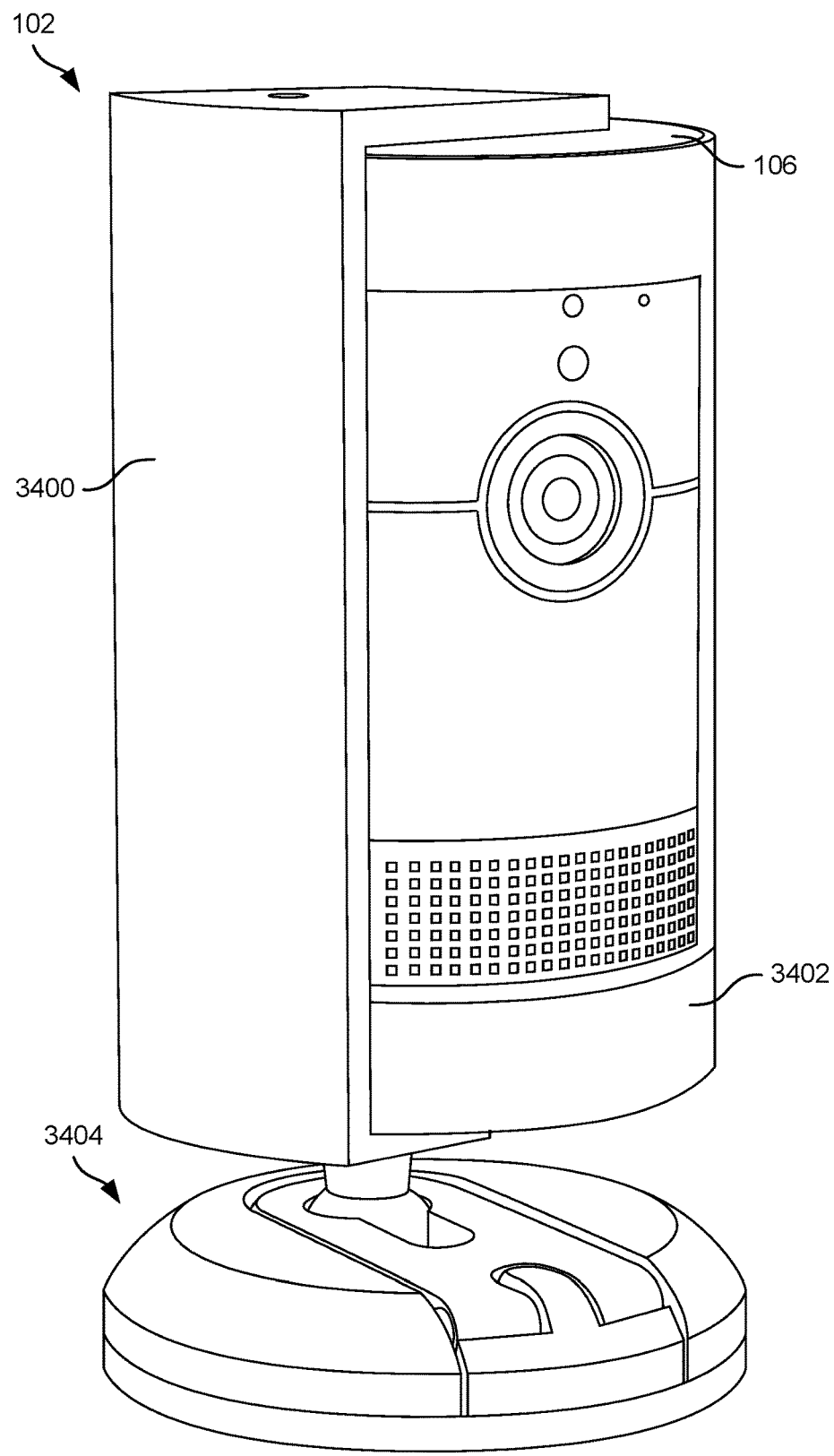

FIGS. 34A and 34B illustrate an example accessory 3400 usable with the camera assembly 102, according to examples of the present disclosure. As shown, a cover 3402 may couple to the camera assembly 102 and a stand 3404 (e.g., the stand 110) may couple to the cover 3402. The accessory 3400 may couple to the first cover 106 and the cover 3402. In some instances, the accessory 3400 rotatably couples to the first cover 106 proximate to the top 112 and the cover 3402 proximate the bottom 114.

The accessory 3400 may resemble a privacy cover configured to rotate (e.g., swing, swivel, etc.) between the first side 116, the front 120, and the second side 118. In FIG. 34A, the accessory 3400 is shown being disposed alongside the front 120. At this position, which may be considered a first position of the accessory 3400, the accessory 3400 may prevent the camera 124 capturing images and/or videos within the environment. For example, in the first position in which the accessory 3400 is disposed alongside the front 120, the accessory 3400 may obstruct the camera. Additionally, in the first position, mechanisms (e.g., face, projection, protrusion, rib, etc.) of the accessory 3400 may engage the switch 1706 to disable the camera and/or other components of the device 100 (e.g., microphones). As such, when in the first position, the accessory 3400 may not only physically obstruct the camera 124, but the switch 1706 may be activated to disable the camera and/or other components of the device 100.

As shown in FIG. 34B, the accessory 3400 is configured to rotate (e.g., about the Y-axis) to the right (clockwise) to a second position. Additionally, or alternatively, the accessory 3400 (from the first position or the second position) may be configured to rotate to the left (counterclockwise) to a third position. At the second position and the third position, the camera 124 and/or other components may be activated (or permitted to be activated such as when motion is detected). During rotation, and when in the second position and the third position, the accessory 3400 may remain coupled to the camera assembly 102. The accessory 3400 may therefore rotate between the first position, the second position, and the third position, and may be staged at any position therebetween.

The accessory 3400 may include features for engaging with the switch 1706 of the camera assembly 102 for causing the camera 124 to be activated or deactivated. An example privacy cover and operation for activating and deactivating the camera 124 is described in, for example, U.S. patent application Ser. No. 17/991,638, filed Nov. 21, 2022, entitled "Device with Rotatable Privacy Cover." This patent application, as well as any publications thereof or patents issuing therefrom, are herein incorporated by reference.

Figure 35:
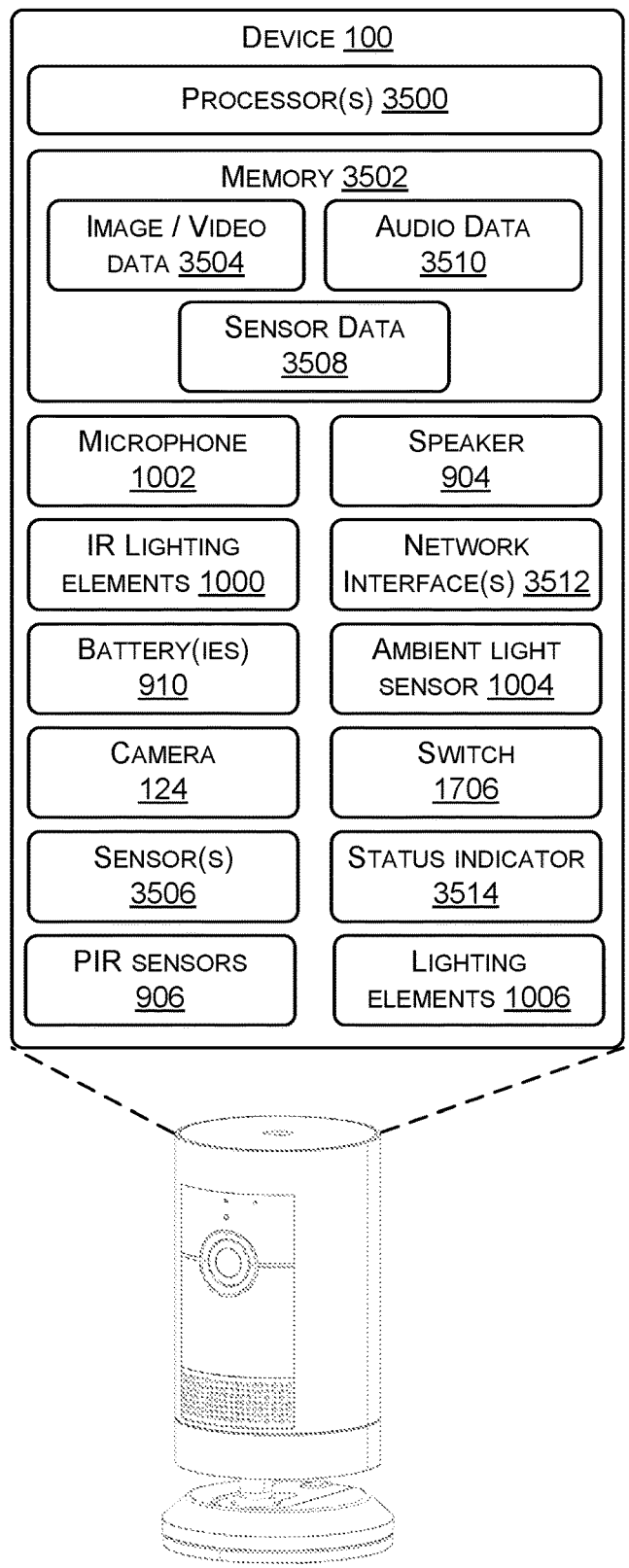
FIG. 35 illustrates example computing components of the device of FIG. 1, according to examples of the present disclosure.

FIG. 35 illustrates select components of the device 100, according to examples of the present disclosure. The device 100 is shown including processor(s) 3500 and memory 3502, where the processor(s) 3500 may perform various functions associated with controlling an operation of the device 100, and the memory 3502 may store instructions executable by the processor(s) 3500 to perform the operations described herein.

The device 100 includes the camera 124 for capturing image/video data 3504 within an environment of the device 100. In some instances, the camera 124 may include red, green, blue, depth (RGBD) camera(s) and/or three-dimensional (3D) sensors. Additionally, the device 100 may include any other sensor(s) 3506, such as the ambient light sensor 1004, the PIR sensors 906, and/or the IR lighting elements 1000, that generates sensor data 3508. The device 100 may include additional sensor(s) other than those described, such as, for example, temperature sensor(s), accelerometer(s), gyroscope(s), and so forth. Additionally, in some instances, the device 100 includes lighting elements, such as LEDs for illuminating and/or emitting light within the environment of the device 100.

In some instances, the IR lighting elements 1000 output IR light within the environment for detecting motion in order to activate the camera 124 and/or the microphone 1002 to begin capturing image/video data 3504 and/or audio data 3510, respectively. However, in some instances, the camera 124, in addition to or alternative from the IR lighting elements 1000, may be used to detect motion. For example, computer vision techniques may be used to detect objects of interest. In some instances, the camera 124 may include a CMOS image sensor, and a digital processor that may perform embedded processing within the low-power CVM itself, such that the low-power CVM may output post-processed computer vision metadata to the processor(s) 3500. The metadata may include information such as the presence of a particular type of entity (e.g., person, animal, vehicle, parcel, etc.), a direction of movement of the entity, a distance of the entity from the device 100, etc. As a result of including the computer vision, the device 100 may leverage computer vision to implement computer vision for one or more aspects, such as motion detection, object recognition, and/or facial recognition. Computer vision includes methods for acquiring, processing, analyzing, and understanding images and, in general, high-dimensional data from the real world in order to produce numerical or symbolic information, e.g., in the form of decisions. Computer vision seeks to duplicate the abilities of human vision by electronically perceiving and understanding an image. The device 100 may also include one or more IR cut filter(s).

The device 100 includes the microphone 1002 that generates audio data 3510. The microphone 1002 may include an array of microphones for beamforming audio signals within the environment of the device 100. The speaker 904 may output sound in a direction away from the device 100. The sound output by the speaker 904 may include the audio data 3510, which may be received from one or more communicatively coupled device, or other audio (e.g., siren, alarm, etc.).

Network interface(s) 3512 permit the device 100 to communicate over one or more networks. Example network interface(s) 3512 include, without limitation, Wi-Fi, Bluetooth, ZigBee, Bluetooth Low Energy (BLE), LTE, and so forth. The network interface(s) 3512 permit communication with remote device(s), such as mobile devices (e.g., phone), systems (e.g., cloud), and so forth. The network(s) may be representative of any type of communication network, including data and/or voice network, and may be implemented using wired infrastructure (e.g., cable, CAT5, fiber optic cable, etc.), a wireless infrastructure (e.g., RF, cellular, microwave, satellite, Bluetooth, etc.), and/or other connection technologies.

The sensor(s) 3506 may also include the switch 1706, where the sensor data 3508 indicates whether the switch 1706 (or the lever 2002) is in a non-displaced position or state (e.g., hanging, resting, etc.) or in a displaced position or state (e.g., moved, urged, etc.). For example, when the privacy cover is in the first position, the rib may engage with the lever 2002 such that the lever 2002 transitions to a displaced state. Such movement, or position of the lever 2002, may be sensed by the switch 1706 and the switch 1706 may generate the sensor data 3508 indicative of the position of the lever 2002 (or more generally, the privacy cover, for example). In response, the processor(s) 3500 may cause the camera 124 and/or other components of the device 100, such as the microphone 1002 to be deactivated. Conversely, when not engaged, the switch 1706 may generate the sensor data 3508 indicative of the position of the lever 2002 (or more generally, the privacy cover). Here, the processor(s) 3500 may permit the camera 124 and/or other components of the device 100, such as the microphone 1002 to be activated (e.g., in response to motion being detected). In some instances, the switch 1706 may otherwise cause the camera 124 to be deactivated. For example, in response to the switch being engaged, the switch 1706 may cause power to be terminated from being supplied to the camera 124 and/or the microphone 1002. In this sense, the processor(s) 3500 may not control the camera 124 to be activated or deactivated, but instead, the switch 1706 (or other switches) may terminate power to the camera 124.

The device 100 also includes a status indicator 3514, which may correspond to the lighting element 1006. The status indicator 3514 may output light indicative of operations being performed by the device 100.

In some instances, inbound data from may be routed through the network interface(s) 3512 before being directed to the processor(s) 3500, and outbound data from the processor(s) 3500 may be routed through the network interface(s) 3512. The network interface(s) 3512 may therefore receive inputs, such as data, from the processor(s) 3500, the camera 124, and so forth. For example, the network interface(s) 3512 may be configured to transmit data to and/or receive data from one or more network devices. The network interface(s) 3512 may act as a conduit for data communicated between various components and the processor(s) 3500.

In some instances, the device 100 may be powered via mains power, or may include battery(ies) 910 that power components of the device 100. Any number of battery(ies) 910 may be included, and the battery(ies) 910 may be rechargeable/replaceable. When the battery(ies) 910 are depleted, the battery(ies) 910 may be recharged by connecting a power source to the battery(ies) 910 (e.g., via the port 400).

Although certain components of the device 100 are illustrated, it is to be understood that the device 100 may include additional or alternative components. For example, the device 100 may include other input/output devices (e.g., display screen), heat dissipating elements, computing components (e.g., PCBs), antennas, ports (e.g., USB), and so forth).

As used herein, a processor, such as the processor(s) 3500 may include multiple processors and/or a processor having multiple cores. Further, the processor(s) may comprise one or more cores of different types. For example, the processor(s) may include application processor units, graphic processing units, and so forth. In one implementation, the processor(s) may comprise a microcontroller and/or a microprocessor. The processor(s) may include a graphics processing unit (GPU), a microprocessor, a digital signal processor or other processing units or components known in the art. Alternatively, or in addition, the functionally described herein can be performed, at least in part, by one or more hardware logic components. For example, and without limitation, illustrative types of hardware logic components that may be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, each of the processor(s) may possess its own local memory, which also may store program components, program data, and/or one or more operating systems.

Memory, such as the memory 3502 may include volatile and nonvolatile memory, removable and non-removable media implemented in any method or technology for storage of information, such as computer-readable instructions, data structures, program component, or other data. Such memory may include, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device. The memory may be implemented as computer-readable storage media ("CRSM"), which may be any available physical media accessible by the processor(s) to execute instructions stored on the memory. In one basic implementation, CRSM may include random access memory ("RAM") and Flash memory. In other implementations, CRSM may include, but is not limited to, read-only memory ("ROM"), electrically erasable programmable read-only memory ("EEPROM"), or any other tangible medium which can be used to store the desired information and which can be accessed by the processor(s).

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:
1. A method comprising:
   providing a camera device including:
   a substantially cylindrical housing having an opening at a first end thereof, a device assembly received within the housing, the device assembly having:
  a camera disposed at least partially within the substantially cylindrical housing,
  a microphone disposed at least partially within the substantially cylindrical housing,
  a plurality of electrical contacts disposed proximate the first end of the substantially cylindrical housing, the plurality of electrical contacts including a first ground contact, a first data contact, and a first power contact, wherein an end of the first ground contact is disposed closer to a center of the opening of the substantially cylindrical housing than an end of the first data contact and an end of the first power contact, and
  an end cover removably coupled to the substantially cylindrical housing,
    wherein a surface of the end cover covers the plurality of electrical contacts;
decoupling the end cover from the substantially cylindrical housing by rotating the end cover relative to the substantially cylindrical housing; and
coupling an accessory device to the substantially cylindrical housing by positioning the accessory device proximate the first end of the substantially cylindrical housing and rotating the accessory device relative to the substantially cylindrical housing, wherein the rotating of the accessory device relative to the substantially cylindrical housing first causes a ground contact of the accessory device to engage the ground contact of the camera device, and thereafter causes a data contact of the accessory device to engage the data contact of the camera device and a power contact of the accessory device to engage the power contact of the camera device.

2. The method of claim 1, wherein the substantially cylindrical housing includes a groove and the end cover includes a protrusion received within the groove.

3. The method of claim 1, wherein the accessory device comprises at least one of a pan-tilt mount or a light.

4. An electronic device, comprising:
a substantially cylindrical housing including an opening at a first end thereof;
a device assembly received within the substantially cylindrical housing, the device assembly including:
  a camera disposed at least partially within the substantially cylindrical housing,
  a microphone disposed at least partially within the substantially cylindrical housing, and
  a plurality of electrical contacts disposed proximate the first end of the substantially cylindrical housing, the plurality of electrical contacts including a ground contact, a data contact, and a power contact, wherein an end of the ground contact is disposed closer to a center of the opening of the substantially cylindrical housing than an end of the data contact and an end of the power contact; and
  an end cover removably coupled to the substantially cylindrical housing, wherein a surface of the end cover covers the plurality of electrical contacts.

5. The electronic device of claim 4, wherein the substantially cylindrical housing includes a groove and the end cover includes a protrusion received within the groove.

6. The electronic device of claim 4, wherein the end cover comprises a groove and the substantially cylindrical housing includes a protrusion received within the groove.

7. The electronic device of claim 4, wherein the substantially cylindrical housing includes threads, and the end cover includes threads engaged with the threads of the substantially cylindrical housing.

8. The electronic device of claim 4, wherein a length of a surface of the end of the ground contact is greater than a length of a surface of the end of the data contact or a length of a surface of the end of the power contact.

9. The electronic device of claim 4, wherein a length of the ground contact is greater than a length of the data contact or a length of the power contact.

10. The electronic device of claim 4, wherein, when the electronic device is oriented in a first orientation, the end of the ground contact is disposed vertically lower than the end of the data contact or the end of the power contact.

11. The electronic device of claim 4, wherein the ground contact, the data contact, and the power contact are arranged such that when an accessory device having a corresponding ground contact, a corresponding data contact, and a corresponding power contact are coupled to the substantially cylindrical housing by being rotated relative to the substantially cylindrical housing, the ground contact of the electronic device engages the corresponding ground contact of the accessory device prior to the data contact of the electronic device engaging the corresponding data contact of the accessory device and prior to the power contact of the electronic device engaging the corresponding power contact of the accessory device.

12. The electronic device of claim 4, wherein the electronic device includes:
a first passive infrared (PIR) sensor having a first PIR element and a second PIR element, the first PIR element being associated with a first polarity and the second PIR element being associated with a second polarity;
a second PIR sensor having a third PIR element and a fourth PIR element, the third PIR element being associated with the second polarity and the fourth PIR element being associated with the first polarity;
a first lens section shaped and dimensioned to direct light onto the first PIR sensor so as to provide:
  a first field of view for the first PIR element,
  a second field of view for the second PIR element, and
  a first blind zone between the first field of view and the second field of view;
a second lens section shaped and dimensioned to direct light onto the second PIR sensor so as to provide:
  a third field of view for the third PIR element,
  a fourth field of view for the fourth PIR element, and
  a second blind zone between the third field of view and the fourth field of view; and
an integrated circuit component electrically coupled by a first line to the first PIR sensor and electrically coupled by a second line to the second PIR sensor,
wherein the first PIR sensor and second PIR sensor are arranged such that, when the electronic device is oriented in a first orientation:
  the first PIR element is disposed vertically above the third PIR element,
  the second PIR element is disposed vertically above the fourth PIR element, and
  the first field of view and the second field of view extend farther from the electronic device than the third field of view and the fourth field of view.

13. The electronic device of claim 12, wherein the integrated circuit component comprises a voltage adder.

14. The electronic device of claim 12, wherein the integrated circuit component comprises a differential amplifier.

15. The electronic device of claim 12, wherein the electronic device includes a third lens section shaped and dimensioned to direct light onto the second PIR sensor so as to provide:
a fifth field of view for the third PIR element,
a sixth field of view for the fourth PIR element, and
a third blind zone between the fifth field of view and the sixth field of view.

16. The electronic device of claim 4, wherein the electronic device includes:
a first passive infrared (PIR) sensor having a first PIR element and a second PIR element, the first PIR element being associated with a first polarity and the second PIR element being associated with a second polarity;
a second PIR sensor having a third PIR element and a fourth PIR element, the third PIR element being associated with the second polarity and the fourth PIR element being associated with the first polarity;
one or more lens sections shaped and dimensioned to direct light onto the first PIR sensor and the second PIR sensor; and
an integrated circuit component electrically coupled by a first line to the first PIR sensor and electrically coupled by a second line to the second PIR sensor,
wherein the first PIR sensor and second PIR sensor are arranged such that, when the electronic device is oriented in a first orientation:
the first PIR element is disposed vertically above the third PIR element, and
the second PIR element is disposed vertically above the fourth PIR element.

17. An electronic device comprising:
a substantially cylindrical housing including:
a first opening at a first end thereof,
a second opening in a surface disposed between the first end and a second end, and
a slot disposed proximate the first end; and
a device assembly received within the substantially cylindrical housing, the device assembly including:
a printed circuit board (PCB),
an electrical port accessible via the second opening,
a camera disposed at least partially within the substantially cylindrical housing,
a microphone disposed at least partially within the substantially cylindrical housing, and
a plurality of electrical contacts extending from the PCB in a direction generally perpendicular to a plane of the first opening, each of the plurality of electrical contacts including a respective end disposed proximate the first end of the substantially cylindrical housing, the plurality of electrical contacts includes a ground contact, a data contact, and a power contact, wherein an end of the ground contact is disposed closer to a center of the opening of the substantially cylindrical housing than an end of the data contact and an end of the power contact.

18. The electronic device of claim 17, wherein the ground contact, the data contact, and the power contact are arranged such that when an accessory device having a corresponding ground contact, a corresponding data contact, and a corresponding power contact are coupled to the substantially cylindrical housing by being rotated relative to the housing, the ground contact of the electronic device will engage the corresponding ground contact of the accessory device prior to the data contact of the electronic device engaging the corresponding data contact of the accessory device and prior to the power contact of the electronic device engaging the corresponding power contact of the accessory device.

19. The electronic device of claim 18, wherein the accessory device is removably coupled to the substantially cylindrical housing.

20. The electronic device of claim 18, wherein an accessory device including a second ground contact, a second data contact, and a second power contact is removably coupled to the substantially cylindrical housing.

21. The electronic device of claim 17, wherein the electronic device includes:
a first passive infrared (PIR) sensor having a first PIR element and a second PIR element, the first PIR element being associated with a first polarity and the second PIR element being associated with a second polarity;
a second PIR sensor having a third PIR element and a fourth PIR element, the third PIR element being associated with the second polarity and the fourth PIR element being associated with the first polarity; and
an integrated circuit component electrically coupled by a first line to the first PIR sensor and electrically coupled by a second line to the second PIR sensor,
wherein the first PIR sensor and second PIR sensor are arranged such that, when the electronic device is oriented in a first orientation:
the first PIR element is disposed vertically above the third PIR element, and
the second PIR element is disposed vertically above the fourth PIR element.

22. The electronic device of claim 17, wherein the electronic device includes a first surface disposed substantially parallel to the plane of the first opening, wherein the plurality of electrical contacts extend through a second opening of the first surface, and wherein the electronic device includes one or more pads secured to the first surface proximate the second opening.

23. The electronic device of claim 17, wherein the electronic device includes a first surface disposed substantially parallel to the plane of the first opening, wherein the second opening provides access to the plurality of electrical contacts through the first surface, and wherein the electronic device includes one or more pads secured to the first surface proximate the second opening.

* * * * *